US010503396B2

United States Patent
Rubalcava et al.

(10) Patent No.: US 10,503,396 B2
(45) Date of Patent: Dec. 10, 2019

(54) DEVICE, METHOD, AND GRAPHICAL USER INTERFACE FOR SIMULATING AND INTERACTING WITH HANDWRITTEN TEXT

(71) Applicant: Apple Inc., Cupertino, CA (US)

(72) Inventors: Daniel E. Gobera Rubalcava, San Jose, CA (US); Ryan S. Dixon, Mountain View, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 15/978,127

(22) Filed: May 12, 2018

(65) Prior Publication Data

US 2018/0349021 A1    Dec. 6, 2018

Related U.S. Application Data

(60) Provisional application No. 62/514,894, filed on Jun. 4, 2017, provisional application No. 62/514,616, filed on Jun. 2, 2017.

(51) Int. Cl.
| | | |
|---|---|---|
| *G06F 3/0488* | (2013.01) | |
| *G06F 3/16* | (2006.01) | |
| *G06F 3/0354* | (2013.01) | |

(52) U.S. Cl.
CPC ...... *G06F 3/04883* (2013.01); *G06F 3/03545* (2013.01); *G06F 3/167* (2013.01); *G06F 2203/04105* (2013.01); *G06F 2203/04106* (2013.01)

(58) Field of Classification Search
CPC ............ G06F 3/03545; G06F 3/04883; G06F 2203/04106

USPC ...................... 178/18.01–19.07; 345/173–179
See application file for complete search history.

(56) References Cited

U.S. PATENT DOCUMENTS

| | | | | |
|---|---|---|---|---|
| 6,459,442 B1 * | 10/2002 | Edwards | ............. | G06F 3/04883 715/700 |
| 9,411,508 B2 * | 8/2016 | Goldsmith | .......... | G06F 3/04883 |
| 9,665,259 B2 * | 5/2017 | Lee | ...................... | G06F 3/04845 |
| 2014/0245137 A1 * | 8/2014 | Kim | ...................... | G06F 17/241 715/268 |
| 2019/0026011 A1 * | 1/2019 | Wang | ...................... | G06F 3/0488 |
| 2019/0114478 A1 * | 4/2019 | Xi | ...................... | G06K 9/00436 |

* cited by examiner

*Primary Examiner* — Michael Pervan
(74) *Attorney, Agent, or Firm* — Fernando & Partners, LLP

(57) ABSTRACT

A device displays a drawing region. While displaying the drawing region, the device detects a sequence of drawing inputs on a touch-sensitive display. In response to the sequence of drawing inputs, the device draws a plurality of strokes in the drawing region. The plurality of strokes correspond to a plurality of characters. After detecting the sequence of drawing inputs, the device detects a predefined gesture that corresponds to a request to perform an operation based on the plurality of characters represented by the plurality of strokes. In response to detecting the predefined gesture, the device concurrently displays a first visual prompt indicating that a first subset of one or more characters in the plurality of characters can be used to perform the operation and a second visual prompt indicating that a second subset of one or more characters in the plurality of characters can be used to perform the operation.

48 Claims, 40 Drawing Sheets

Halloween Party

Food $200 [$200]

Drinks $300 [$300]

Decorations $250 [$250]

Total: =$750

Guests
Jessica
Tiffany
Katrina
Nina
Nadine 5 people [5]

Per person =$750 ÷ 5  ✓ / ✗

Halloween Party

Food $200

Drinks $300

Decorations $250

Total: =$750

Guests
Jessica
Tiffany
Katrina
Nina
Nadine 5 people

Per person =$150 — 530a

534a

D

- 806

The first appearance is associated with one or more of a first line angle, a first line shape and a first line thickness, and wherein the second appearance is associated with one or more of a second line angle that is different from the first line angle, a second line shape that is different from the first line shape and a second line thickness that is different from the first line thickness.

- 836

The first character includes a first stroke and a second stroke, wherein the first appearance is associated with a first proportion between the first stroke and the second stroke, and wherein the second appearance is associated with a second proportion between the first stroke and the second stroke, the second proportion being different from the first proportion

- 838

E

- 808

The variation between the first appearance and the second appearance is a function of a variation in the handwritten text of the respective user

- 840

Determine whether one of the first criterion and the second criterion are met based on a randomizing function

- 842

Determine that the first criterion is met when the first character is between a second character and a third character, and wherein determining that the second criterion is met when the first character is adjacent the second character and not adjacent the third character

After displaying the first character in accordance with one of the first appearance and the second appearance:
    Receive a second character in the sequence of characters;
    In accordance with a determination that a third criterion is met, change the display of the first character from one of the first appearance and the second appearance to a third appearance that corresponds to the appearance of the first character in handwritten text of the respective user; and
    In accordance with a determination that a fourth criterion is met, change the display of the first character from one of the first appearance and the second appearance to a fourth appearance that corresponds to the appearance of the first character in handwritten text of the respective user, wherein the fourth appearance of the first character is different than the third appearance of the first character

DEVICE, METHOD, AND GRAPHICAL USER INTERFACE FOR SIMULATING AND INTERACTING WITH HANDWRITTEN TEXT

RELATED APPLICATION

This application claims priority to U.S. Provisional Patent Application Nos. 62/514,616 (filed on Jun. 2, 2017) and 62/514,894 (filed on Jun. 4, 2017), the entire contents of which are incorporated herein by reference.

TECHNICAL FIELD

The present disclosure relates generally to electronic devices with touch-sensitive surfaces, including but not limited to electronic devices with touch-sensitive surfaces that simulate and interact with handwritten text.

BACKGROUND

The use of touch-sensitive surfaces as input devices for computers and other electronic computing devices has increased significantly in recent years. Example touch-sensitive surfaces include touchpads and touch-screen displays. Such surfaces are widely used to manipulate user interface objects on a display.

Example manipulations include adjusting the position and/or size of one or more user interface objects or activating buttons or opening files/applications represented by user interface objects, as well as associating metadata with one or more user interface objects or otherwise manipulating user interfaces. Example user interface objects include digital images, video, text, icons, control elements such as buttons and other graphics. A user will, in some circumstances, need to perform such manipulations on user interface objects in a file management program (e.g., Finder from Apple Inc. of Cupertino, Calif.), an image management application (e.g., Aperture, iPhoto, Photos from Apple Inc. of Cupertino, Calif.), a digital content (e.g., videos and music) management application (e.g., iTunes from Apple Inc. of Cupertino, Calif.), a drawing application, a presentation application (e.g., Keynote from Apple Inc. of Cupertino, Calif.), a word processing application (e.g., Pages from Apple Inc. of Cupertino, Calif.), a website creation application (e.g., iWeb from Apple Inc. of Cupertino, Calif.), a disk authoring application (e.g., iDVD from Apple Inc. of Cupertino, Calif.), or a spreadsheet application (e.g., Numbers from Apple Inc. of Cupertino, Calif.).

But methods for performing these manipulations are cumbersome and inefficient. For example, using a sequence of mouse based inputs to select one or more user interface objects and perform one or more actions on the selected user interface objects is tedious and creates a significant cognitive burden on a user. In addition, these methods take longer than necessary, thereby wasting energy. This latter consideration is particularly important in battery-operated devices.

SUMMARY

Accordingly, there is a need for electronic devices with faster, more efficient methods and interfaces for simulating and interacting with handwritten text. Such methods and interfaces optionally complement or replace conventional methods for simulating and interacting with handwritten text. Such methods and interfaces reduce the cognitive burden on a user and produce a more efficient human-machine interface. For battery-operated devices, such methods and interfaces conserve power and increase the time between battery charges.

The above deficiencies and other problems associated with user interfaces for electronic devices with touch-sensitive surfaces are reduced or eliminated by the disclosed devices. In some embodiments, the device is a desktop computer. In some embodiments, the device is portable (e.g., a notebook computer, tablet computer, or handheld device). In some embodiments, the device has a touchpad. In some embodiments, the device has a touch-sensitive display (also known as a "touch screen" or "touch-screen display"). In some embodiments, the device has a graphical user interface (GUI), one or more processors, memory and one or more modules, programs or sets of instructions stored in the memory for performing multiple functions. In some embodiments, the user interacts with the GUI primarily through stylus and/or finger contacts and gestures on the touch-sensitive surface. In some embodiments, the functions optionally include image editing, drawing, presenting, word processing, website creating, disk authoring, spreadsheet making, game playing, telephoning, video conferencing, e-mailing, instant messaging, workout support, digital photographing, digital videoing, web browsing, digital music playing, and/or digital video playing. Executable instructions for performing these functions are, optionally, included in a non-transitory computer readable storage medium or other computer program product configured for execution by one or more processors.

In accordance with some embodiments, a method is performed at a device with a touch-sensitive display, a non-transitory memory and one or more processors coupled with the touch-sensitive display and the non-transitory memory. The method includes displaying, on the touch-sensitive display, a drawing region. While displaying, the drawing region, the method includes detecting a sequence of drawing inputs on the touch-sensitive display. In response to detecting the sequence of drawing inputs, the method includes drawing a plurality of strokes in the drawing region. The plurality of strokes correspond to a plurality of characters. After detecting the sequence of drawing inputs on the touch-sensitive display, the method includes detecting a predefined gesture that corresponds to a request to perform an operation based on the plurality of characters represented by the plurality of strokes. In response to detecting the predefined gesture, the method includes concurrently displaying a first visual prompt indicating that a first subset of one or more characters in the plurality of characters can be used to perform the operation and a second visual prompt indicating that a second subset of one or more characters in the plurality of characters can be used to perform the operation.

In accordance with some embodiments, an electronic device includes a touch-sensitive display unit configured to display a user interface, one or more input units configured to receive user inputs, and a processing unit coupled with the touch-sensitive display unit, and the one or more input units. The processing unit is configured to enable display of, in a display area on the touch-sensitive display unit, a drawing region. The processing unit is configured to while displaying the drawing region, detecting a sequence of drawing inputs on the touch-sensitive display. In response to detecting the sequence of drawing inputs, the processing unit is further configured to draw a plurality of strokes in the drawing region. The plurality of strokes correspond to a plurality of characters. After detecting the sequence of drawing inputs on the touch-sensitive display, the processing unit is configured to detect a predefined gesture that corresponds to a request to perform an operation based on the plurality of characters represented by the plurality of strokes. In response to detecting the predefined gesture, the processing unit is further configured to concurrently display a first visual prompt indicating that a first subset of one or more characters in the plurality of characters can be used to perform the operation and a second visual prompt indicating that a second subset of one or more characters in the plurality of characters can be used to perform the operation.

In accordance with some embodiments, a method is performed at a device with a display, a non-transitory memory, one or more processors coupled with the display and the non-transitory memory, and one or more input devices. The method includes receiving, via the one or more input devices, a user input that corresponds with a sequence of characters. In response to receiving the user input, the method includes displaying, on the display simulated handwritten text that includes varying the appearance of characters in the simulated handwritten text based on variations that were detected in handwritten text of a respective user. In response to receiving the user input and in accordance with a determination that a first criterion is met, a first character in the sequence of characters has a first appearance that corresponds to the appearance of the first character in handwritten text of the respective user. In response to receiving the user input and in accordance with a determination that a second criterion is met, the first character in the sequence of characters has a second appearance that corresponds to the appearance of the first character in handwritten text of the respective user. The second appearance of the first character is different than the first appearance of the first character.

In accordance with some embodiments, an electronic device includes a display unit configured to display a user interface, one or more input units configured to receive user inputs, and a processing unit coupled with the display unit and the one or more input units. The processing unit is configured to receive, via the one or more input units, the user input that corresponds with a sequence of characters. In response to receiving the user input, the processing unit is configured to display, on the display unit simulated handwritten text that includes varying the appearance of characters in the simulated handwritten text based on variations that were detected in handwritten text of a respective user. In response to receiving the user input and in accordance with a determination that a first criterion is met, a first character in the sequence of characters has a first appearance that corresponds to the appearance of the first character in handwritten text of the respective user. In response to receiving the user input and in accordance with a determination that a second criterion is met, the first character in the sequence of characters has a second appearance that corresponds to the appearance of the first character in handwritten text of the respective user. The second appearance of the first character is different than the first appearance of the first character.

Thus, electronic devices with displays and input devices are provided with faster, more efficient methods and interfaces for displaying affordances in accessibility mode. Such electronic devices improve the visibility of the affordances thereby improving the operability of the electronic devices. Such methods and interfaces may complement or replace conventional methods for displaying affordances in accessibility mode.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIGS. 8A-8E are flow diagrams illustrating a method of simulating handwritten text in accordance with some embodiments.

DESCRIPTION OF EMBODIMENTS

Figure 1A:
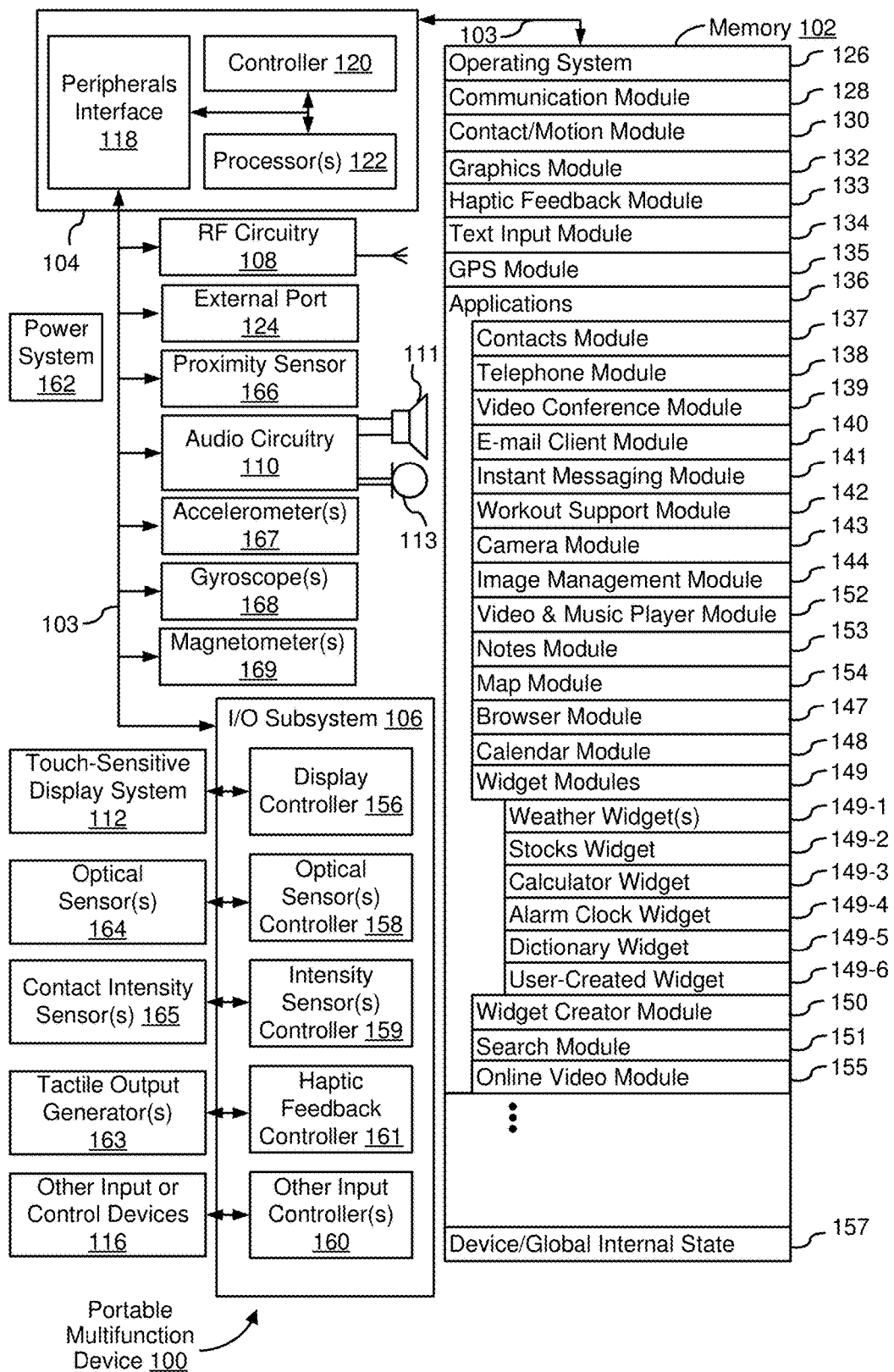
FIG. 1A is a block diagram illustrating a portable multifunction device with a touch-sensitive display in accordance with some embodiments.

Typically, a user can adjust a text display setting to adjust a text size of text that is displayed on the device. However, the text size of text that is part of an affordance is typically limited by a size of the affordance. As such, typical adjustments to the text display setting do not improve the visibility of text that is part of an affordance to the same extent as text that is not part of the affordance. Accordingly, in some embodiments described below, the device displays an overlay that includes an enlarged representation of an affordance. Displaying the overlay allows the device to display an enlarged representation of the text that is part of the affordance. Since the enlarged representation of the text is not limited by the size of the affordance, displaying the overlay improves the visibility of the affordance. Improving the visibility of the affordance makes it easier for the user to see the affordance thereby improving the user experience.

Below, a description of example devices illustrated in FIGS. 1A-1B, 2, and 3 is provided. FIGS. 4A-4B, and 5A-5Z illustrate example user interfaces for interacting with handwritten text. FIGS. 7A-7D illustrate a flow diagram of a method of interacting with handwritten text. The user interfaces in 5A-5Z are used to illustrate the processes in FIGS. 7A-7D. FIGS. 6A-6Y illustrate example user interfaces for simulating handwritten text. FIGS. 8A-8E illustrate a flow diagram of a method of simulating handwritten text. The user interfaces in 6A-6Y are used to illustrate the processes in FIGS. 8A-8E.

Example Devices

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact, unless the context clearly indicates otherwise.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Example embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch-screen displays and/or touchpads), are, optionally, used. It should also be understood that, in some embodiments, the device is not a portable communications device, but is a desktop computer with a touch-sensitive surface (e.g., a touch-screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display system 112 is sometimes called a "touch screen" for convenience, and is sometimes simply called a touch-sensitive display. Device 100 includes memory 102 (which optionally includes one or more computer readable storage mediums), memory controller 120, one or more processing units (CPUs) 122, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 163 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as a "down click" or an "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, firmware, or a combination thereof, including one or more signal processing and/or application specific integrated circuits.

Memory 102 optionally includes high-speed random access memory and optionally also includes non-volatile memory, such as one or more magnetic disk storage devices, flash memory devices, or other non-volatile solid-state memory devices. Access to memory 102 by other components of device 100, such as CPU(s) 122 and the peripherals interface 118, is, optionally, controlled by memory controller 120.

Peripherals interface 118 can be used to couple input and output peripherals of the device to CPU(s) 122 and memory 102. The one or more processors 122 run or execute various software programs and/or sets of instructions stored in memory 102 to perform various functions for device 100 and to process data.

In some embodiments, peripherals interface 118, CPU(s) 122, and memory controller 120 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSDPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11ac, IEEE 802.11ax, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch-sensitive display system 112 and other input or control devices 116, with peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input or control devices 116. The other input or control devices 116 optionally include physical buttons (e.g., push buttons, rocker buttons, etc.), dials, slider switches, joysticks, click wheels, and so forth. In some alternate embodiments, input controller(s) 160 are, optionally, coupled with any (or none) of the following: a keyboard, infrared port, USB port, stylus, and/or a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

Touch-sensitive display system 112 provides an input interface and an output interface between the device and a user. Display controller 156 receives and/or sends electrical signals from/to touch-sensitive display system 112. Touch-sensitive display system 112 displays visual output to the user. The visual output optionally includes graphics, text, icons, video, and any combination thereof (collectively termed "graphics"). In some embodiments, some or all of the visual output corresponds to user-interface objects.

Touch-sensitive display system 112 has a touch-sensitive surface, sensor or set of sensors that accepts input from the user based on haptic/tactile contact. Touch-sensitive display system 112 and display controller 156 (along with any associated modules and/or sets of instructions in memory 102) detect contact (and any movement or breaking of the contact) on touch-sensitive display system 112 and converts the detected contact into interaction with user-interface objects (e.g., one or more soft keys, icons, web pages or images) that are displayed on touch-sensitive display system 112. In an example embodiment, a point of contact between touch-sensitive display system 112 and the user corresponds to a finger of the user or a stylus.

Touch-sensitive display system 112 optionally uses LCD (liquid crystal display) technology, LPD (light emitting polymer display) technology, or LED (light emitting diode) technology, although other display technologies are used in other embodiments. Touch-sensitive display system 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch-sensitive display system 112. In an example embodiment, projected mutual capacitance sensing technology is used, such as that found in the iPhone®, iPod Touch®, and iPad® from Apple Inc. of Cupertino, Calif.

Touch-sensitive display system 112 optionally has a video resolution in excess of 100 dpi. In some embodiments, the touch screen video resolution is in excess of 400 dpi (e.g., 500 dpi, 800 dpi, or greater). The user optionally makes contact with touch-sensitive display system 112 using any suitable object or appendage, such as a stylus, a finger, and so forth. In some embodiments, the user interface is designed to work with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch-sensitive display system 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled with optical sensor controller 158 in I/O subsystem 106. Optical sensor(s) 164 optionally include charge-coupled device (CCD) or complementary metal-oxide semiconductor (CMOS) phototransistors. Optical sensor(s) 164 receive light from the environment, projected through one or more lens, and converts the light to data representing an image. In conjunction with imaging module 143 (also called a camera module), optical sensor(s) 164 optionally capture still images and/or video. In some embodiments, an optical sensor is located on the back of device 100, opposite touch-sensitive display system 112 on the front of the device, so that the touch screen is enabled for use as a viewfinder for still and/or video image acquisition. In some embodiments, another optical sensor is located on the front of the device so that the user's image is obtained (e.g., for selfies, for videoconferencing while the user views the other video conference participants on the touch screen, etc.).

Device 100 optionally also includes one or more contact intensity sensors 165. FIG. 1A shows a contact intensity sensor coupled with intensity sensor controller 159 in I/O subsystem 106. Contact intensity sensor(s) 165 optionally include one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor(s) 165 receive contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch-screen display system 112 which is located on the front of device 100.

Device 100 optionally also includes one or more proximity sensors 166. FIG. 1A shows proximity sensor 166 coupled with peripherals interface 118. Alternately, proximity sensor 166 is coupled with input controller 160 in I/O subsystem 106. In some embodiments, the proximity sensor turns off and disables touch-sensitive display system 112 when the multifunction device is placed near the user's ear (e.g., when the user is making a phone call).

Device 100 optionally also includes one or more tactile output generators 163. FIG. 1A shows a tactile output generator coupled with haptic feedback controller 161 in I/O subsystem 106. Tactile output generator(s) 163 optionally include one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Tactile output generator(s) 163 receive tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch-sensitive display system 112, which is located on the front of device 100.

Device 100 optionally also includes one or more accelerometers 167, gyroscopes 168, and/or magnetometers 169 (e.g., as part of an inertial measurement unit (IMU)) for obtaining information concerning the position (e.g., attitude) of the device. FIG. 1A shows sensors 167, 168, and 169 coupled with peripherals interface 118. Alternately, sensors 167, 168, and 169 are, optionally, coupled with an input controller 160 in I/O subsystem 106. In some embodiments, information is displayed on the touch-screen display in a portrait view or a landscape view based on an analysis of data received from the one or more accelerometers. Device 100 optionally includes a GPS (or GLONASS or other global navigation system) receiver (not shown) for obtaining information concerning the location of device 100.

Figure 3:
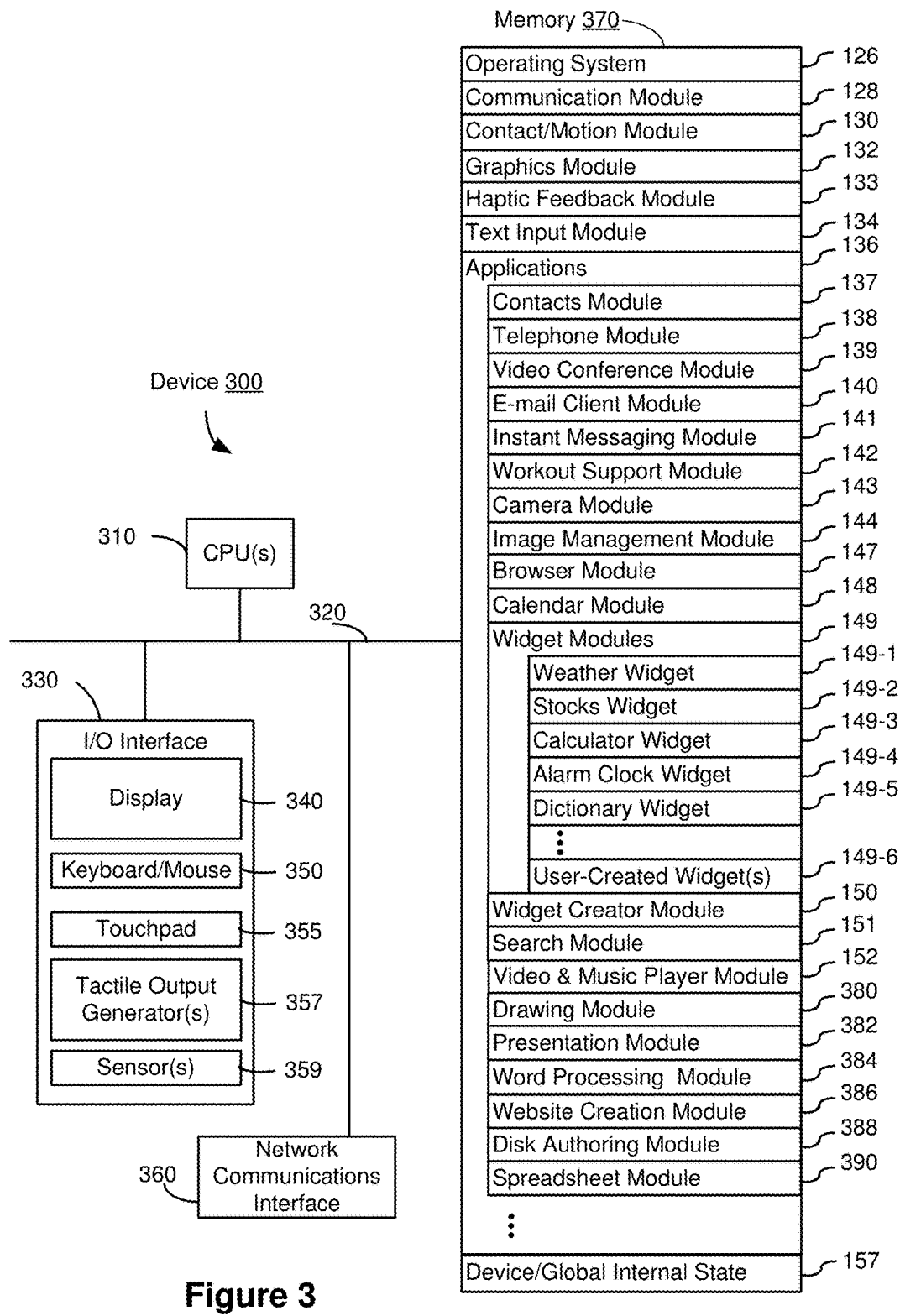
FIG. 3 is a block diagram of an example multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, haptic feedback module (or set of instructions) 133, text input module (or set of instructions) 134, Global Positioning System (GPS) module (or set of instructions) 135, and applications (or sets of instructions) 136. Furthermore, in some embodiments, memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch-sensitive display system 112; sensor state, including information obtained from the device's various sensors and other input or control devices 116; and location and/or positional information concerning the device's location and/or attitude.

Operating system 126 (e.g., iOS, Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used in some iPhone®, iPod Touch®, and iPad® devices from Apple Inc. of Cupertino, Calif. In some embodiments, the external port is a Lightning connector that is the same as, or similar to and/or compatible with the Lightning connector used in some iPhone®, iPod Touch®, and iPad® devices from Apple Inc. of Cupertino, Calif.

Contact/motion module 130 optionally detects contact with touch-sensitive display system 112 (in conjunction with display controller 156) and other touch-sensitive devices (e.g., a touchpad or physical click wheel). Contact/motion module 130 includes software components for performing various operations related to detection of contact (e.g., by a finger or by a stylus), such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts or stylus contacts) or to multiple simultaneous contacts (e.g., "multitouch"/multiple finger contacts and/or stylus contacts). In some embodiments, contact/motion module 130 and display controller 156 detect contact on a touchpad.

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event. Similarly, tap, swipe, drag, and other gestures are optionally detected for a stylus by detecting a particular contact pattern for the stylus.

Graphics module 132 includes various known software components for rendering and displaying graphics on touch-sensitive display system 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 163 to produce tactile outputs at one or more locations on device 100 in response to user interactions with device 100.

Text input module 134, which is, optionally, a component of graphics module 132, provides soft keyboards for entering text in various applications (e.g., contacts 137, e-mail client 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 optionally include the following modules (or sets of instructions), or a subset or superset thereof:
    contacts module 137 (sometimes called an address book or contact list);
    telephone module 138;
    video conference module 139;
    e-mail client module 140;

instant messaging (IM) module 141;
workout support module 142;
camera module 143 for still and/or video images;
image management module 144;
browser module 147;
calendar module 148;
widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
widget creator module 150 for making user-created widgets 149-6;
search module 151;
video and music player module 152, which is, optionally, made up of a video player module and a music player module;
notes module 153;
map module 154; and/or
online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch-sensitive display system 112, display controller 156, contact module 130, graphics module 132, and text input module 134, contacts module 137 includes executable instructions to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers and/or e-mail addresses to initiate and/or facilitate communications by telephone 138, video conference 139, e-mail client 140, or IM 141; and so forth.

In conjunction with RF circuitry 108, audio circuitry 110, speaker 111, microphone 113, touch-sensitive display system 112, display controller 156, contact module 130, graphics module 132, and text input module 134, telephone module 138 includes executable instructions to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication optionally uses any of a plurality of communications standards, protocols and technologies.

In conjunction with RF circuitry 108, audio circuitry 110, speaker 111, microphone 113, touch-sensitive display system 112, display controller 156, optical sensor(s) 164, optical sensor controller 158, contact module 130, graphics module 132, text input module 134, contact list 137, and telephone module 138, video conference module 139 includes executable instructions to initiate, conduct, and terminate a video conference between a user and one or more other participants in accordance with user instructions.

In conjunction with RF circuitry 108, touch-sensitive display system 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch-sensitive display system 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, Apple Push Notification Service (APNs) or IMPS for Internet-based instant messages), to receive instant messages and to view received instant messages. In some embodiments, transmitted and/or received instant messages optionally include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, APNs, or IMPS).

In conjunction with RF circuitry 108, touch-sensitive display system 112, display controller 156, contact module 130, graphics module 132, text input module 134, GPS module 135, map module 154, and video and music player module 152, workout support module 142 includes executable instructions to create workouts (e.g., with time, distance, and/or calorie burning goals); communicate with workout sensors (in sports devices and smart watches); receive workout sensor data; calibrate sensors used to monitor a workout; select and play music for a workout; and display, store and transmit workout data.

In conjunction with touch-sensitive display system 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, and/or delete a still image or video from memory 102.

In conjunction with touch-sensitive display system 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch-sensitive display system 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch-sensitive display system 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch-sensitive display system 112, display system controller 156, contact module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch-sensitive display system 112, display system controller 156, contact module 130, graphics module 132, text input module 134, and browser module 147, the widget creator module 150 includes executable instructions to create widgets (e.g., turning a user-specified portion of a web page into a widget).

In conjunction with touch-sensitive display system 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch-sensitive display system 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch-sensitive display system 112, or on an external display connected wirelessly or via external port 124). In some embodiments, device 100 optionally includes the functionality of an MP3 player, such as an iPod (trademark of Apple Inc.).

In conjunction with touch-sensitive display system 112, display controller 156, contact module 130, graphics module 132, and text input module 134, notes module 153 includes executable instructions to create and manage notes, to do lists, and the like in accordance with user instructions.

In conjunction with RF circuitry 108, touch-sensitive display system 112, display system controller 156, contact module 130, graphics module 132, text input module 134, GPS module 135, and browser module 147, map module 154 includes executable instructions to receive, display, modify, and store maps and data associated with maps (e.g., driving directions; data on stores and other points of interest at or near a particular location; and other location-based data) in accordance with user instructions.

In conjunction with touch-sensitive display system 112, display system controller 156, contact module 130, graphics module 132, audio circuitry 110, speaker 111, RF circuitry 108, text input module 134, e-mail client module 140, and browser module 147, online video module 155 includes executable instructions that allow the user to access, browse, receive (e.g., by streaming and/or download), play back (e.g., on the touch screen 112, or on an external display connected wirelessly or via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
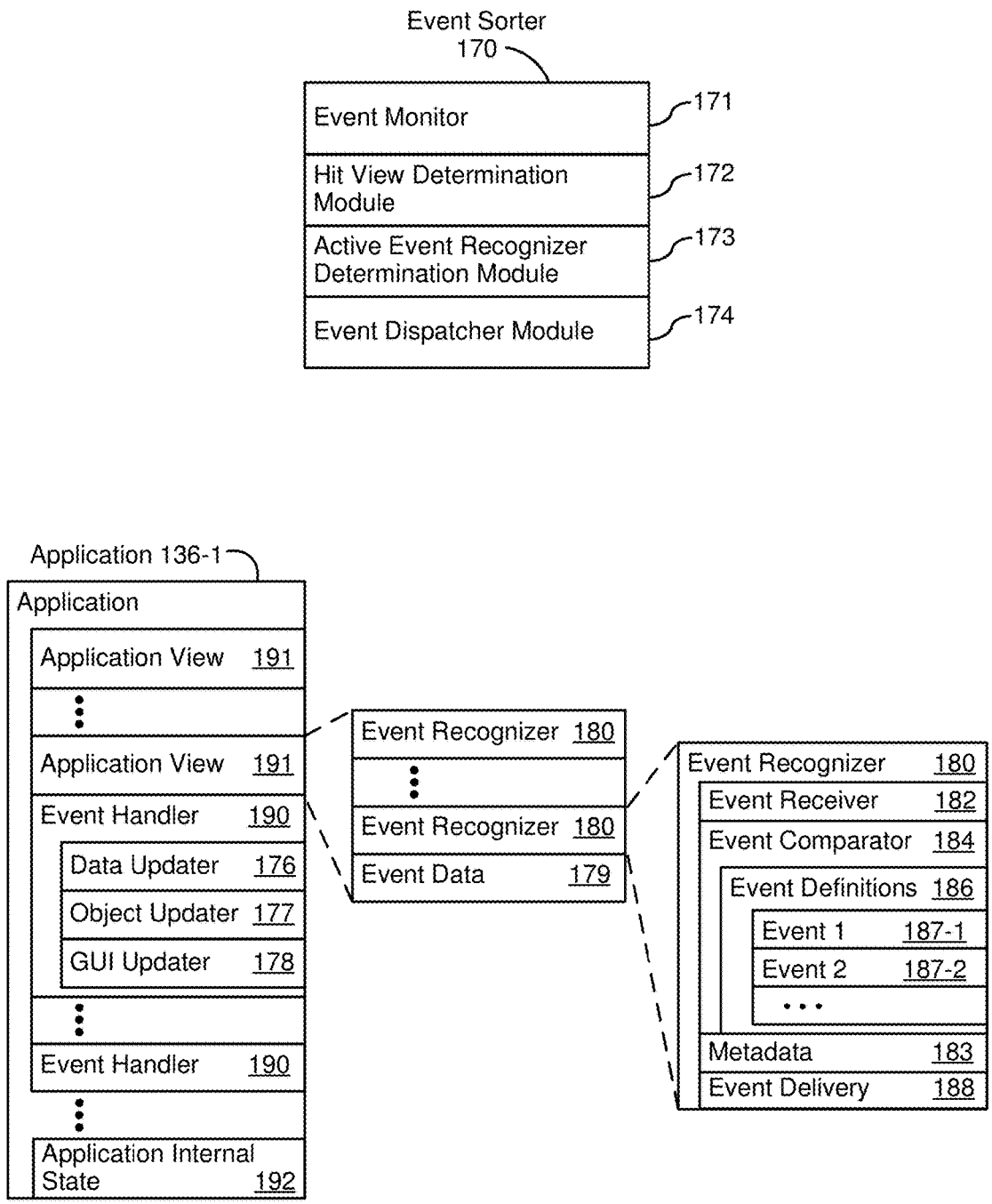
FIG. 1B is a block diagram illustrating example components for event handling in accordance with some embodiments.

FIG. 1B is a block diagram illustrating example components for event handling in accordance with some embodiments. In some embodiments, memory 102 (in FIG. 1A) or 370 (FIG. 3) includes event sorter 170 (e.g., in operating system 126) and a respective application 136-1 (e.g., any of the aforementioned applications 136, 137-155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display system 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display system 112, as part of a multi-touch gesture). Peripherals interface 118 transmits information it receives from I/O subsystem 106 or a sensor, such as proximity sensor 166, accelerometer(s) 167, gyroscope(s) 168, magnetometer(s) 169, and/or microphone 113 (through audio circuitry 110). Information that peripherals interface 118 receives from I/O subsystem 106 includes information from touch-sensitive display system 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch-sensitive display system 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in a respective event, such as event 1 (187-1) or event 2 (187-2), include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display system 112, and lift-off of the touch (touch end). In some embodiments, the event also includes information for one or more associated event handlers 190.

In some embodiments, the event definition for a respective event, such as event 1 (187-1) or event 2 (187-2), includes a definition of an event for a respective user-interface object. In some embodiments, event comparator 184 performs a hit test to determine which user-interface object is associated with a sub-event. For example, in an application view in which three user-interface objects are displayed on touch-sensitive display system 112, when a touch is detected on touch-sensitive display system 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event, such as event 1 (187-1) or event 2 (187-2), also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module 145. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens. For example, mouse movement and mouse button presses, optionally coordinated with single or multiple keyboard presses or holds; contact movements such as taps, drags, scrolls, etc., on touch-pads; pen stylus inputs; movement of the device; oral instructions; detected eye movements; biometric inputs; and/or any combination thereof are optionally utilized as inputs corresponding to sub-events which define an event to be recognized.

Figure 2:
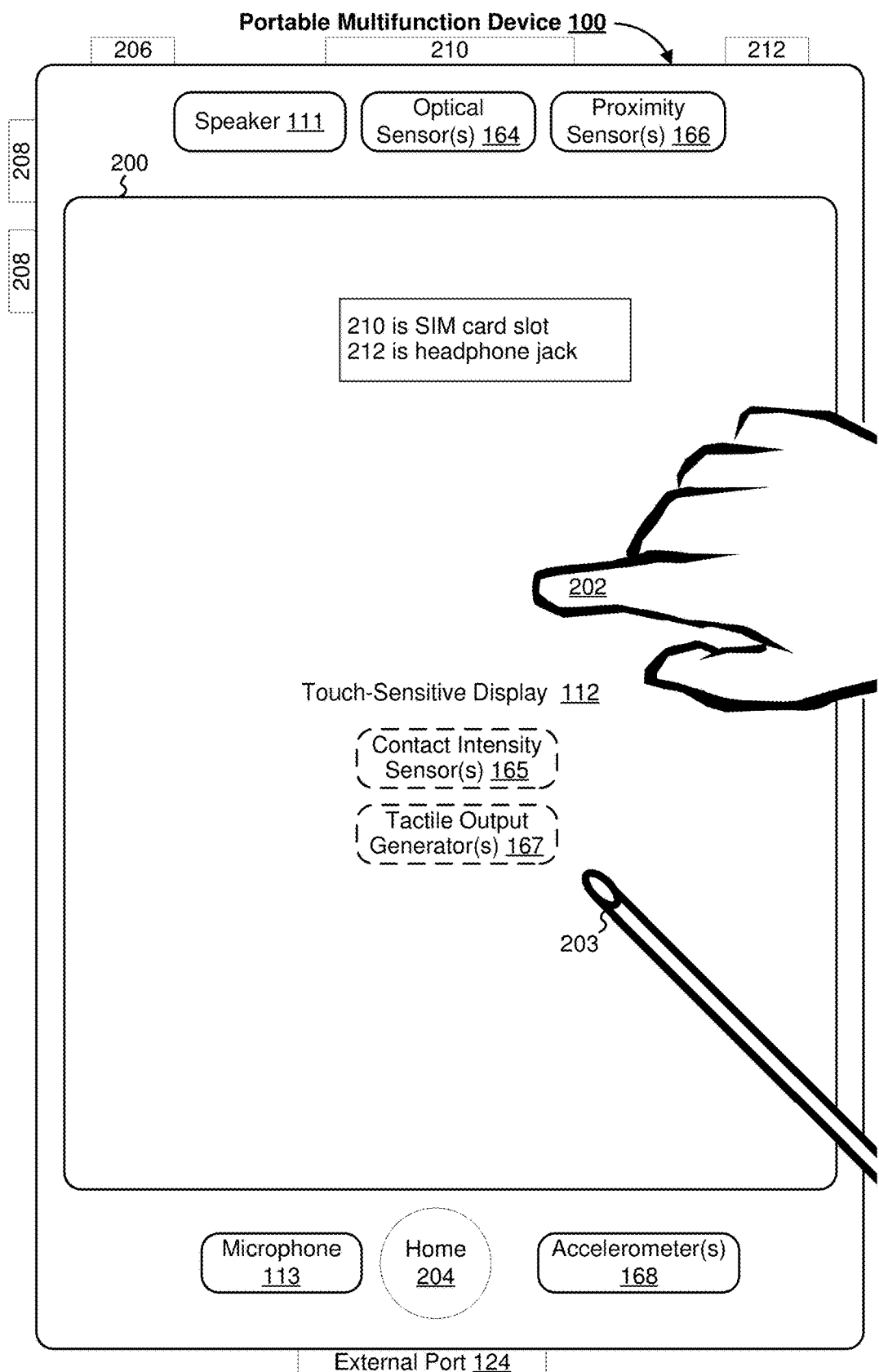
FIG. 2 illustrates a portable multifunction device having a touch screen in accordance with some embodiments.

FIG. 2 illustrates a portable multifunction device 100 having a touch screen (e.g., touch-sensitive display system 112, FIG. 1A) in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As described previously, menu button 204 is, optionally, used to navigate to any application 136 in a set of applications that are, optionally executed on device 100. Alternatively, in some embodiments, the menu button is implemented as a soft key in a GUI displayed on the touch-screen display.

In some embodiments, device 100 includes the touch-screen display, menu button 204, push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In some embodiments, device 100 also accepts verbal input for activation or deactivation of some functions through microphone 113. Device 100 also, optionally, includes one or more contact intensity sensors 165 for detecting intensity of contacts on touch-sensitive display system 112 and/or one or more tactile output generators 163 for generating tactile outputs for a user of device 100.

FIG. 3 is a block diagram of an example multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch-screen display. I/O interface 330 also optionally includes a keyboard and/or mouse (or other pointing device) 350 and touchpad 355, tactile output generator 357 for generating tactile outputs on device 300 (e.g., similar to tactile output generator(s) 163 described above with reference to FIG. 1A), sensors 359 (e.g., touch-sensitive, optical, contact intensity, proximity, acceleration, attitude, and/or magnetic sensors similar to sensors 112, 164, 165, 166, 167, 168, and 169 described above with reference to FIG. 1A). Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above identified elements in FIG. 3 are, optionally, stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules are, optionally, combined or otherwise re-arranged in various embodiments. In some embodiments, memory 370 optionally stores a subset of the modules and data structures identified above. Furthermore, memory 370 optionally stores additional modules and data structures not described above.

Attention is now directed toward embodiments of user interfaces ("UI") that are, optionally, implemented on portable multifunction device 100.

Figure 4A:
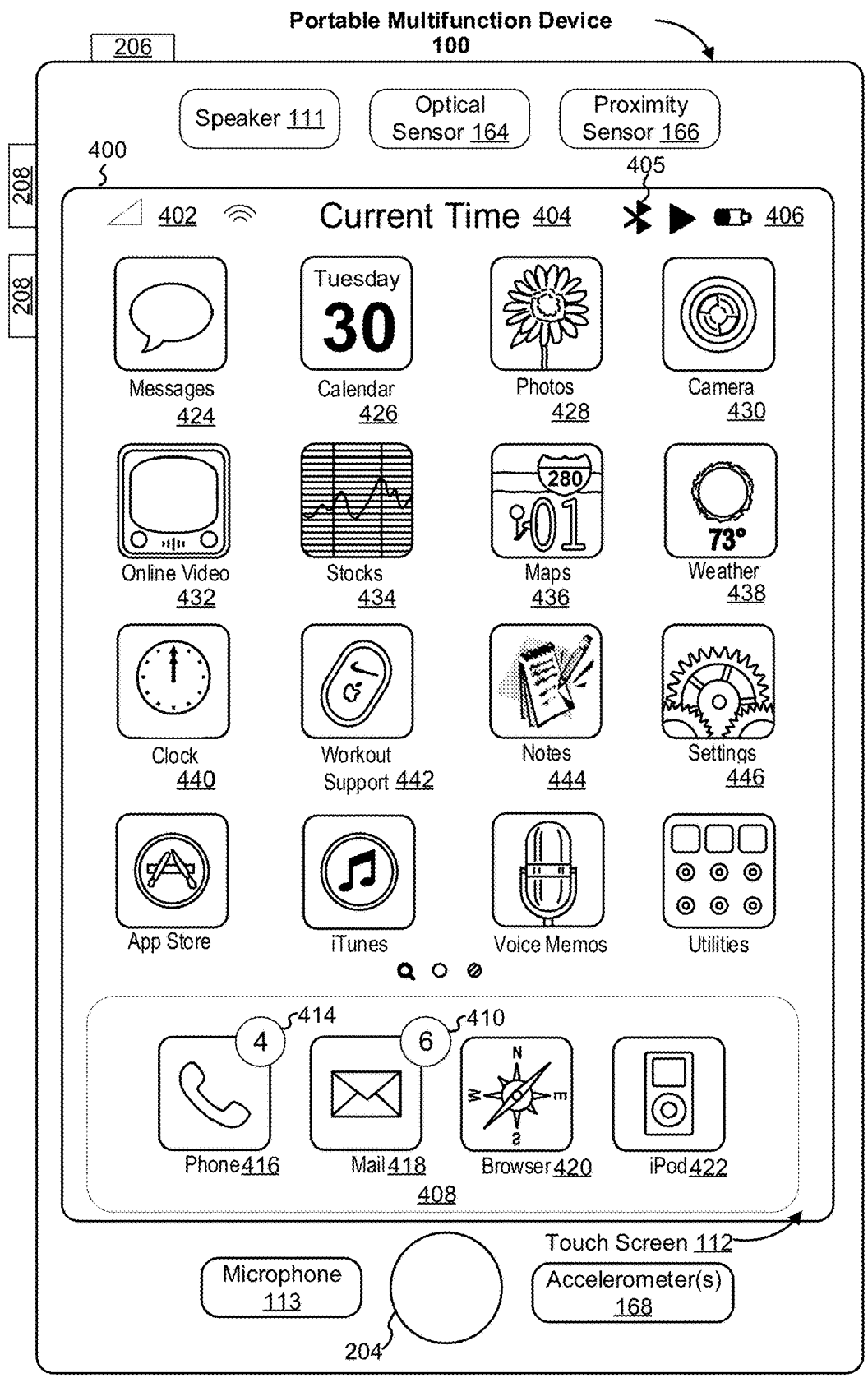
FIG. 4A illustrates an example user interface for a menu of applications on a portable multifunction device in accordance with some embodiments.

FIG. 4A illustrates an example user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Icon 416 for telephone module 138, labeled "Phone," which optionally includes an indicator 414 of the number of missed calls or voicemail messages;
  Icon 418 for e-mail client module 140, labeled "Mail," which optionally includes an indicator 410 of the number of unread e-mails;
  Icon 420 for browser module 147, labeled "Browser"; and
  Icon 422 for video and music player module 152, also referred to as iPod (trademark of Apple Inc.) module 152, labeled "iPod"; and
Icons for other applications, such as:
  Icon 424 for IM module 141, labeled "Text";
  Icon 426 for calendar module 148, labeled "Calendar";
  Icon 428 for image management module 144, labeled "Photos";
  Icon 430 for camera module 143, labeled "Camera";
  Icon 432 for online video module 155, labeled "Online Video";
  Icon 434 for stocks widget 149-2, labeled "Stocks";
  Icon 436 for map module 154, labeled "Map";
  Icon 438 for weather widget 149-1, labeled "Weather";
  Icon 440 for alarm clock widget 169-6, labeled "Clock";
  Icon 442 for workout support module 142, labeled "Workout Support";
  Icon 444 for notes module 153, labeled "Notes"; and
  Icon 446 for a settings application or module, which provides access to settings for device 100 and its various applications 136.

It should be noted that the icon labels illustrated in FIG. 4A are merely examples. For example, in some embodiments, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
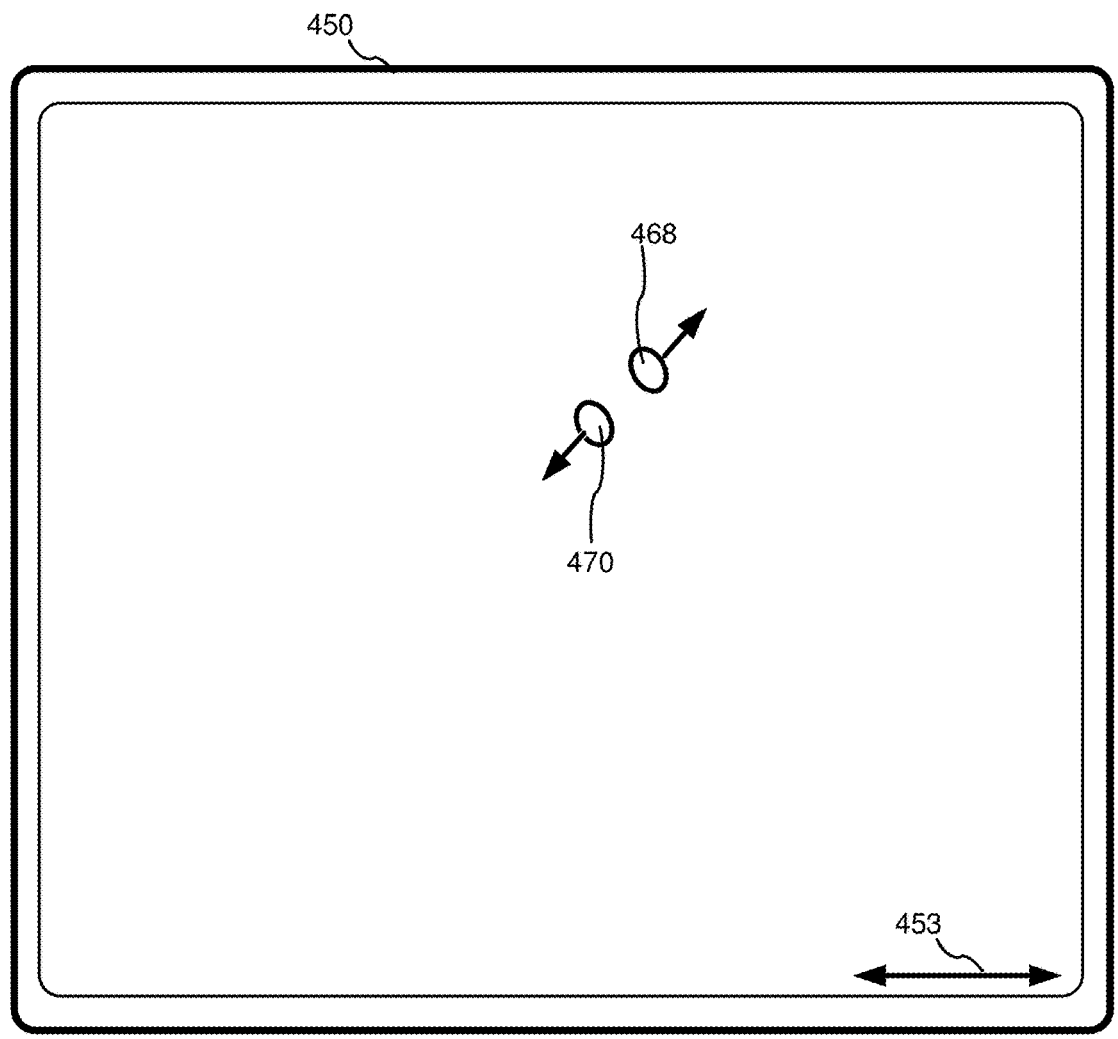
FIG. 4B illustrates an example user interface for a multifunction device with a touch-sensitive surface that is separate from the display in accordance with some embodiments.
Figure 4B:
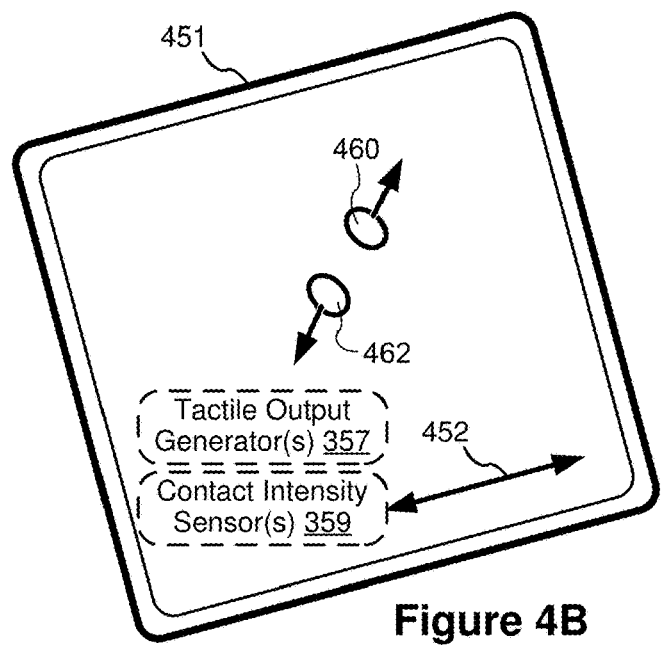

FIG. 4B illustrates an example user interface on a device (e.g., device 300, FIG. 3) with a touch-sensitive surface 451 (e.g., a tablet or touchpad 355, FIG. 3) that is separate from the display 450. Device 300 also, optionally, includes one or more contact intensity sensors (e.g., one or more of sensors 359) for detecting intensity of contacts on touch-sensitive surface 451 and/or one or more tactile output generators 359 for generating tactile outputs for a user of device 300.

FIG. 4B illustrates an example user interface on a device (e.g., device 300, FIG. 3) with a touch-sensitive surface 451 (e.g., a tablet or touchpad 355, FIG. 3) that is separate from the display 450. Although many of the examples that follow will be given with reference to inputs on touch screen display 112 (where the touch sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures, etc.), it should be understood that, in some embodiments, one or more of the finger inputs are replaced with input from another input device (e.g., a mouse based input or a stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

As used herein, the term "focus selector" refers to an input element that indicates a current part of a user interface with which a user is interacting. In some implementations that include a cursor or other location marker, the cursor acts as a "focus selector," so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider or other user interface element), the particular user interface element is adjusted in accordance with the detected input. In some implementations that include a touch-screen display (e.g., touch-sensitive display system 112 in FIG. 1A or the touch screen in FIG. 4A) that enables direct interaction with user interface elements on the touch-screen display, a detected contact on the touch-screen acts as a "focus selector," so that when an input (e.g., a press input by the contact) is detected on the touch-screen display at a location of a particular user interface element (e.g., a button, window, slider or other user interface element), the particular user interface element is adjusted in accordance with the detected input. In some implementations, focus is moved from one region of a user interface to another region of the user interface without corresponding movement of a cursor or movement of a contact on a touch-screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch-screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "intensity" of a contact on a touch-sensitive surface refers to the force or pressure (force per unit area) of a contact (e.g., a finger contact or a stylus contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average or a sum) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be readily accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

In some embodiments, contact/motion module 130 and/or 430 uses a set of one or more intensity thresholds to determine whether an operation has been performed by a user (e.g., to determine whether a user has "clicked" on an icon). In some embodiments, at least a subset of the intensity thresholds is determined in accordance with software parameters (e.g., the intensity thresholds are not determined by the activation thresholds of particular physical actuators and can be adjusted without changing the physical hardware of device 100). For example, a mouse "click" threshold of a trackpad or touch-screen display can be set to any of a large range of predefined threshold values without changing the trackpad or touch-screen display hardware. Additionally, in some embodiments, a user of the device is provided with software settings for adjusting one or more of the set of intensity thresholds (e.g., by adjusting individual intensity thresholds and/or by adjusting a plurality of intensity thresholds at once with a system-level click "intensity" parameter).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds may include a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second intensity threshold results in a third operation. In some embodiments, a comparison between the characteristic intensity and one or more intensity thresholds is used to determine whether or not to perform one or more operations (e.g., whether to perform a respective option or forgo performing the respective operation) rather than being used to determine whether to perform a first operation or a second operation.

In some embodiments, a portion of a gesture is identified for purposes of determining a characteristic intensity. For example, a touch-sensitive surface may receive a continuous swipe contact transitioning from a start location and reaching an end location (e.g., a drag gesture), at which point the intensity of the contact increases. In this example, the characteristic intensity of the contact at the end location may be based on only a portion of the continuous swipe contact, and not the entire swipe contact (e.g., only the portion of the swipe contact at the end location). In some embodiments, a smoothing algorithm may be applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The user interface figures described below optionally include various intensity diagrams that show the current intensity of the contact on the touch-sensitive surface relative to one or more intensity thresholds (e.g., a contact detection intensity threshold $IT_0$, a light press intensity threshold $IT_L$, a deep press intensity threshold $IT_D$, and/or one or more other intensity thresholds). This intensity diagram is typically not part of the displayed user interface, but is provided to aid in the interpretation of the figures. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold $IT_0$ below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

In some embodiments, the response of the device to inputs detected by the device depends on criteria based on the contact intensity during the input. For example, for some "light press" inputs, the intensity of a contact exceeding a first intensity threshold during the input triggers a first response. In some embodiments, the response of the device to inputs detected by the device depends on criteria that include both the contact intensity during the input and time-based criteria. For example, for some "deep press" inputs, the intensity of a contact exceeding a second intensity threshold during the input, greater than the first intensity threshold for a light press, triggers a second response only if a delay time has elapsed between meeting the first intensity threshold and meeting the second intensity threshold. This delay time is typically less than 200 ms in duration (e.g., 40, 100, or 120 ms, depending on the magnitude of the second intensity threshold, with the delay time increasing as the second intensity threshold increases). This delay time helps to avoid accidental deep press inputs. As another example, for some "deep press" inputs, there is a reduced-sensitivity time period that occurs after the time at which the first intensity threshold is met. During the reduced-sensitivity time period, the second intensity threshold is increased. This temporary increase in the second intensity threshold also helps to avoid accidental deep press inputs. For other deep press inputs, the response to detection of a deep press input does not depend on time-based criteria.

In some embodiments, one or more of the input intensity thresholds and/or the corresponding outputs vary based on one or more factors, such as user settings, contact motion, input timing, application running, rate at which the intensity is applied, number of concurrent inputs, user history, environmental factors (e.g., ambient noise), focus selector position, and the like. Example factors are described in U.S. patent application Ser. Nos. 14/399,606 and 14/624,296, which are incorporated by reference herein in their entireties.

An increase of characteristic intensity of the contact from an intensity below the light press intensity threshold $IT_L$ to an intensity between the light press intensity threshold $IT_L$ and the deep press intensity threshold $IT_D$ is sometimes referred to as a "light press" input. An increase of characteristic intensity of the contact from an intensity below the deep press intensity threshold $IT_D$ to an intensity above the deep press intensity threshold $IT_D$ is sometimes referred to as a "deep press" input. An increase of characteristic intensity of the contact from an intensity below the contact-detection intensity threshold $IT_0$ to an intensity between the contact-detection intensity threshold $IT_0$ and the light press intensity threshold $IT_L$ is sometimes referred to as detecting the contact on the touch-surface. A decrease of characteristic intensity of the contact from an intensity above the contact-detection intensity threshold $IT_0$ to an intensity below the contact-detection intensity threshold $IT_0$ is sometimes referred to as detecting liftoff of the contact from the touch-surface. In some embodiments $IT_0$ is zero. In some embodiments, $IT_0$ is greater than zero. In some illustrations a shaded circle or oval is used to represent intensity of a contact on the touch-sensitive surface. In some illustrations, a circle or oval without shading is used represent a respective contact on the touch-sensitive surface without specifying the intensity of the respective contact.

In some embodiments, described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., the respective operation is performed on a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., the respective operation is performed on an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., the respective operation is performed on an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the description of operations performed in response to a press input associated with a press-input intensity threshold or in response to a gesture including the press input are, optionally, triggered in response to detecting: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold. As described above, in some embodiment, the triggering of these responses also depends on time-based criteria being met (e.g., a delay time has elapsed between a first intensity threshold being met and a second intensity threshold being met).

User Interfaces and Associated Processes

Attention is now directed toward embodiments of user interfaces ("UI") and associated processes that may be implemented on an electronic device, such as portable multifunction device 100 or device 300, with a display, a touch-sensitive surface, and one or more sensors to detect intensity of contacts with the touch-sensitive surface.

Figure 5A:
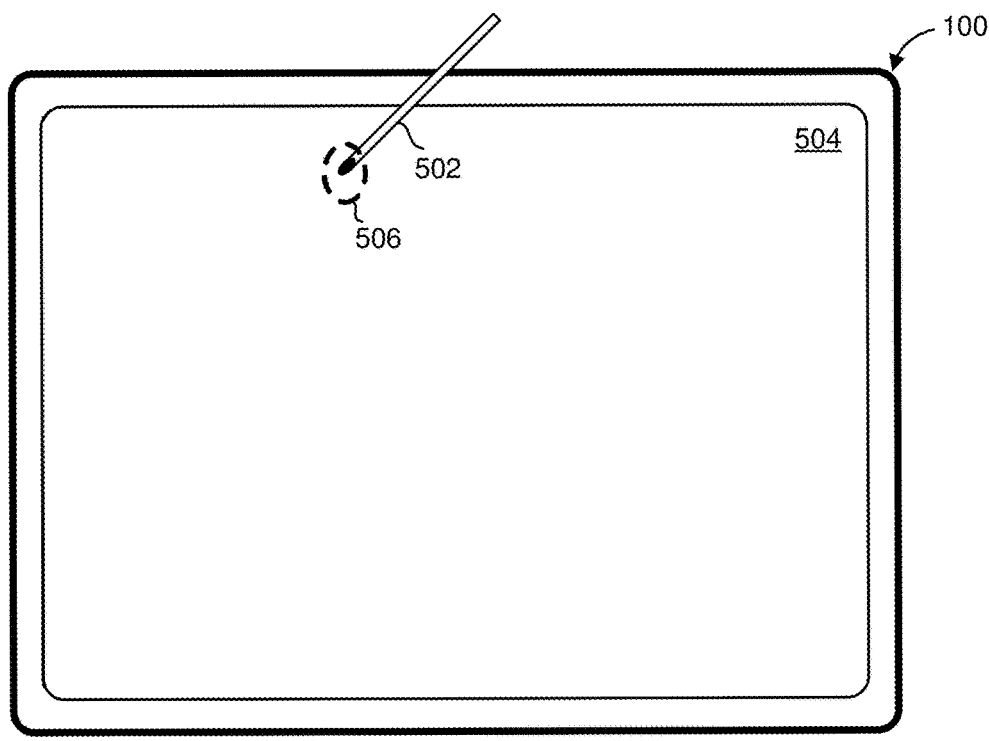
FIGS. 5A-5Z illustrate example user interfaces for interacting with handwritten text in accordance with some embodiments.
Figure 5B:
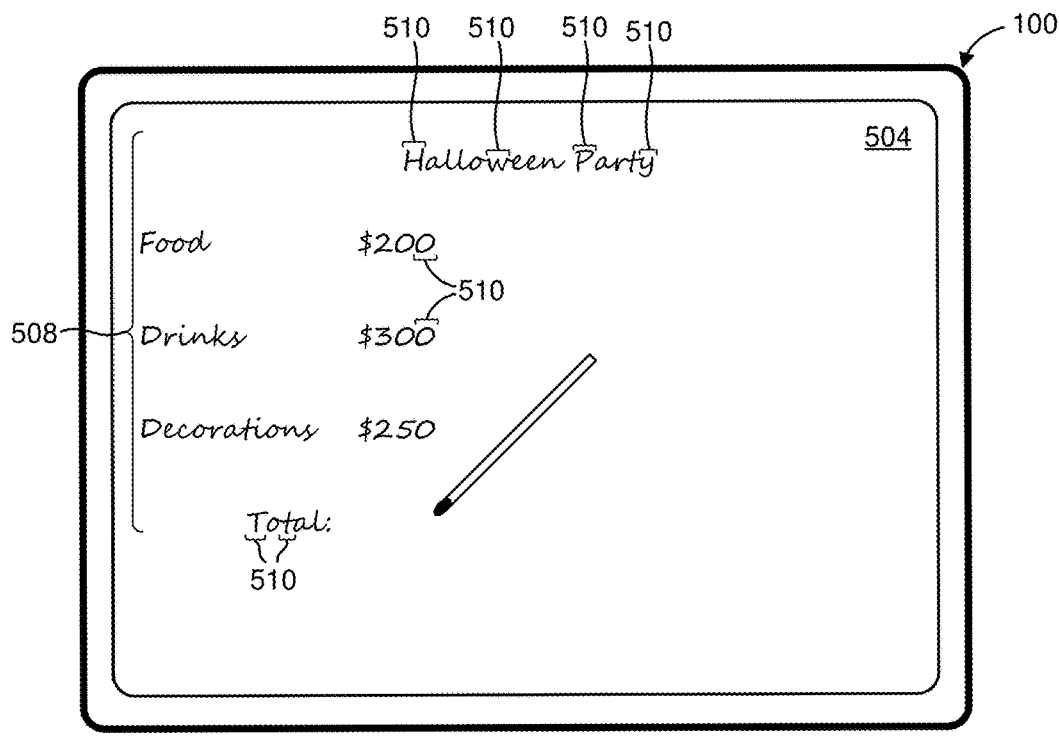
Figure 5C:
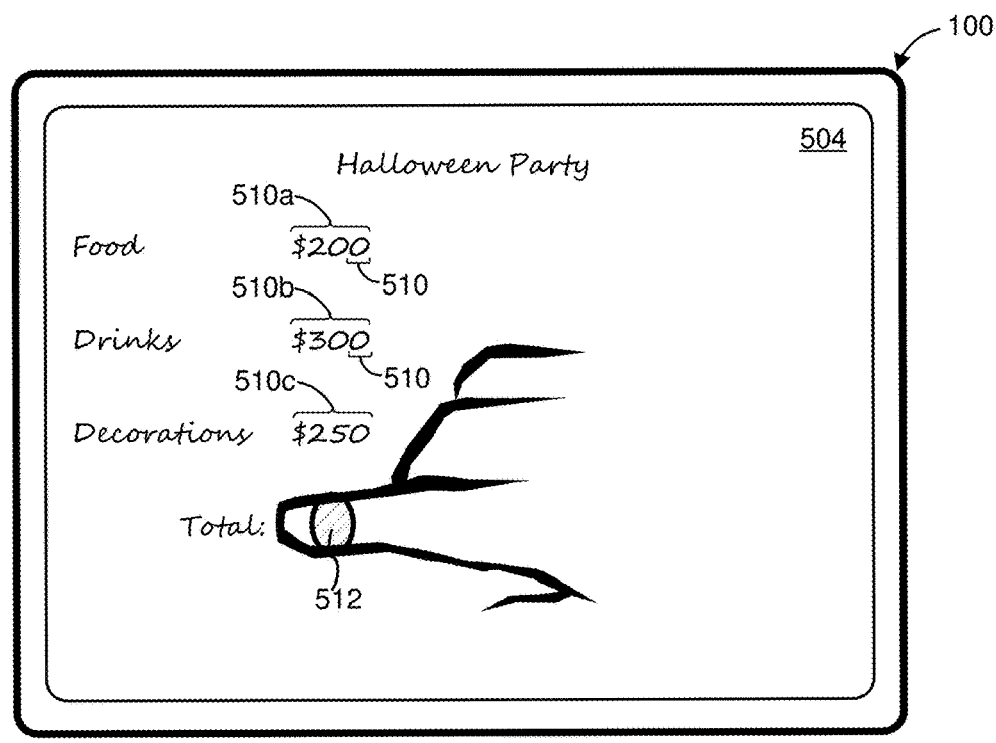
Figure 5D:
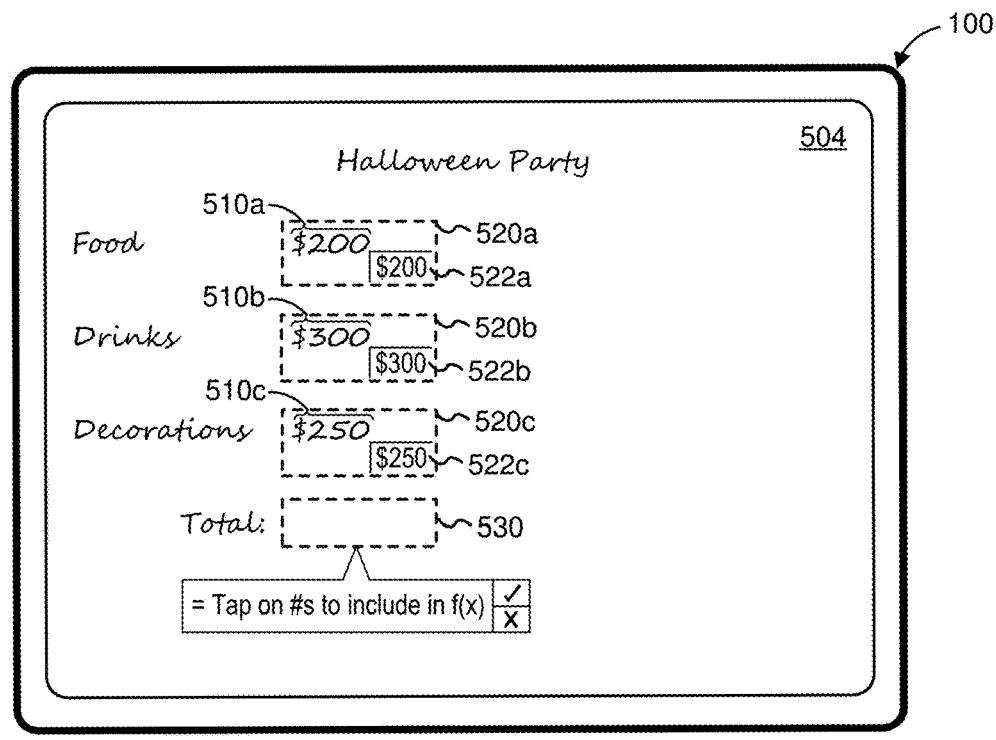
Figure 5E:
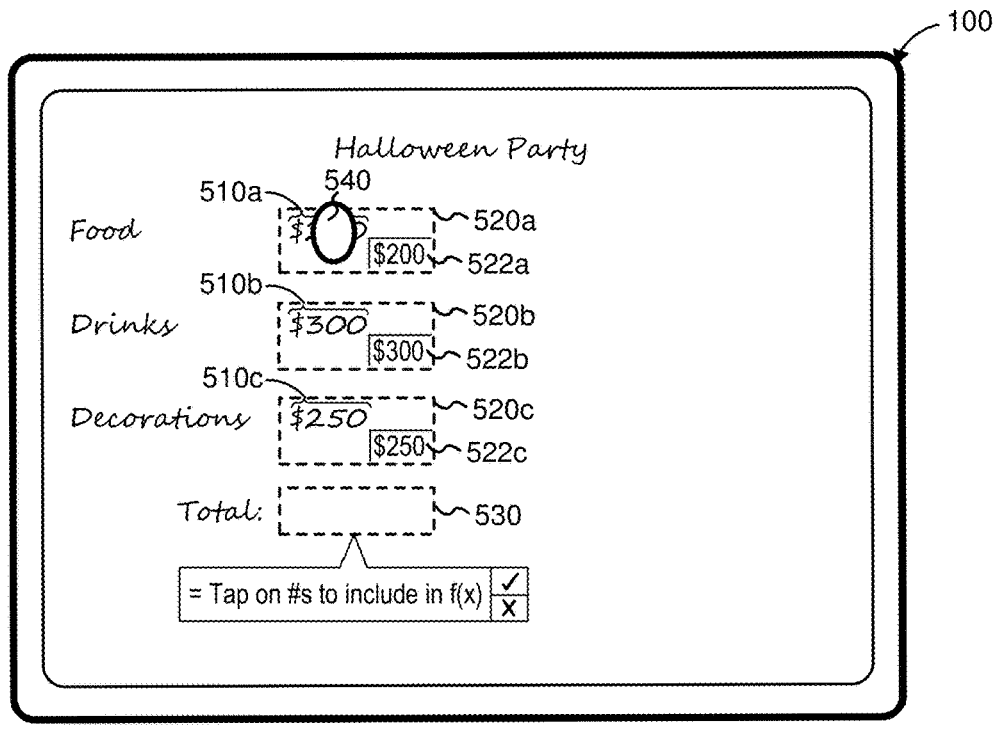
Figure 5F:
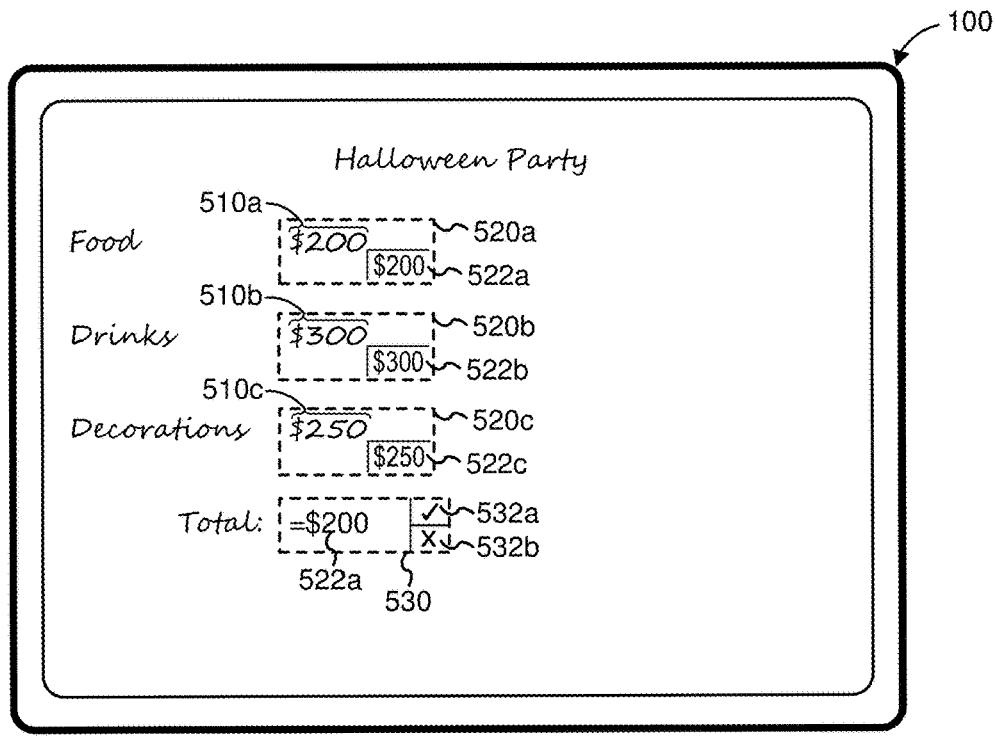
Figure 5G:
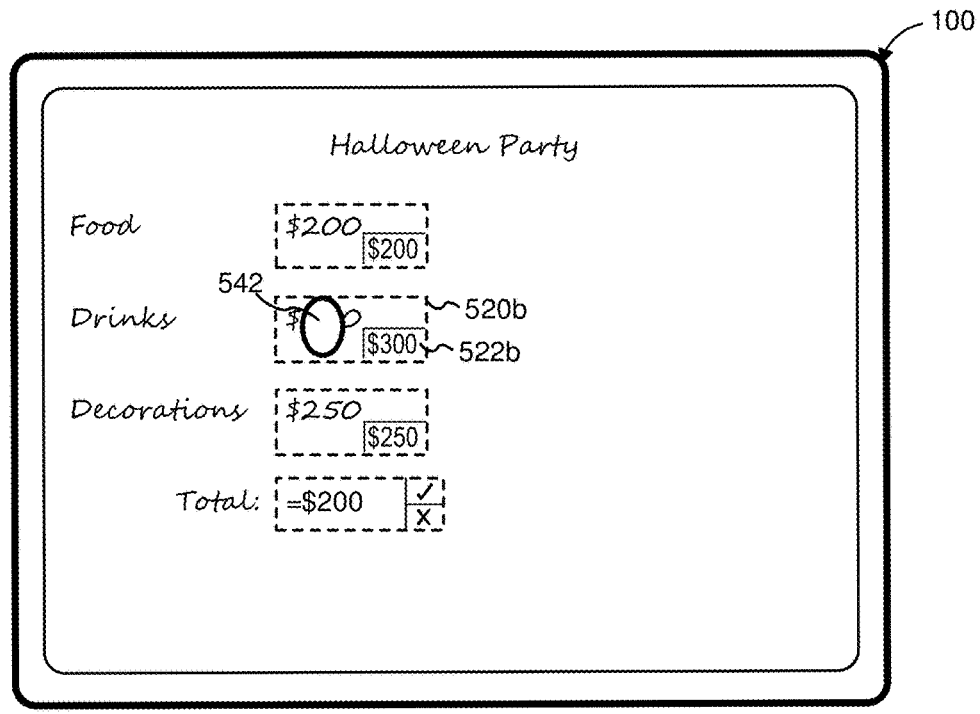
Figure 5H:
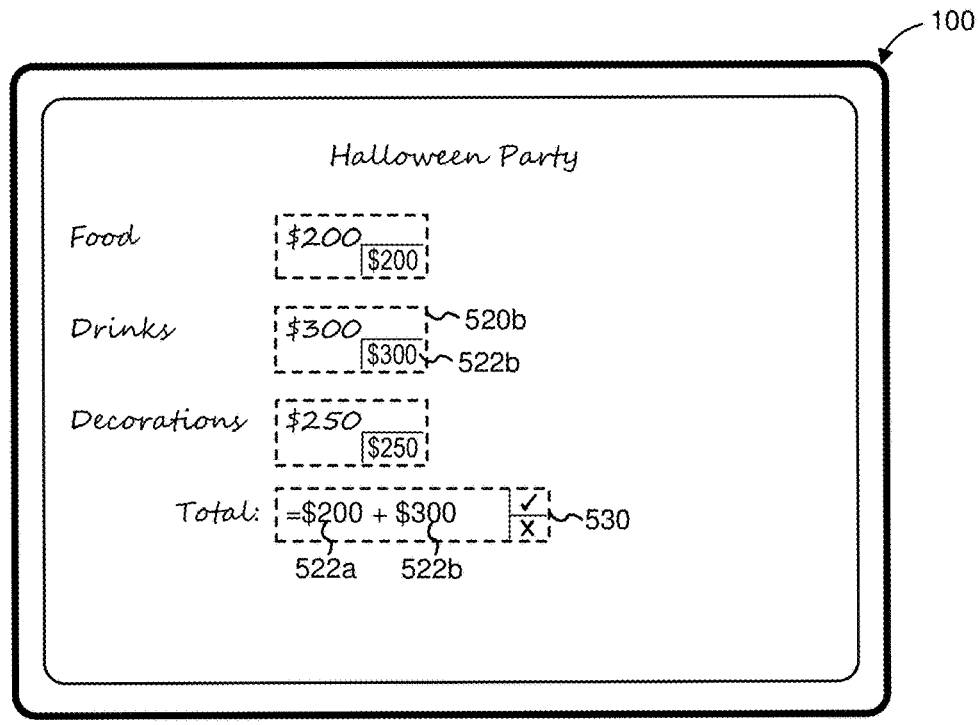
Figure 5I:
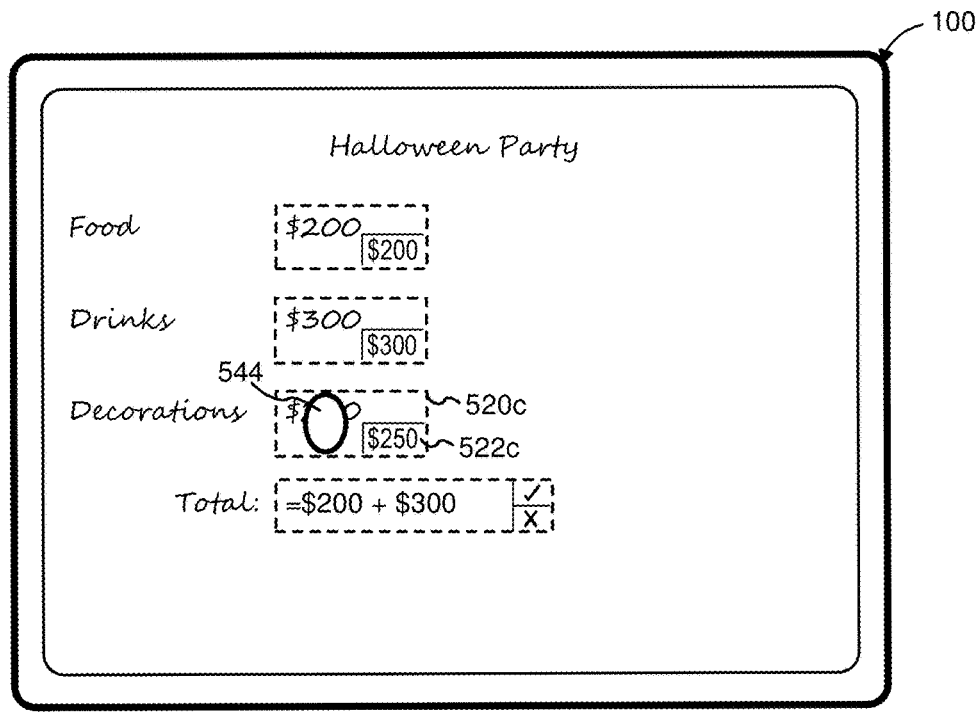
Figure 5J:
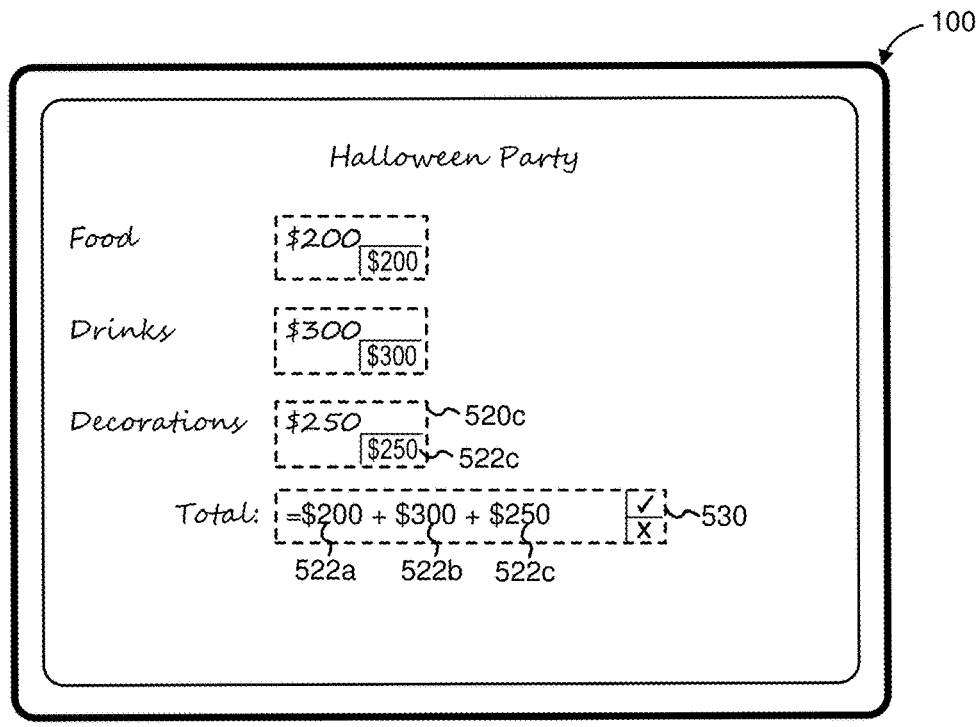
Figure 5K:
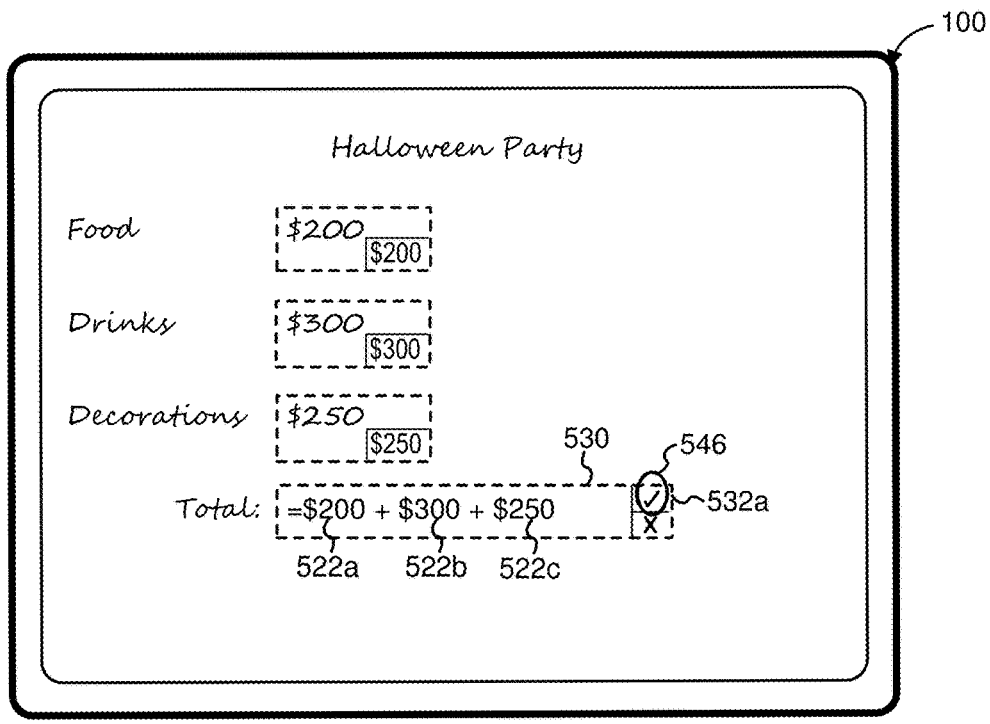
Figure 5L:
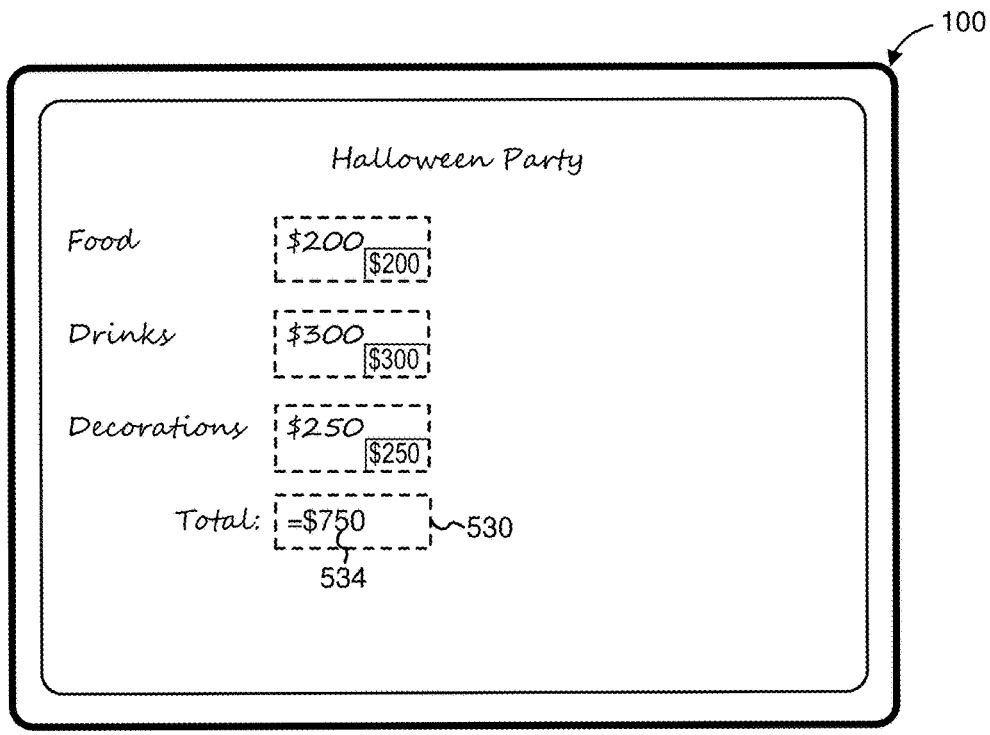
Figure 5M:
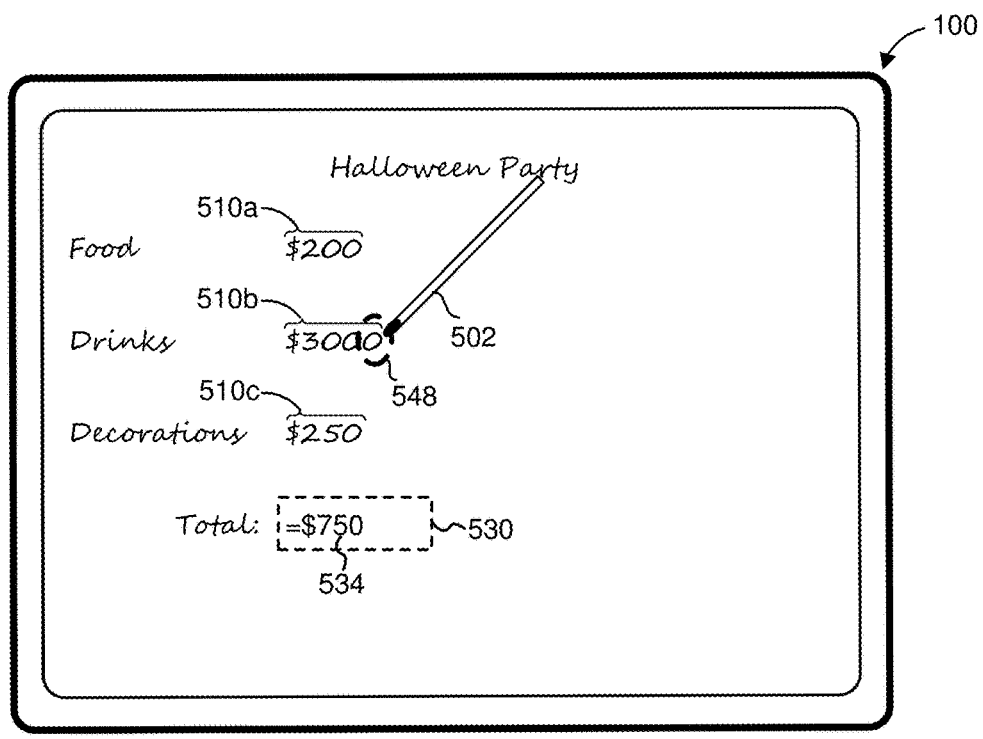
Figure 5N:
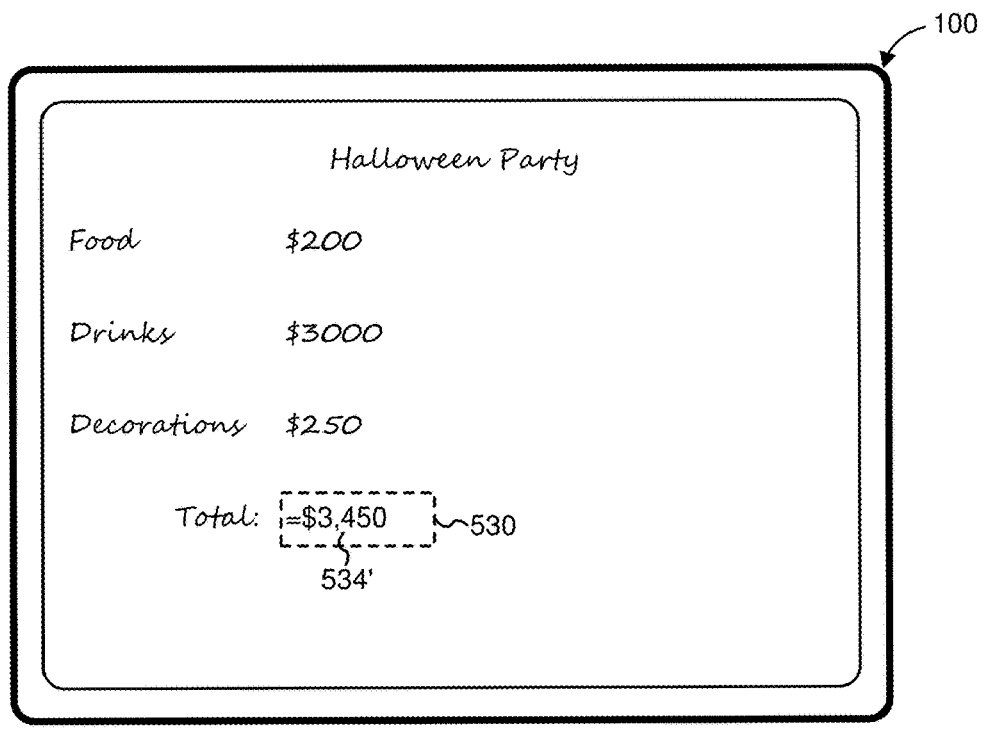
Figure 5O:
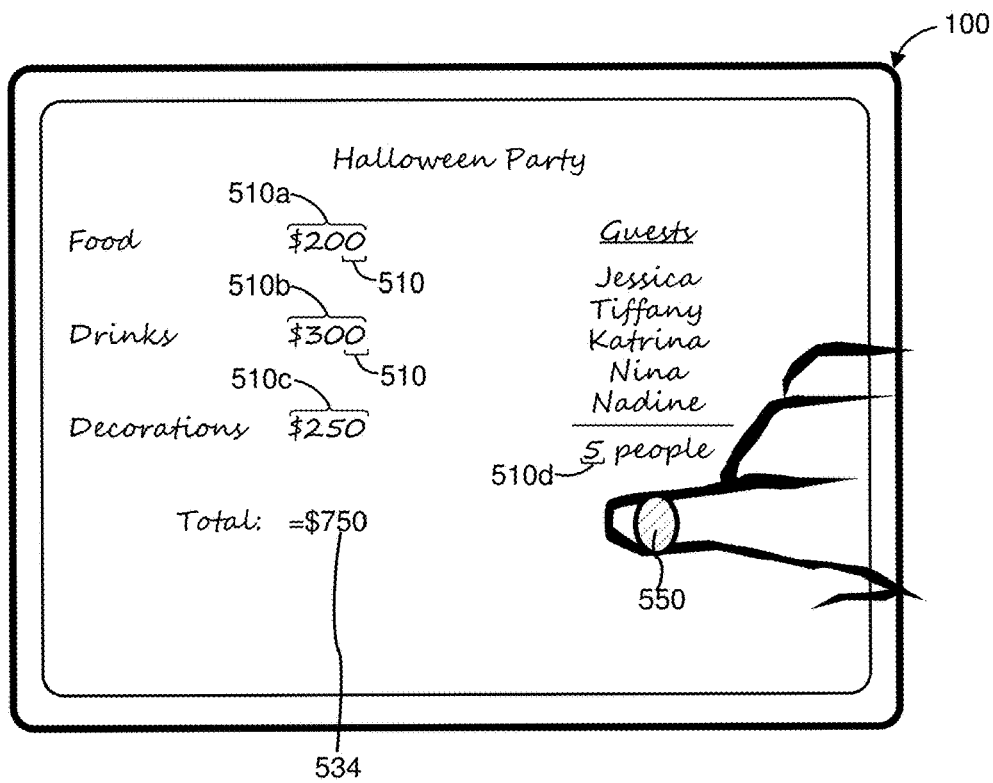
Figure 5P:
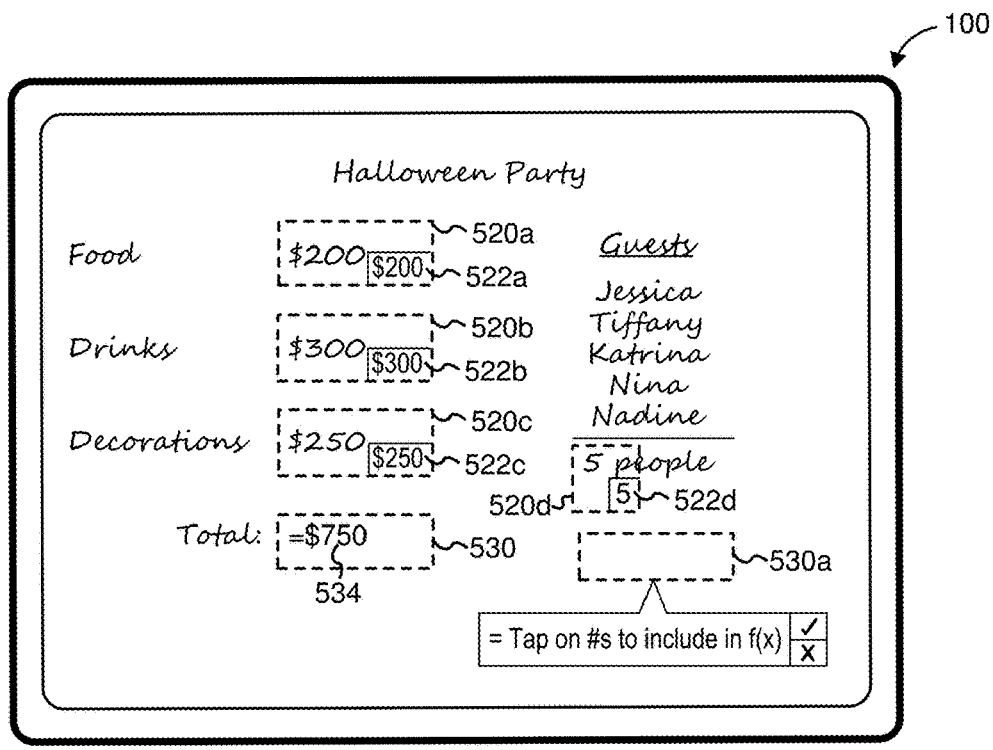
Figure 5Q:
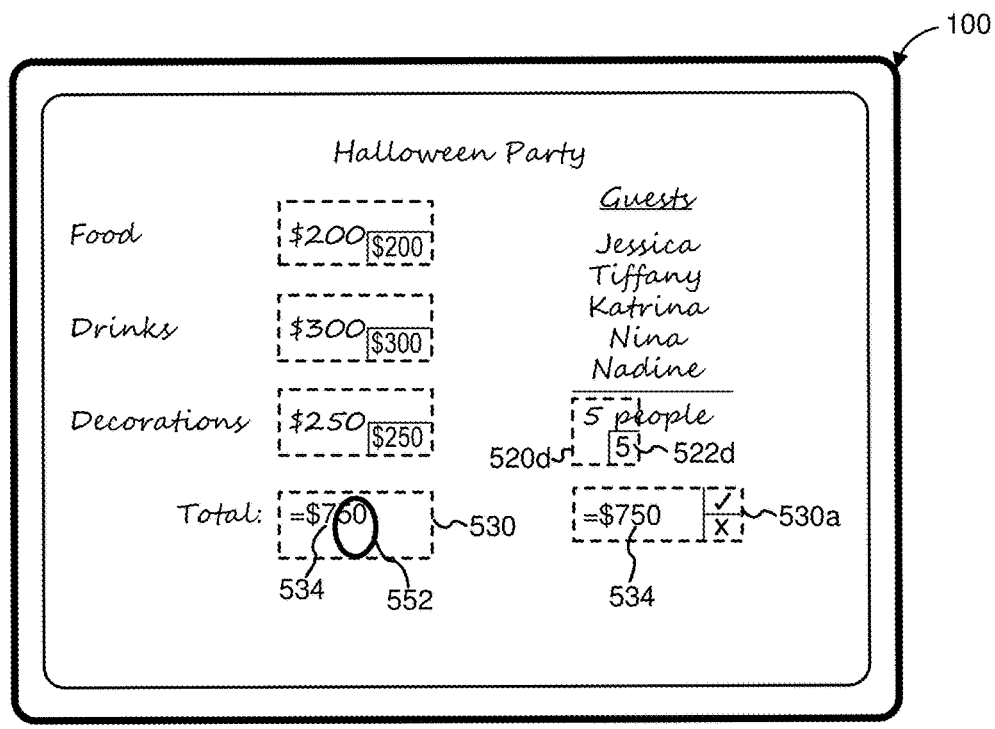
Figure 5R:
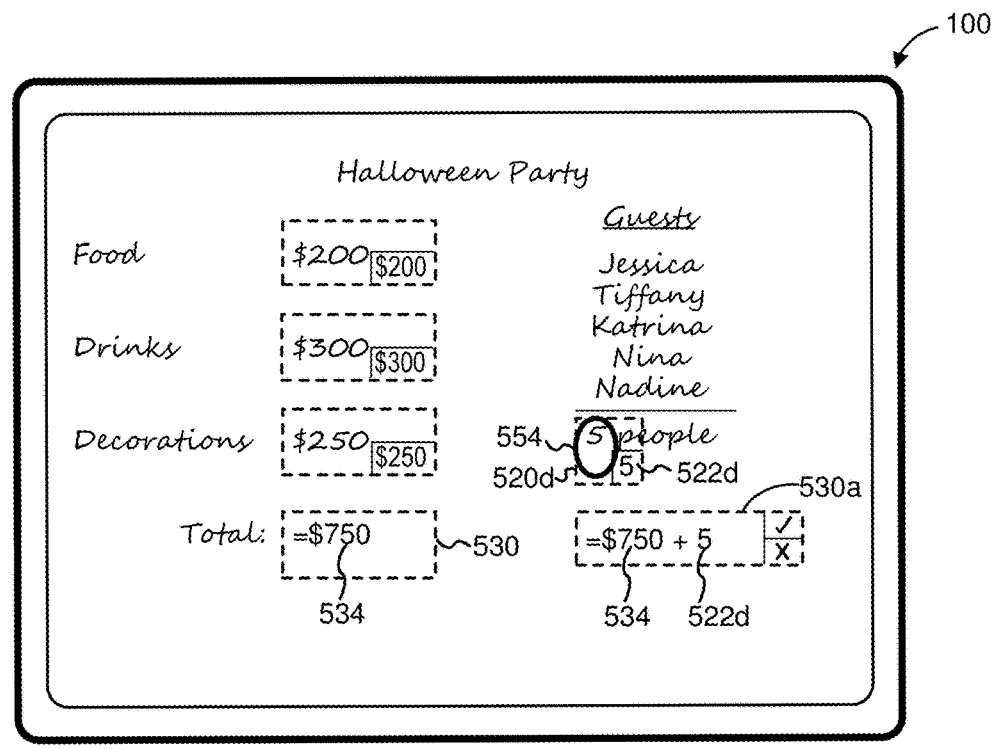
Figures 5S, 5T:
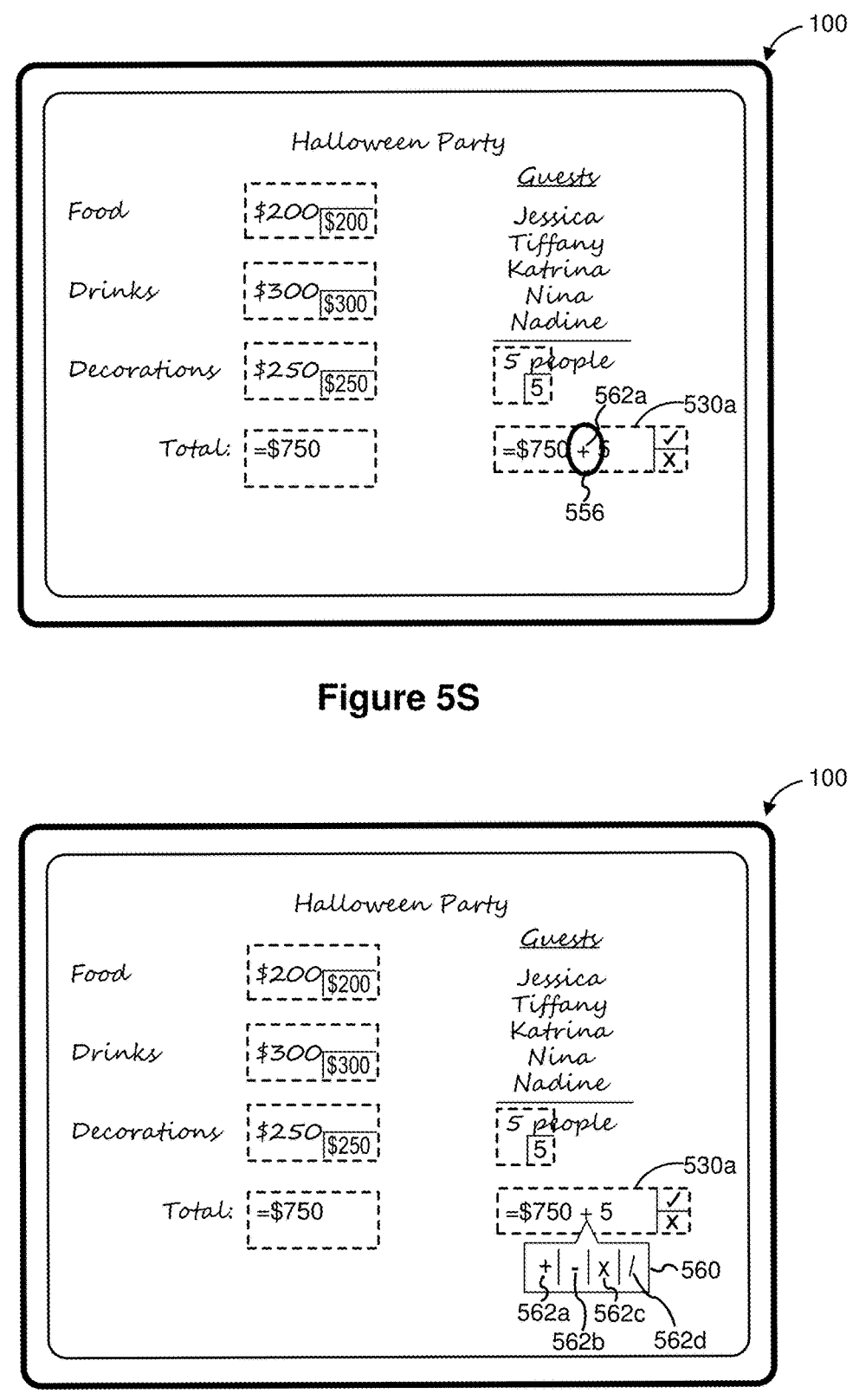
Figure 5W:
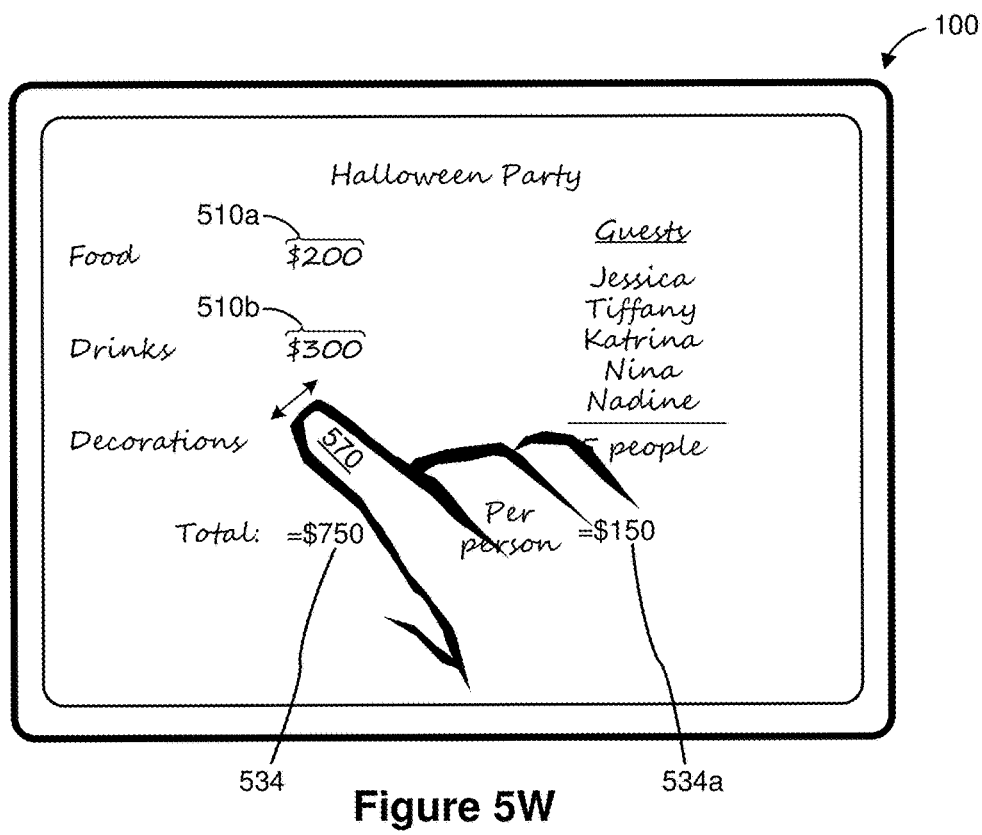
Figure 5X:
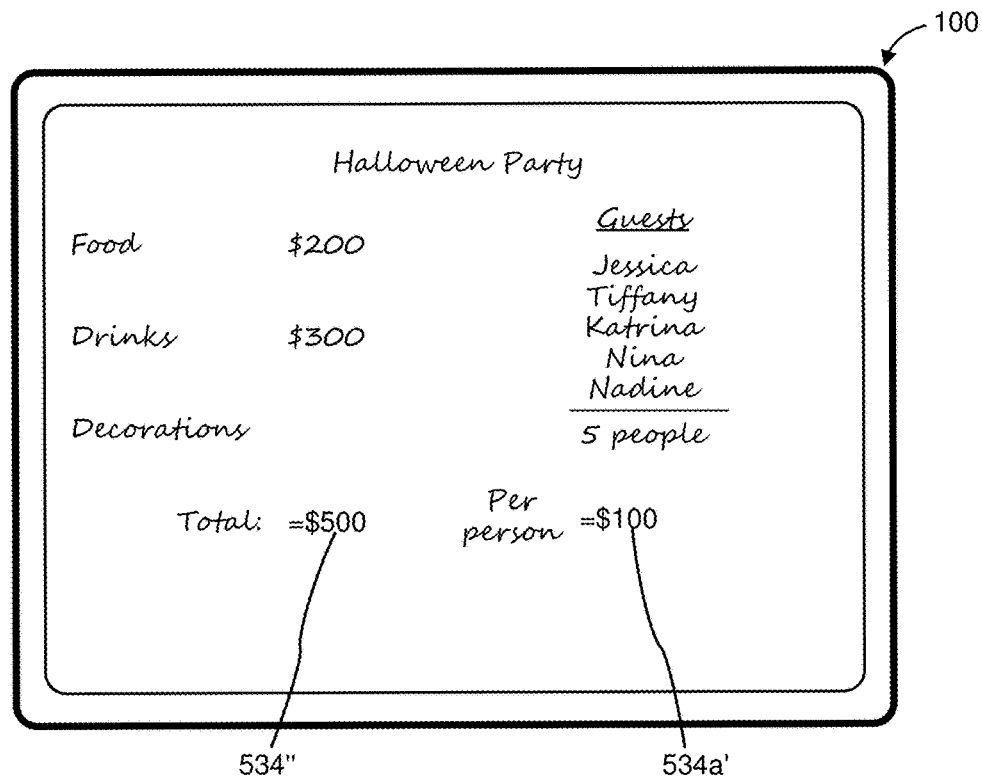
Figure 5Y:
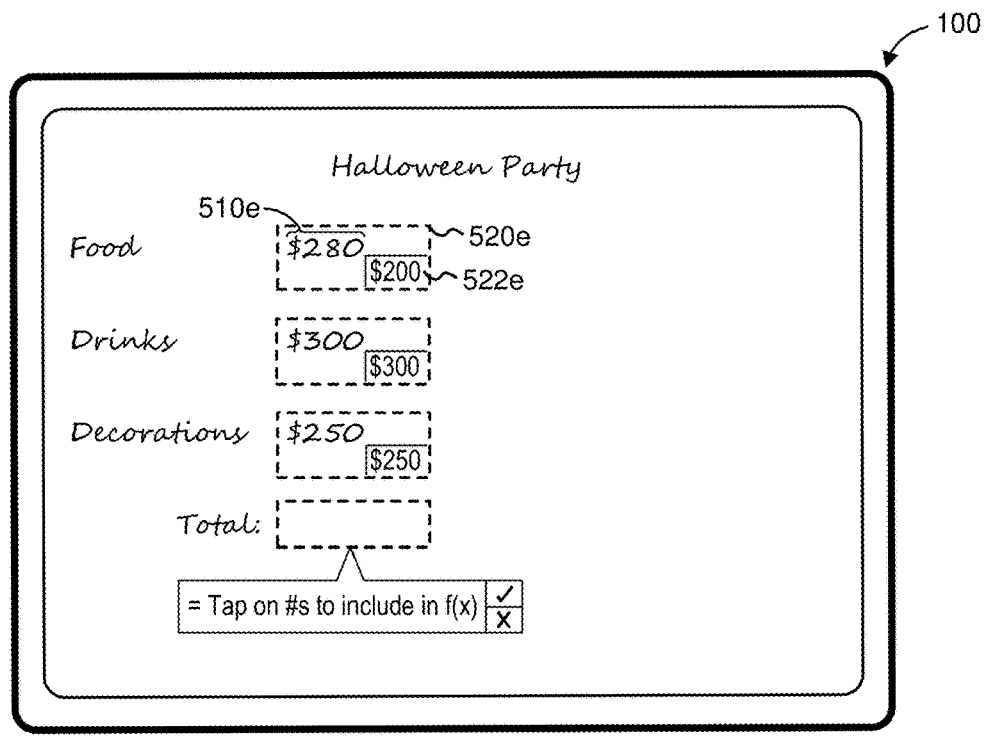
Figure 5Z:
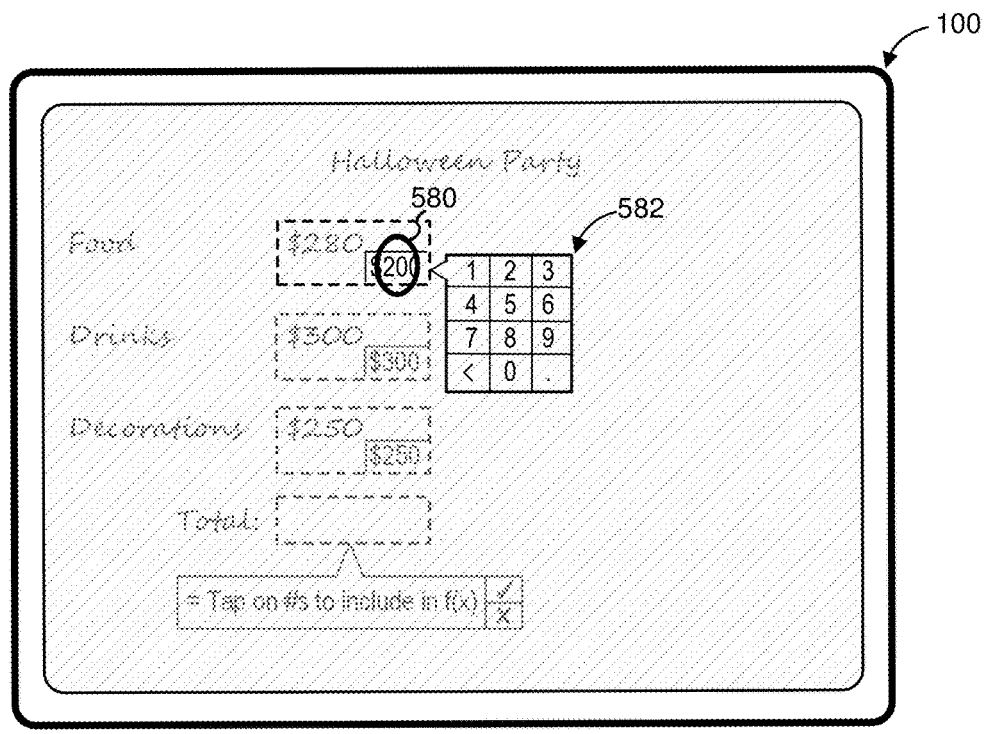
Figure 6A:
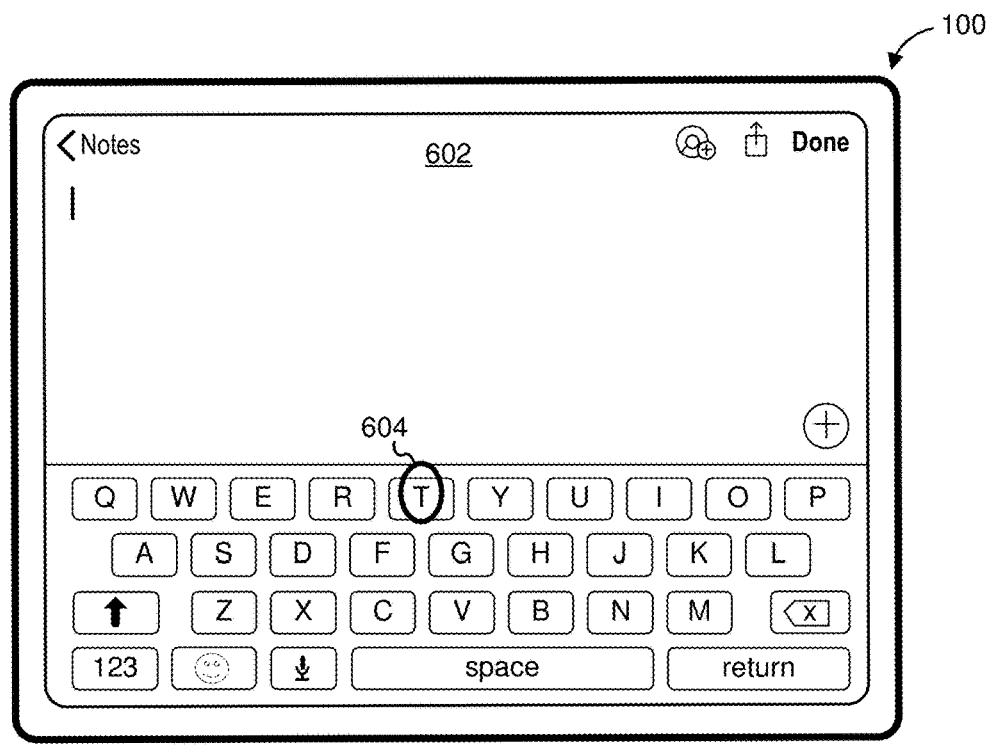
FIGS. 6A-6Y illustrate example user interfaces for simulating handwritten text in accordance with some embodiments.

FIGS. 5A-5Z illustrate example user interfaces for interacting with handwritten text in accordance with some embodiments. The user interfaces in these figures are used to illustrate the processes described below, including the processes in FIGS. 7A-7D. Although some of the examples which follow will be given with reference to inputs on a touch-screen display (where the touch-sensitive surface and the display are combined), in some embodiments, the device detects inputs on a touch-sensitive surface 451 that is separate from the display 450, as shown in FIG. 4B.

FIGS. 5A-5D illustrate a sequence in which the device 100 provides a user an option to perform an operation based on characters corresponding to drawing inputs. FIGS. 5A-5B illustrate a device 100 and a stylus 502. The device 100 includes a drawing region 504 that accepts drawing inputs (e.g., a drawing input 506). In some embodiments, the drawing region 504 is generated by a note-taking application (e.g., by the drawing module 380 shown in FIG. 3). In some embodiments, the note-taking application performs mathematical operations. In some embodiments, the note-taking application is a freeform spreadsheet application. In some embodiments, the device 100 detects the drawing inputs by detecting a contact of the stylus 502 with a touch-sensitive surface of the device 100. In some embodiments, in response to detecting the drawing inputs, the device 100 draws strokes that correspond to characters (e.g., letters, symbols and/or numbers). In the example of FIG. 5B, the device 100 draws strokes 508 that correspond to characters 510.

Referring to FIG. 5C, in some embodiments, some subsets of characters represent numerical values, words and/or phrases. In the example of FIG. 5C, a first subset of characters 510a represents a numerical value of '$200', a second subset of characters 510b represents a numerical value of '$300', and a third subset of characters 510c represents a numerical value of '$250'. In some embodiments, the device 100 receives a request to perform an operation (e.g., mathematical operations such as addition, subtraction, multiplication, division, etc.) based on at least some of the characters 510 displayed in the drawing region 504. For example, the device 100 receives a request to perform an operation based on two or more of the first subset of characters 510a, the second subset of characters 510b and the third subset of characters 510c. In some embodiments, the device 100 detects a predefined gesture 512 that corresponds to a request to perform an operation based on the characters 510. In some embodiments, the request is to perform a mathematical operation based on subsets of characters that represent numerical values. As an example, in some embodiments, the predefined gesture 512 corresponds to a request to add the numerical values represented by the first subset of characters 510a, the second subset of characters 510b and the third subset of characters 510c. In some embodiments, the device 100 detects the predefined gesture 512 by detecting a contact that has a characteristic intensity, which is greater than an intensity threshold. In such embodiments, the predefined gesture 512 is referred to as a 'hard press'. In some embodiments, the device 100 detects the predefined gesture 512 by detecting a contact that is associated with a time duration, which is greater than a threshold time duration. In such embodiments, the predefined gesture 512 is referred to as a 'long press'. In some embodiments, the device 100 detects the predefined gesture 512 by receiving a predefined user input (e.g., a 'hard press', or a 'long press') via a digit of a user.

Referring to FIG. 5D, in some embodiments, in response to detecting the predefined gesture 512, the device 100 displays visual prompts in association with respective subsets of characters indicating that the device 100 can utilize the respective subsets of characters to perform an operation. In the example of FIG. 5D, the device 100 displays a first visual prompt 520a, a second visual prompt 520b and a third visual prompt 520c. The first visual prompt 520a indicates that the device 100 can perform an operation based on the first subset of characters 510a. The second visual prompt 520b indicates that the device 100 can perform an operation based on the second subset of characters 510b. The third visual prompt 520c indicates that the device 100 can perform an operation based on the third subset of characters 510c. In the example of FIG. 5D, the visual prompts 520a, 520b and 520c include dashed rectangles that encompass their corresponding subsets of characters 510a, 510b and 510c, respectively. In some examples, displaying the visual prompts includes changing a display characteristic of the subsets of characters (e.g., changing a background color of the subsets of characters, for example, by highlighting the subsets of characters). Displaying the visual prompts indicates that the device 100 recognizes characters written in handwritten text of the user, and can perform operations based on the characters written in the handwritten text. Recognizing and performing operations based on characters written in handwritten text of the user enhances the operability of the device and makes the user-device interface more efficient (e.g., by reducing the need for a sequence of user inputs corresponding to typing the characters into the device via a keyboard) which, additionally, reduces power usage and improves battery life of the device by enabling the user to use the device more quickly and efficiently.

In some embodiments, a visual prompt includes an indication of a numerical value that the device 100 recognized based on the corresponding subset of characters. In the example of FIG. 5D, the first visual prompt 520a includes a first recognized value 522a indicating a numerical value that the device 100 recognized from the first subset of characters 510a (e.g., '$200'). The second visual prompt 520b includes a second recognized value 522b indicating a numerical value that the device 100 recognized from the second subset of characters 510b (e.g., '$300'). The third visual prompt 520c includes a third recognized value 522c indicating a numerical value that the device 100 recognized from the third subset of characters 510c (e.g., '$250'). As illustrated in FIG. 5D, in some embodiments, the device 100 displays a result field 530. The result field 530 displays a resultant value for an operation based on various subsets of characters. In other words, the resultant value is a function of at least some of the recognized numerical values 522a, 522b and 522c. Displaying the recognized numerical values 522a, 522b and 522c provides the user a visual confirmation that the device 100 has recognized the numerical values represented by the subsets of characters 510a, 510b and 510c. Providing the visual confirmation enhances the operability of the device and makes the user-device interface more efficient (e.g., by reducing the need for a sequence of user inputs corresponding to typing the numerical values into the device via a keyboard) which, additionally, reduces power usage and improves battery life of the device by enabling the user to use the device more quickly and efficiently.

FIGS. 5E-5L illustrate a sequence in which the device 100 receives selections of visual prompts and computes a resultant value for the result field 530 based on recognized values corresponding to the selected visual prompts. Referring to FIG. 5E, in some embodiments, the visual prompts are selectable. In some embodiments, a selection of a visual prompt causes the device 100 to include the numerical value indicated by the visual prompt into the result field 530. In the example of FIG. 5E, the device 100 receives a user input 540 selecting the first visual prompt 520a. As illustrated in FIG. 5F, in response to receiving the user input 540, the device 100 includes the first recognized value 522a into the result field 530. The result field 530 includes a confirmation affordance 532a and a cancellation affordance 532b. In response to detecting a selection of the confirmation affordance 532a, the device 100 computes the resultant value for the result field 530 based on the value(s) that are currently included in the result field 530. In response to detecting a selection of the cancellation affordance 532b, the device 100 forgoes computing the resultant value for the result field 530 and ceases display of the result field 530. Including a recognized value into the result field in response to a selection of the corresponding visual prompt enhances the operability of the device and makes the user-device interface more efficient (e.g., by reducing the need for a sequence of user inputs corresponding to typing the numerical value into the device via a keyboard) which, additionally, reduces power usage and improves battery life of the device by enabling the user to use the device more quickly and efficiently.

Referring to FIG. 5G, the device 100 receives a user input 542 selecting the second visual prompt 520b. As illustrated in FIG. 5H, in response to receiving the user input 542, the device 100 includes the second recognized value 522b into the result field 530. Referring to FIG. 5I, the device 100 receives a user input 544 selecting the third visual prompt 520c. As illustrated in FIG. 5J, in response to receiving the user input 544, the device 100 includes the third recognized value 522c into the result field 530. Referring to FIG. 5K, the device 100 receives a user input 546 at a location corresponding to the confirmation affordance 532a. The user input 546 corresponds to a request to compute the resultant value for the result field 530 based on the recognized values 522a, 522b and 522c that are included in the result field 530. As illustrated in FIG. 5L, in response to receiving the user input 546, the device 100 computes a resultant value 534 (e.g., '$750') based on a function of the recognized values 522a, 522b and 522c that were in the result field 530 at a time the device 100 received the user input 546. In the example, of FIGS. 5E-5L, the function is addition. In other words, in the example of FIGS. 5E-5L, the device 100 determines (e.g., computes) the resultant value 534 by adding the recognized values 522a, 522b and 522c that were in the result field 530 at the time the device 100 received the user input 546. More generally, in various embodiments, the device determines a resultant value in response to selections of visual prompts that indicate respective recognized values. Determining the resultant value in response to selections of visual prompts enhances the operability of the device and makes the user-device interface more efficient (e.g., by reducing the need for a sequence of user inputs corresponding to typing the numerical values into the device via a keyboard) which, additionally, reduces power usage and improves battery life of the device by enabling the user to use the device more quickly and efficiently.

FIGS. 5M-5N illustrate a sequence in which the device 100 updates the result field 530 in response to a drawing input that changes one of the subsets of characters 510a, 510b and 510c associated with the result field 530. In the example of FIG. 5M, the device 100 receives a drawing input 548 that changes the second subset of characters 510b. Prior to receiving the drawing input 548, the second subset of characters 510b represented a numerical value of '$300'. However, after receiving the drawing input 548, the second subset of characters 510b represents a new numerical value of '$3000'. As illustrated in FIG. 5N, the device 100 updates the result field 530 based on the change to the second subset of characters 510b. For example, in FIG. 5N, the result field 530 includes an updated resultant value 534' that is a function of the new numerical value '$3000'. More generally, in various embodiments, the device updates the result field in response to drawing inputs that change the subsets of characters that form the basis of the result field. Updating the result field in response to drawing inputs that change subsets of characters enhances the operability of the device and makes the user-device interface more efficient (e.g., by reducing the need for a sequence of user inputs corresponding to a subsequent request to update the result field or to display a new result field based on the changes) which, additionally, reduces power usage and improves battery life of the device by enabling the user to use the device more quickly and efficiently.

FIGS. 5O-5R illustrate a sequence in which the device 100 utilizes the resultant value 534 in a subsequent operation. In the example of FIG. 5O, the device 100 receives a predefined gesture 550 (e.g., a 'hard press' or a 'long press', as described herein). The predefined gesture 550 corresponds to a request to perform an operation based on at least some of the characters 510 displayed in the drawing region 504 and/or the resultant value 534 from a previous operation (e.g., the operation illustrated in the example of FIGS. 5K-5L). FIG. 5O includes additional subsets of characters (e.g., a fourth subset of characters 510d) that the device 100 displayed in response to receiving additional drawing inputs.

As illustrated in FIG. 5P, in response to detecting the predefined gesture 550, the device 100 displays visual prompts in association with respective subsets of characters indicating that the device 100 can utilize the respective subsets of characters to perform an operation. In the example of FIG. 5P, the device 100 displays the first visual prompt 520a, the second visual prompt 520b, the third visual prompt 520c, and a fourth visual prompt 520d. The visual prompts 520a . . . 520d indicate that the device 100 can perform an operation based on the subset of characters 510a . . . 510d, respectively. The fourth visual prompt 520d includes a fourth recognized value 522d indicating a numerical value that the device 100 recognized from the fourth subset of characters 510d (e.g., '5'). As illustrated in FIG. 5P, the visual prompts 520a . . . 520d include recognized numerical values 522a . . . 522d, respectively. In response to the predefined gesture 550, the device 100 also displays the result field 530 with the resultant value 534 from the previous operation. As illustrated in FIG. 5P, in response to detecting the predefined gesture 550, the device 100 displays a second result field 530a for displaying a resultant value for the operation requested by the predefined gesture 550. Displaying the recognized numerical values 522a . . . 522d and the result field 530 indicates that the recognized numerical values 522a . . . 522d and the resultant value 534 in the result field 530 are available to perform an operation requested by the predefined gesture 550. Indicating the availability of the recognized numerical values 522a . . . 522d and the resultant value for an operation requested by the predefined gesture 550 enhances the operability of the device and makes the user-device interface more efficient (e.g., by reducing the need for a sequence of user inputs corresponding to typing the recognized numerical values 522a . . . 522d and the resultant value 534 into the device via a keyboard) which, additionally, reduces power usage and improves battery life of the device by enabling the user to use the device more quickly and efficiently.

In the example of FIG. 5Q, the device 100 receives a user input 552 selecting the result field 530. The user input 552 corresponds to a request to include the resultant value 534 from the previous operation into the second result field 530a. As such, in response to receiving the user input 552, the device 100 includes the resultant value 534 from the previous operation into the second result field 530a. Including the resultant value 534 from the previous operation into the second result field 530a enhances the operability of the device and makes the user-device interface more efficient (e.g., by reducing the need for a sequence of user inputs corresponding to typing the resultant value 534, or the recognized numerical values 522a, 522b and 522c from which the device 100 derived the resultant value 534, into the device via a keyboard) which, additionally, reduces power usage and improves battery life of the device by enabling the user to use the device more quickly and efficiently.

Referring to FIG. 5R, the device 100 receives a user input 554 selecting the fourth visual prompt 520d. The user input 554 corresponds to a request to include the fourth recognized value 522d into the second result field 530a. In response to receiving the user input 554, the device 100 includes the fourth recognized value 522d into the second result field 530a. Including the fourth recognized value 522d into the second result field 530a in response to a selection of the fourth visual prompt 520d enhances the operability of the device and makes the user-device interface more efficient (e.g., by reducing the need for a sequence of user inputs corresponding to typing the fourth recognized numerical value 522d into the device via a keyboard) which, additionally, reduces power usage and improves battery life of the device by enabling the user to use the device more quickly and efficiently.

FIGS. 5S-5V illustrate a sequence in which the device 100 provides an option to makes changes to the result field. In the example of FIG. 5S, the device 100 receives a user input 556 that selects the second result field 530a. As illustrated in FIG. 5S, the second result field 530a includes a mathematical symbol (e.g., a plus sign 562a). In some embodiments, a default operation includes addition. In such embodiments, result fields (e.g., the second result field 530a) include the plus sign 562a by default. However, the device 100 provides the user an option to change the default operation by selecting a different mathematical symbol. In some embodiments, the device 100 detects the user input 556 at a location corresponding with the mathematical symbol included in the second result field 530a. In such embodiments, the user input 556 corresponds to a request to select a different mathematical symbol. Referring to FIG. 5T, in response to receiving the user input 556, the device 100 displays an overlay 560. In the example of FIG. 5T, the overlay 560 includes various mathematical symbols that the user can select (e.g., the plus sign 562a, a minus sign 562b, a multiplication sign 562c and a division sign 562d). Referring to FIG. 5U, the device 100 receives a user input 558 selecting the division sign 562d from the overlay 560. As such, the device 100 performs a division operation with the values in the second result field 530a instead of the default addition operation. As illustrated in FIG. 5V, the device 100 determines (e.g., computes) a second resultant value 534a for the second result field 530. Displaying an overlay (e.g., the overlay 560) in response to a selection of a result field provides an intuitive and user-friendly way to change the operation and/or the values associated with the result field. Providing an option to change the operation and/or the values associated with the result field enhances the operability of the device and makes the user-device interface more efficient (e.g., by reducing the need for a sequence of user inputs corresponding to typing different mathematical symbols and/or values into the device via a keyboard) which, additionally, reduces power usage and improves battery life of the device by enabling the user to use the device more quickly and efficiently.

FIGS. 5W-5X illustrate a sequence in which the device 100 updates a result field in response to a user input deleting characters associated with the result field. In the example of FIG. 5W, the device 100 receives a user input 570 that corresponds to a request to delete the third subset of characters 510c. As shown in FIG. 5C, the third subset of characters 510c represented a numerical value (e.g., '$250'). The numerical value represented by the third subset of characters 510c formed the basis for the resultant values 534 and 534a. As such, after the third subset of characters 510c is deleted, the resultant values 534 and 534a are no longer accurate. As illustrated in FIG. 5X, the device 100 determines an updated resultant value 534" and an updated second resultant value 534a' after receiving the user input 570. As shown in FIG. 5X, the device 100 replaces the resultant values 534 and 534a with updated resultant values 534" and 534a', respectively. More generally, in various embodiments, the device updates the result field(s) in response to user inputs that change (e.g., delete) the subsets of characters that form the basis of the result field(s). Updating the result field(s) in response to user inputs that change (e.g., delete) subsets of characters enhances the operability of the device and makes the user-device interface more efficient (e.g., by reducing the need for a sequence of user inputs corresponding to a subsequent request to update the result field(s) or to display a new result field based on the change) which, additionally, reduces power usage and improves battery life of the device by enabling the user to use the device more quickly and efficiently.

FIGS. 5Y-5Z illustrate a sequence in which the device 100 provides the user an option to change recognized numerical values. In some scenarios, the device 100 errs at detecting numerical values. As an example, in FIG. 5Y, the device 100 displays a subset of characters 510e that represent a numerical value of '$280'. However, the device 100 displays a visual prompt 520e that includes a recognized numerical value 522e of '$200'. In some embodiments, the device 100 provides an option to change the recognized numerical values. For example, in some embodiments, the recognized numerical values include selectable affordances that, when activated, allow the user to change the recognized numerical values that was selected. As illustrated in FIG. 5Z, the device 100 receives a user input 580 selecting the recognized numerical value 522e. The user input 580 corresponds to a request to change the recognized numerical value 522e, for example, because the recognized numerical value 522e is not accurate. In response to receiving the user input 580, the device 100 displays a keypad 582 allows the user to change the recognized numerical value 522e. For example, the keypad 582 includes various affordances that correspond with respective numbers. Providing an option to change a recognized numerical value enhances the operability of the device and makes the user-device interface more efficient (e.g., by reducing the need for a sequence of drawing inputs corresponding to re-writing the subset of characters) which, additionally, reduces power usage and improves battery life of the device by enabling the user to use the device more quickly and efficiently.

FIGS. 6A-6Y illustrate example user interfaces for simulating handwritten text in accordance with some embodiments. The user interfaces in these figures are used to illustrate the processes described below, including the processes in FIGS. 8A-8E. Although some of the examples which follow will be given with reference to inputs on a touch-screen display (where the touch-sensitive surface and the display are combined), in some embodiments, the device detects inputs on a touch-sensitive surface 451 that is separate from the display 450, as shown in FIG. 4B.

Figure 6B:
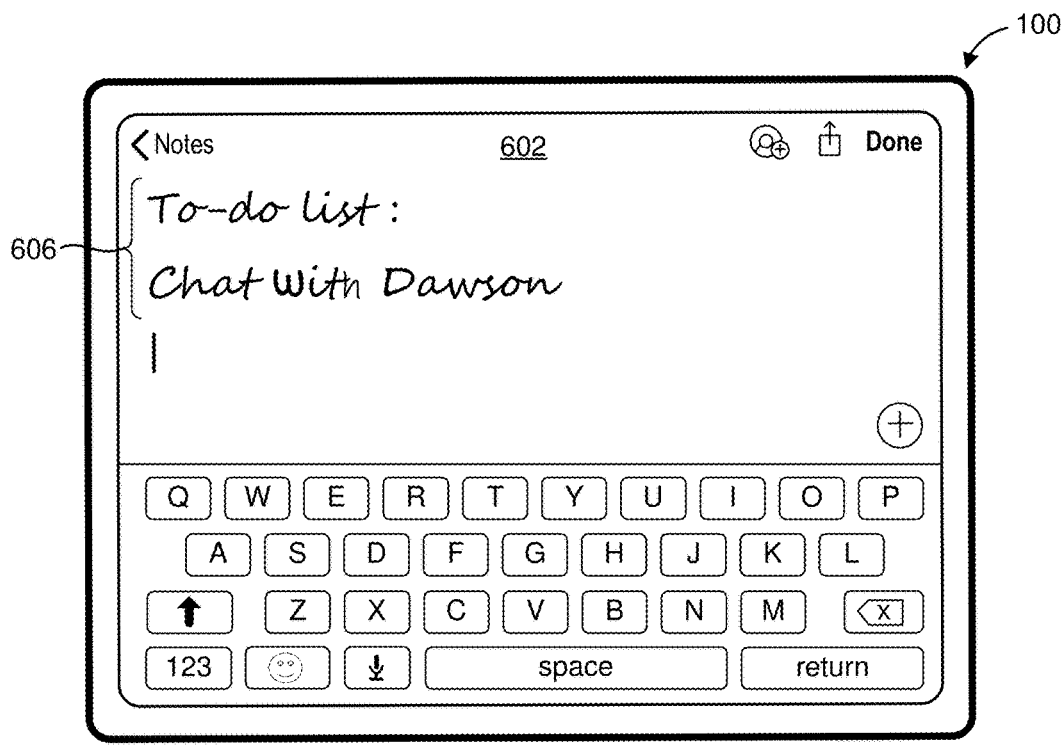

FIGS. 6A-6B illustrate a sequence in which the device 100 displays simulated handwritten text in response to receiving a user input that corresponds with a sequence of characters. FIG. 6A illustrates a note-taking interface 602 that allows a user of the device 100 to take notes. In some embodiments, the note-taking interface 602 is generated by the email client module 140, the instant messaging module 141, the drawing module 380, the presentation module 382, and/or the word processing module 384 shown in FIG. 3. In some embodiments, the device 100 (e.g., the note-taking interface 602) receives a user input corresponding with a sequence of characters (e.g., a user input 604). As illustrated in FIG. 6B, in response to receiving the user input, the device 100 displays the sequence of characters in simulated handwritten text 606. In some embodiments, the simulated handwritten text corresponds to a handwritten text of the user. For example, the device 100 synthesizes the simulated handwritten text 606 based on samples of handwritten text of the user that the device 100 previously received. In some embodiments, the device requests multiple samples of the same handwritten text in order to determine natural variations in the user's handwritten text (e.g., variations in the spacing between words and letters, variations in the amount of overlap between related characters) and use those variations to adjust the variations in the simulated handwritten text to more closely match the natural variations in the user's handwritten text. As such, the simulated handwritten text 606 is within a degree of similarity to handwritten text of the user. Since the simulated handwritten text 606 is within a degree of similarity to handwritten text of the user, displaying the sequence of characters in the simulated handwritten text 606 reduces the need for a sequence of drawing inputs corresponding to the sequence of characters. Displaying the sequence of characters in simulated handwritten text enhances the operability of the device and makes the user-device interface more efficient (e.g., by reducing the need for drawing inputs corresponding to the user providing the sequence of characters as handwritten text) which, additionally, reduces power usage and improves battery life of the device by enabling the user to use the device more quickly and efficiently.

Figure 6C:
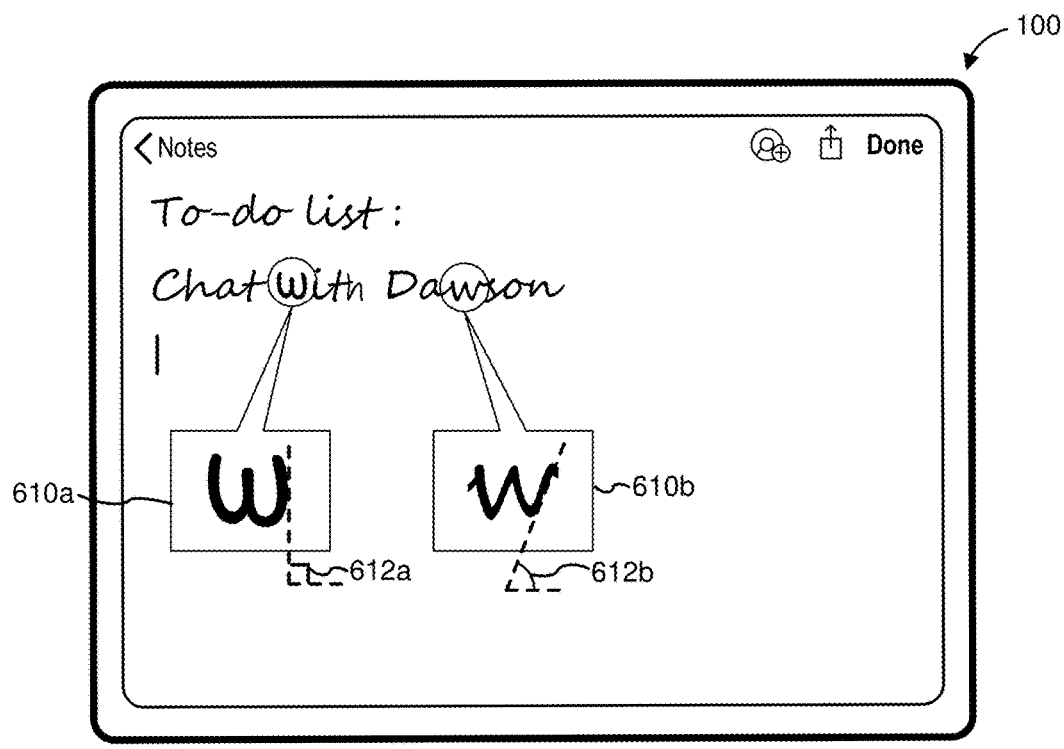
Figure 6D:
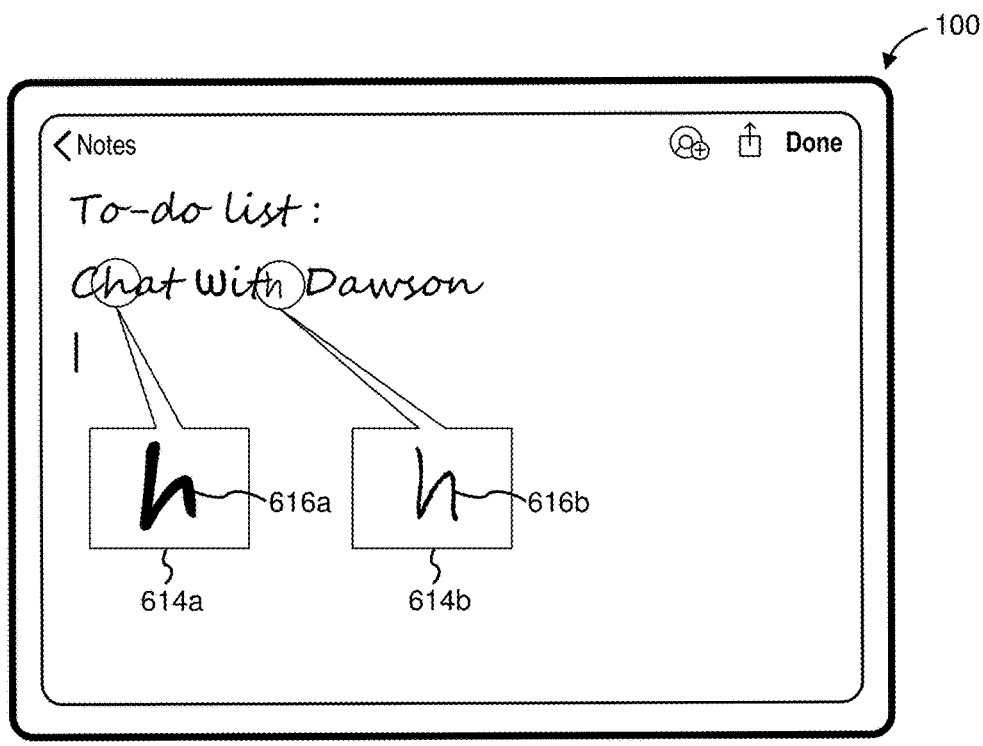

Referring to FIGS. 6C-6D, in some embodiments, the device 100 displays a character with a first appearance in response to a first criterion being met, and a second appearance in response to a second criterion being met. In the example of FIG. 6C, the device 100 displays the character 'w' with a first appearance 610a in response to the character 'w' appearing at the beginning of a word, and a second appearance 610b in response to the character 'w' appearing in the middle of a word. More generally, in various embodiments, the device 100 displays a character with a first appearance in response to the character appearing at the beginning of a word, and a second appearance in response to the character appearing in the middle of a word. In some embodiments, the appearances vary based on line angle, line shape and/or line thickness. As illustrated in FIG. 6C, in the first appearance 610a of the character 'w', one of the outer segments of 'w' has a first line angle 612a (e.g., 90 degrees). By contrast, in the second appearance 610b of the character 'w', the outer segment of 'w' has a second line angle 612b (e.g., an acute angle). The appearances in the simulated handwritten text 606 are a function of variations in handwritten text of the user. For example, the device 100 varies the appearance of the character 'w' (e.g., the line angle(s) of the character 'w') based on whether or not the character 'w' is at the beginning of a word because the appearances of character 'w' have corresponding variations in the handwritten text of the user. As such, varying the appearances of the character 'w' results in simulated handwritten text that is within a degree of similarity to the handwritten text of the user. Synthesizing handwritten text that is within a degree of similarity to the handwritten text of the user enhances the operability of the device and makes the user-device interface more efficient (e.g., by reducing the need for drawing inputs corresponding to the user providing characters as handwritten text) which, additionally, reduces power usage and improves battery life of the device by enabling the user to use the device more quickly and efficiently.

In the example of FIG. 6D, the device 100 displays the character 'h' with a first appearance 614a in response to the character 'h' appearing in the middle of a word, and a second appearance 614b in response to the character 'h' appearing at the end of a word. More generally, in various embodiments, the device 100 displays a character with a first appearance in response to the character appearing in the middle of a word, and a second appearance in response to the character appearing at the end of a word. In some embodiments, the appearances vary based on line angle, line shape and/or line thickness. As illustrated in FIG. 6D, in the first appearance 614a of 'h', the line segments have a first line thickness 616a, whereas in the second appearance 614b of 'h', the line segments have a second line thickness 616b that is less than the first line thickness 616a. The appearances in the simulated handwritten text 606 are a function of variations in handwritten text of the user. For example, the device 100 varies the appearance of the character 'h' (e.g., the line thickness of line segments that make up the character 'h') based on whether or not the character 'h' is at the end of a word because the appearances of the character 'h' have corresponding variations in the handwritten text of the user. As such, varying the appearances of the character 'h' results in simulated handwritten text that is within a degree of similarity to the handwritten text of the user. Synthesizing handwritten text that is within a degree of similarity to the handwritten text of the user enhances the operability of the device and makes the user-device interface more efficient (e.g., by reducing the need for drawing inputs corresponding to the user providing characters as handwritten text) which, additionally, reduces power usage and improves battery life of the device by enabling the user to use the device more quickly and efficiently.

Figure 6E:
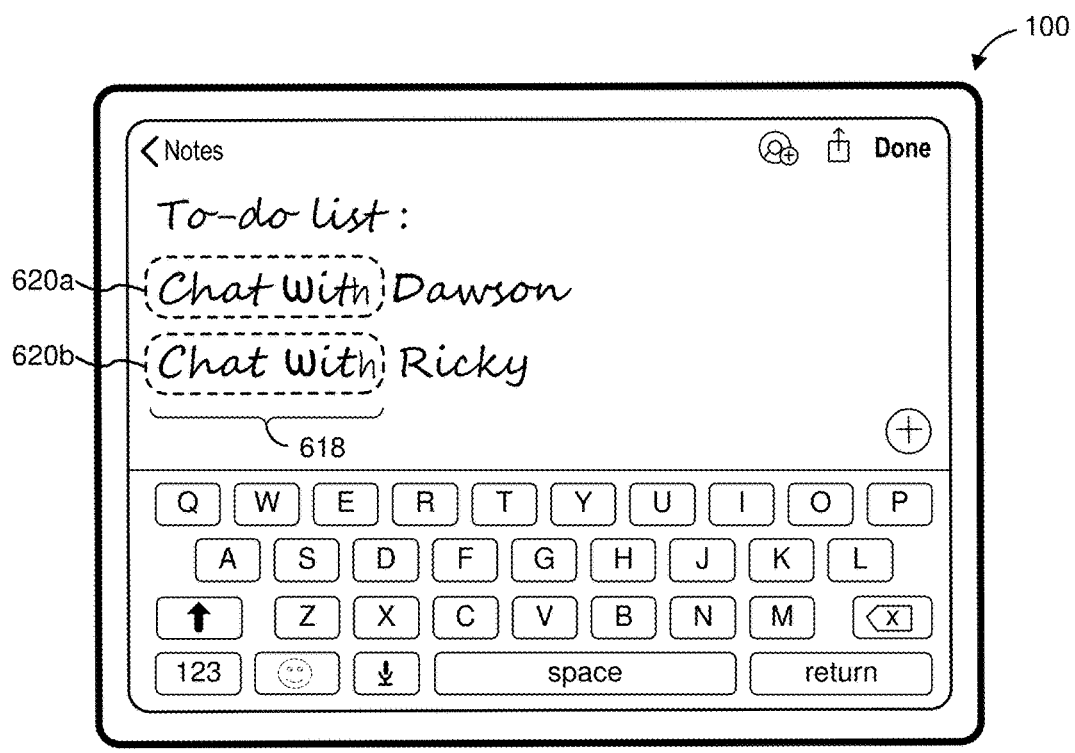
Figure 6F:
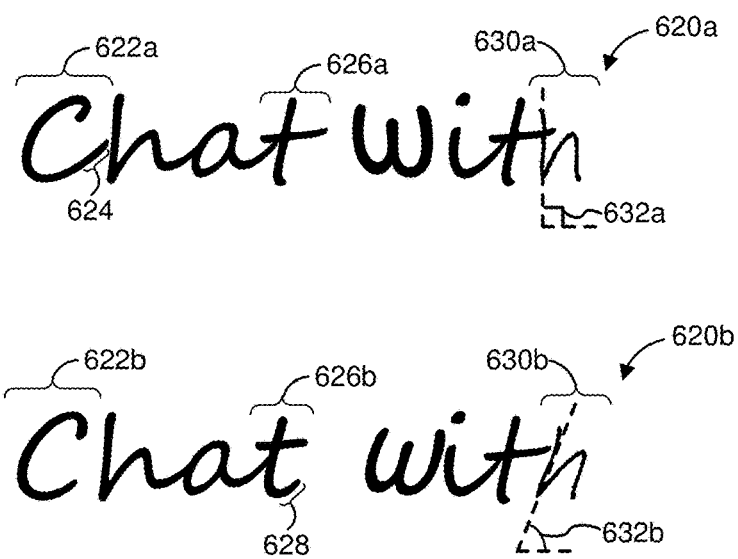

Referring to FIGS. 6E-6F, in some embodiments, the device 100 varies the appearance of a set of characters (e.g., a phrase, a word, or a single letter) to correspond to variations that inherently occur in handwritten text of the user. In other words, the device 100 displays different instances of a set of characters with varying appearances because different instances of the set of characters have varying appearances in the handwritten text of the user. In the example of FIG. 6E, the device 100 displays two instances of a set of characters 618 (e.g., 'Chat with'). The device 100 varies the appearances of both the instances. For example, the device 100 displays the first instance of the set of characters 618 with a first appearance 620a, and the second instance of the set of characters 618 with a second appearance 620b.

FIG. 6F illustrates expanded views of the first and second appearances 620a and 620b of the set of characters 618. In the example of FIG. 6F, the character 'C' has a first appearance 622a in the first instance of the set of characters 618 and a second appearance 622b in the second instance of the set of characters 618. The first appearance 622a of the character 'C' includes a line segment 624 that is missing from the second appearance 622b of the character 'C'. Similarly, the character 't' has a first appearance 626a in the first instance of the set of characters 618 and a second appearance 626b in the second instance of the set of characters 618. The second appearance 626b of the character 't' includes a line segment 628 that is missing from the first appearance 626a of the character 't'. The character 'h' has a first appearance 630a in the first instance of the set of characters 618 and a second appearance 630b in the second instance of the set of characters 618. The first appearance 630a of the character 'h' includes a line segment that has a first line angle 632a (e.g., a right angle), whereas the second appearance 630b of the character 'h' includes a line segment that has a second line angle 632b (e.g., an acute angle). Displaying different instances of a set of characters with varying appearances increases the degree of similarity between the simulated handwritten text and the handwritten text of the user. Displaying simulated handwritten text that is within a degree of similarity to the handwritten text of the user enhances the operability of the device and makes the user-device interface more efficient (e.g., by reducing the need for drawing inputs corresponding to the user providing the set of characters as handwritten text) which, additionally, reduces power usage and improves battery life of the device by enabling the user to use the device more quickly and efficiently.

Figure 6G:
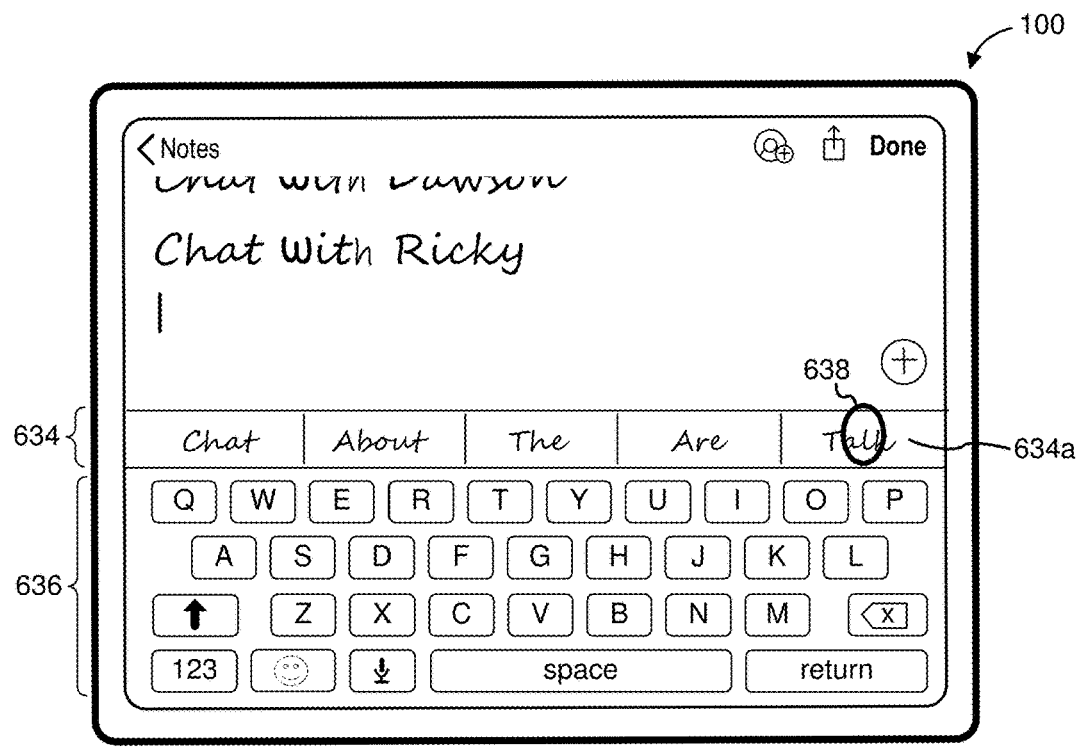
Figure 6H:
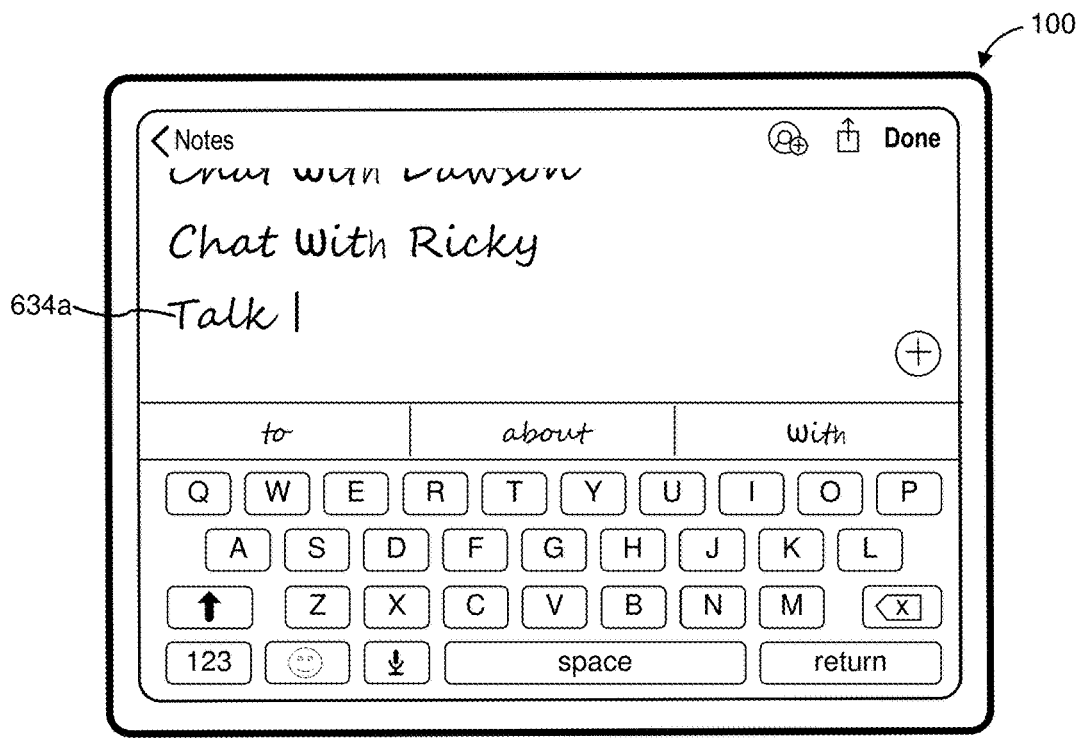

Referring to FIGS. 6G-6H, in some embodiments, the device 100 displays suggested strings 634 in simulated handwritten text. In some embodiments, the device 100 displays the suggested strings 634 above a keyboard 636. In some embodiments, the suggested strings 634 are selectable. In the example of FIG. 6G, the device 100 receives a user input 638 selecting a first suggested string 634a. As illustrated in FIG. 6H, in response to receiving the selection of the first suggested string 634a, the device 100 displays the first suggested string 634a on the display. Displaying the suggested strings 634 in simulated handwritten text (e.g., instead of displaying the suggested strings 634 in a standard font such as 'Arial' or 'Times New Roman') provides an indication that selecting one of the suggested strings 634 causes the device 100 to display the selected suggested string in the simulated handwritten text (e.g., as opposed to the standard font). Displaying a suggested string in simulated handwritten text enhances the operability of the device and makes the user-device interface more efficient (e.g., by reducing the need for drawing inputs corresponding to the suggested string and/or by reducing the need for a sequence of user inputs corresponding to typing the suggested string into the device via a keyboard) which, additionally, reduces power usage and improves battery life of the device by enabling the user to use the device more quickly and efficiently.

Figure 6I:
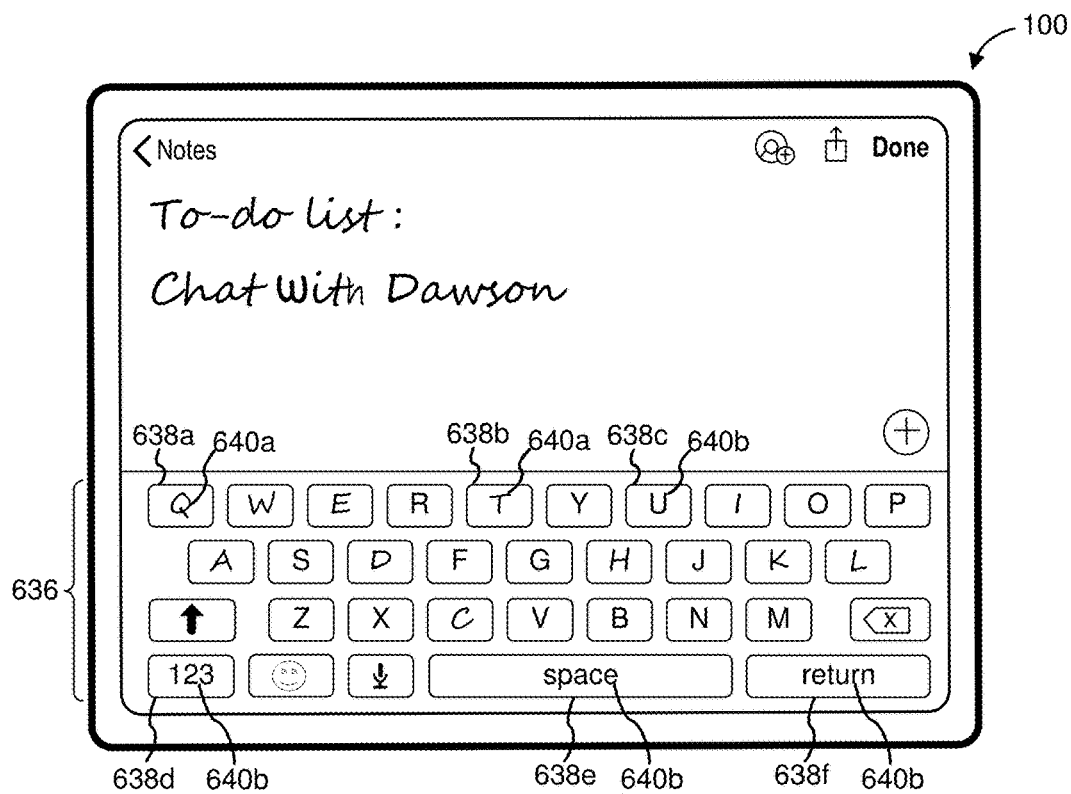
Figure 6J:
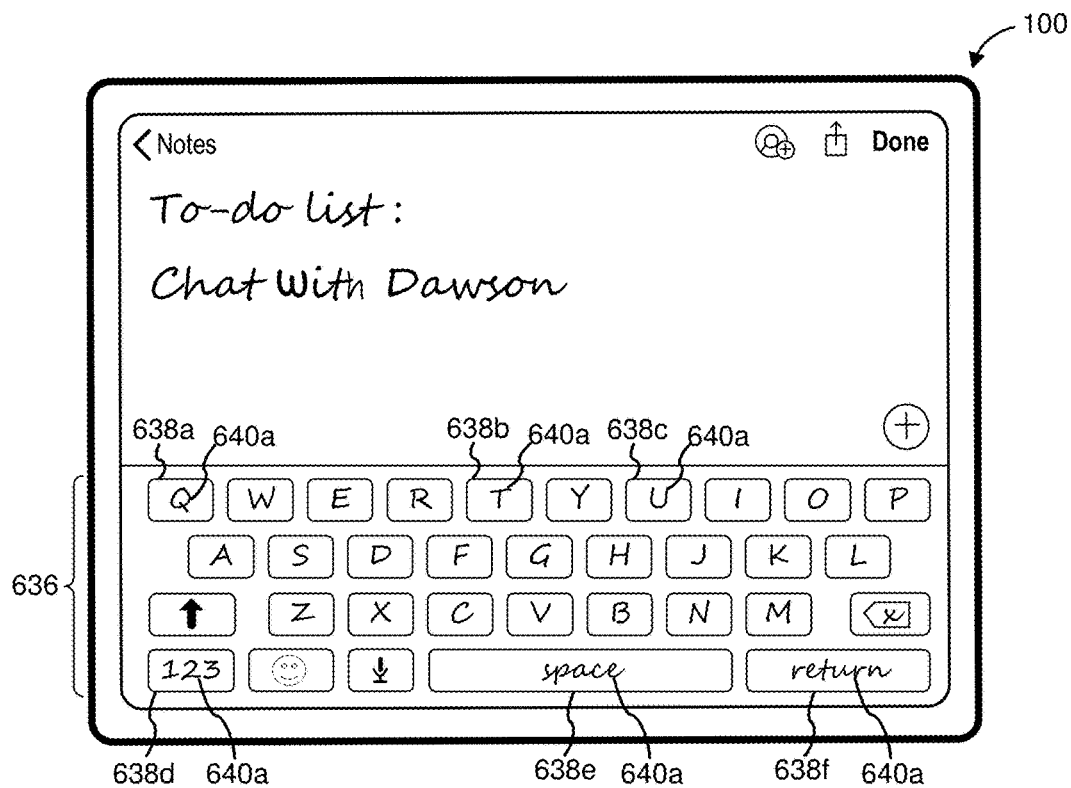

Referring to FIGS. 6I-6J, in some embodiments, the device 100 displays a keyboard 636 that includes characters displayed in simulated handwritten text. In the example of FIG. 6I, the keyboard 636 includes various keys that correspond to various characters such as 'Q' and/or sets of characters such as 'space'. The device 100 displays some of the keys (e.g., keys 638a for character 'Q' and 638b for character 'T') with a first appearance 640a that corresponds to simulated handwritten text, and the remaining keys (e.g., keys 638c for character 'U', 638d for characters '123', 638e for character 'space' and 638f for characters 'return') with a second appearance 640b that corresponds to a standard font (e.g., 'Arial', 'Times New Roman', etc.). In the example of FIG. 6I, the device 100 has a sufficient number of handwriting samples of the user to display some keys with the first appearance 640a that corresponds to the simulated handwritten text. However, the device 100 does not have a sufficient number of handwriting samples of the user to display all keys with the first appearance 640a. As such, the device 100 displays some keys in simulated handwritten text and the remaining keys in the standard font. As the device 100 collects more handwriting samples of the user, the device 100 switches the appearance of some keys from the standard font to the simulated handwritten text. In the example of FIG. 6J, the device 100 displays all keys with the first appearance 640a that corresponds to the simulated handwritten text. Displaying characters of the keyboard 636 in simulated handwritten text indicates that typing with the keyboard 636 causes the device 100 to display selected characters in simulated handwritten text. Displaying characters of the keyboard 636 in simulated handwritten text enhances the operability of the device and makes the user-device interface more efficient (e.g., by reducing the need for drawing inputs corresponding to the user providing a sequence of characters in handwritten text of the user) which, additionally, reduces power usage and improves battery life of the device by enabling the user to use the device more quickly and efficiently.

Figure 6K:
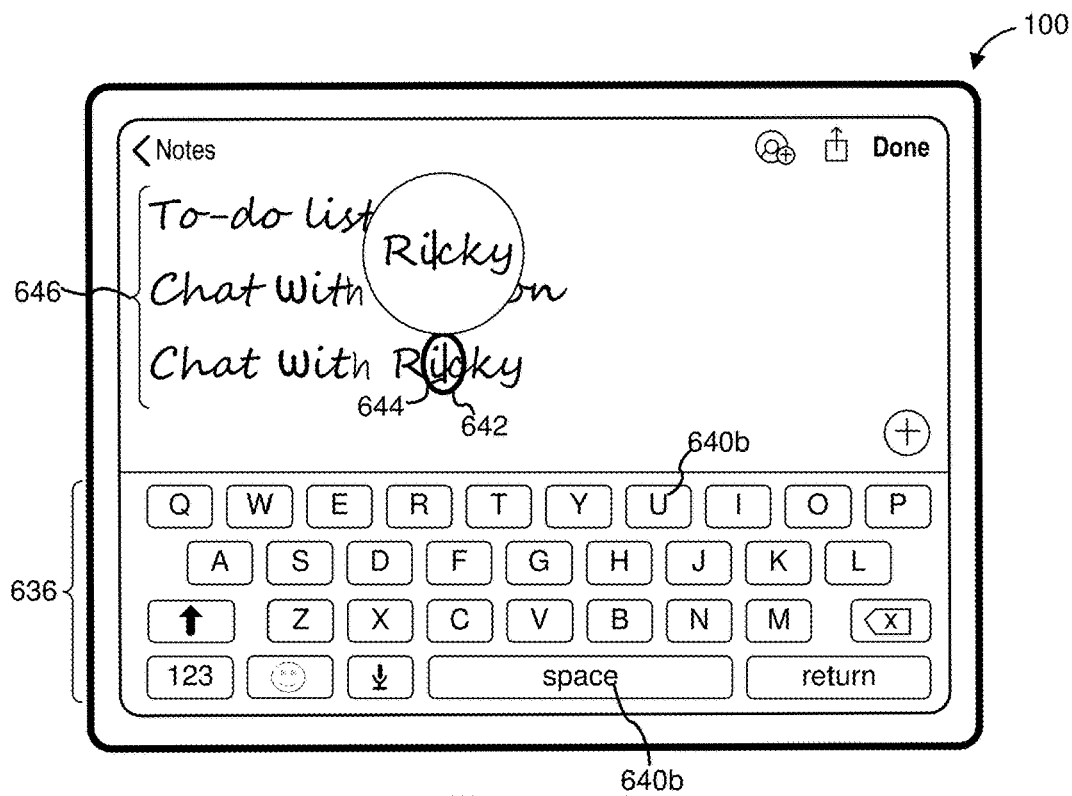
Figure 6L:
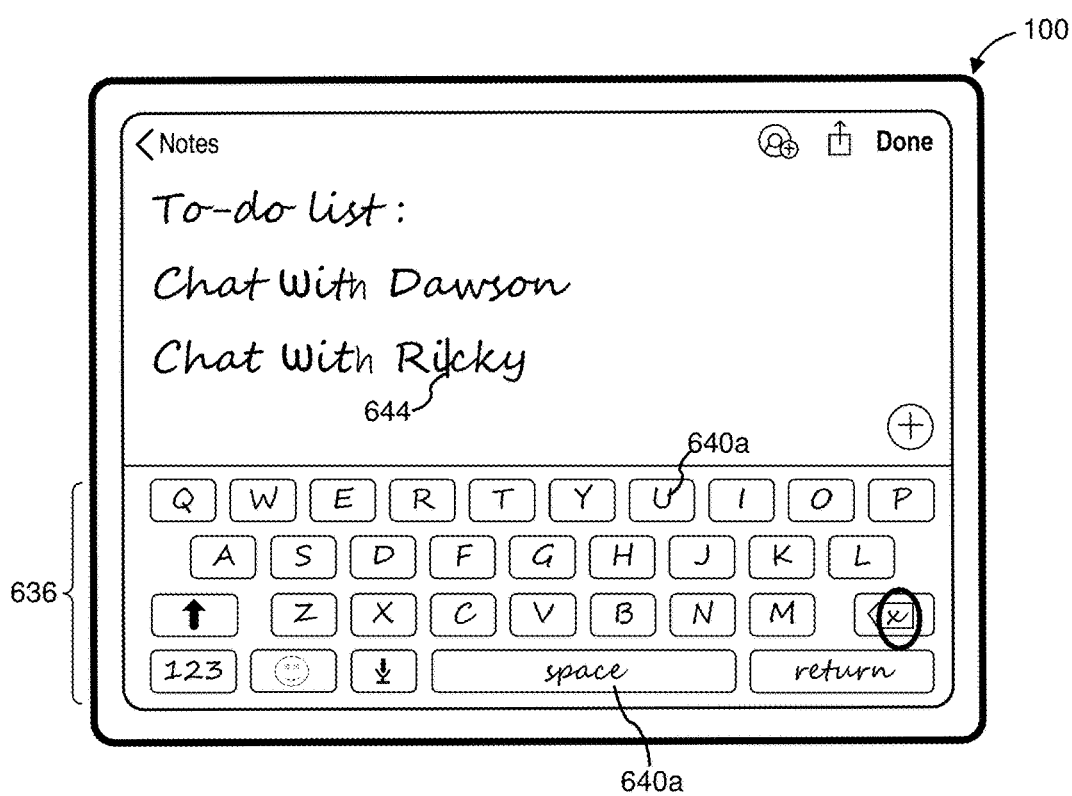
Figure 6M:
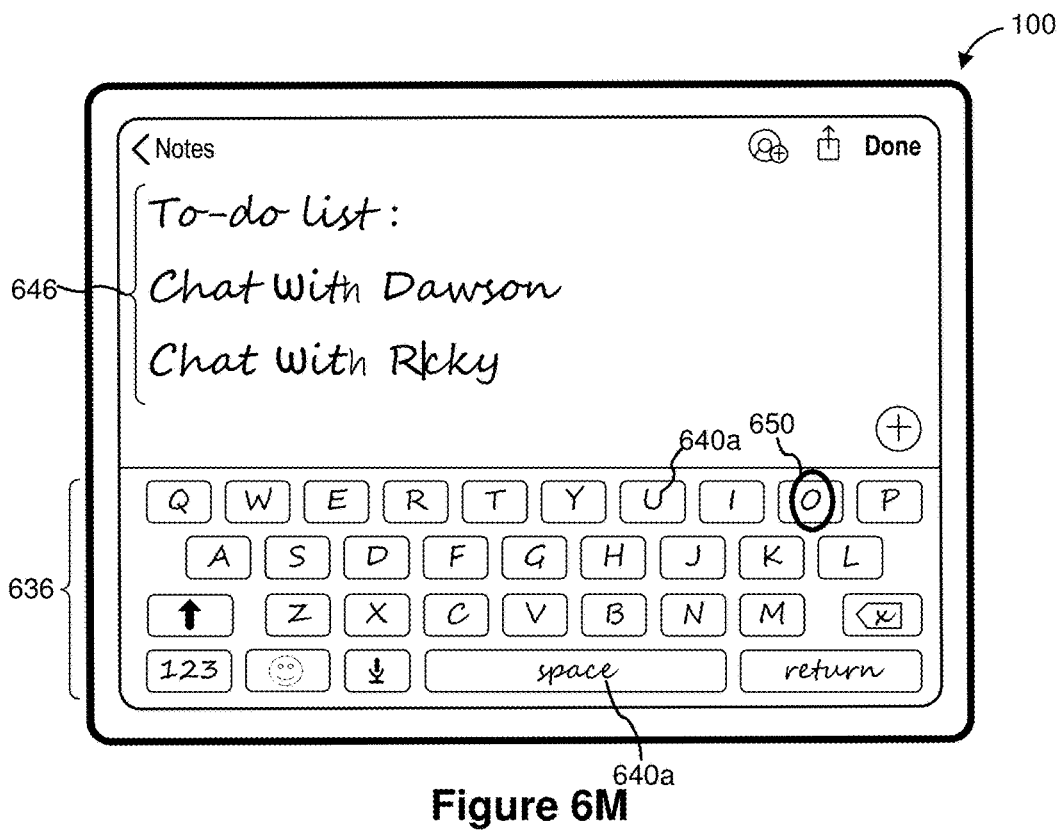
Figure 6N:
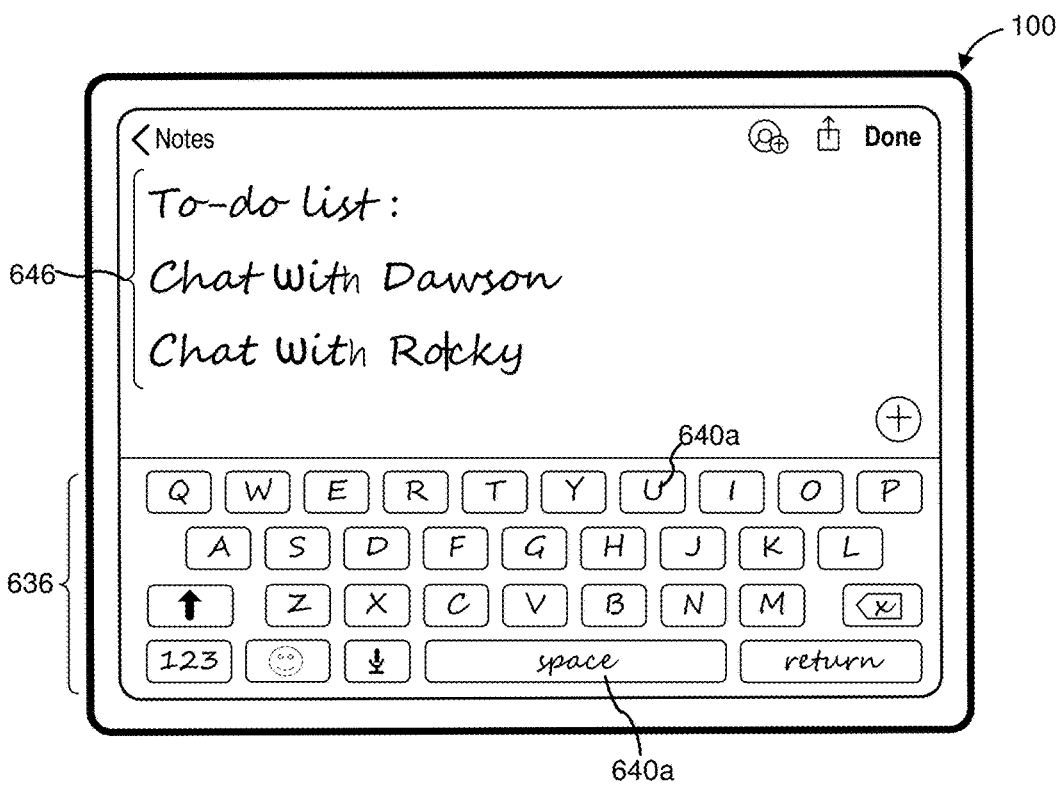

FIGS. 6K-6N illustrate a sequence in which the device 100 triggers typing with simulated handwritten text in response to detecting insertion of a cursor within simulated handwritten text. In the example of FIG. 6K, the device 100 includes a keyboard 636 that includes characters that are displayed with the second appearance 640b corresponding to a standard font (e.g., 'Arial', 'Times New Roman', etc.). The device 100 receives a user input 642 that corresponds to a request to insert a cursor 644 within simulated handwritten text 646. As illustrated in FIG. 6L, in response to receiving the user input 642, the device 100 inserts the cursor 644 within the simulated handwritten text 646. In response to receiving the user input 642, the device 100 switches an appearance of the characters in the keyboard 636 from the second appearance 640b to the first appearance 640a corresponding to simulated handwritten text. As such, in response to detecting that the user input 642 inserted the cursor 644 within the simulated handwritten text 646, the device 100 triggers typing with simulated handwritten text. For example, as illustrated in FIGS. 6M-6N, in response to receiving a user input 650 selecting a key for the character 'O', the device 100 displays the character 'O' in the simulated handwritten text. More generally, in various embodiments, in response to detecting an insertion of a cursor within simulated handwritten text, the device 100 displays a keyboard including characters that are displayed in simulated handwritten text that corresponds to handwritten text of the user. In other words, in response to detecting an insertion of a cursor within simulated handwritten text, the device 100 triggers typing with simulated handwritten text that corresponds to handwritten text of the user. Triggering typing with simulated handwritten text enhances the operability of the device and makes the user-device interface more efficient (e.g., by reducing the need for drawing inputs corresponding to the user providing a sequence of characters in handwritten text of the user) which, additionally, reduces power usage and improves battery life of the device by enabling the user to use the device more quickly and efficiently.

Figure 6O:
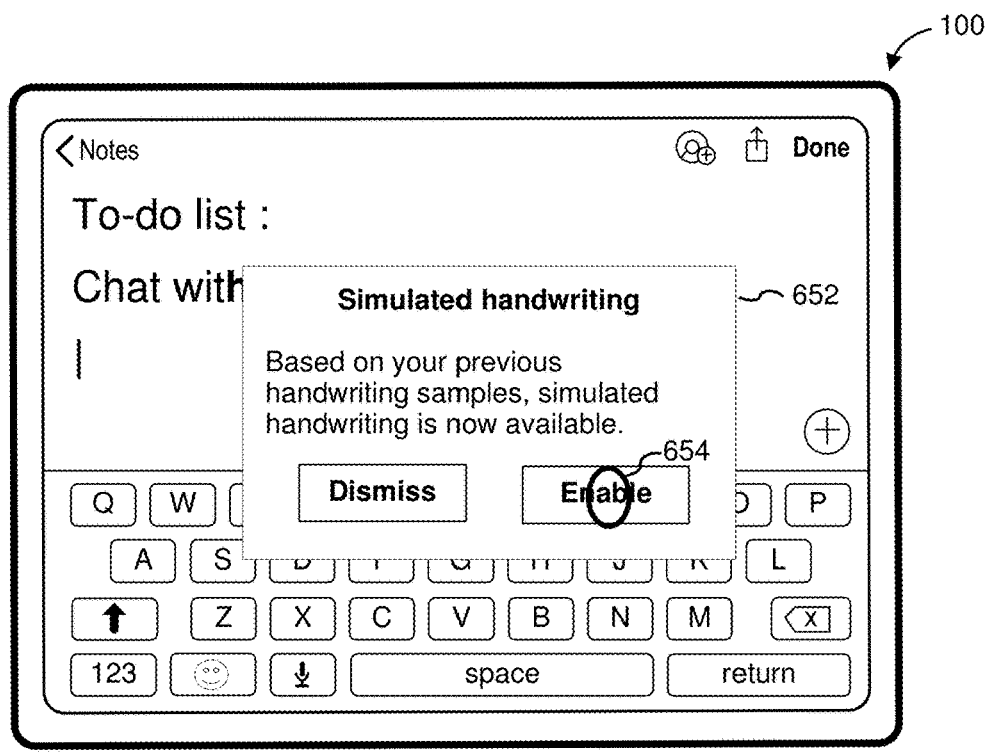
Figure 6P:
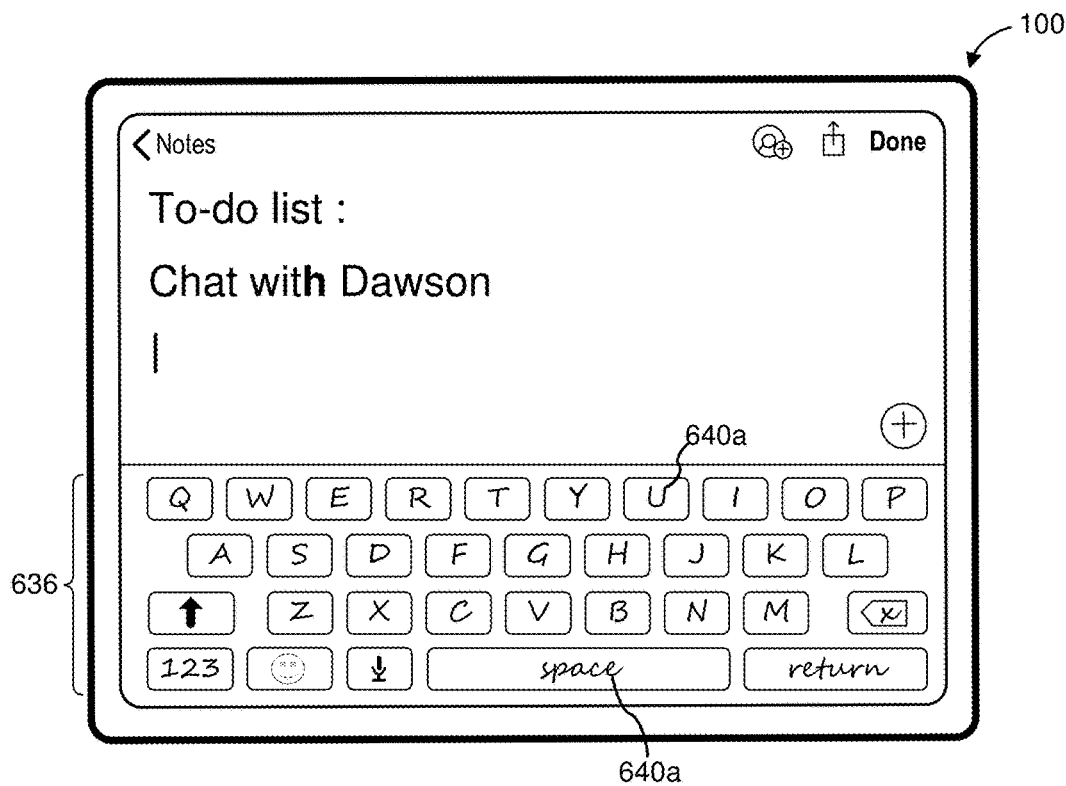

Referring to FIGS. 6O-6P, the device 100 provides the user an option to enable typing with simulated handwritten text. In the example of FIG. 6O, the device 100 displays a notification 652 indicating that the user has an option to type with simulated handwritten text. In some embodiments, the device 100 displays the notification 652 when the device 100 has collected sufficient handwritten text samples of the user to synthesize the simulated handwritten text. In the example of FIGS. 6O-6P, the device 100 collects samples of handwritten text of the user (e.g., instead of explicitly requesting specific samples of handwritten text of the user). In the example of FIG. 6O, the device 100 receives a user input 654 that corresponds to a request to enable typing with simulated handwritten text. As illustrated in FIG. 6P, in response to receiving the request to enable typing with simulated handwritten text (e.g., in response to receiving the user input 654), the device 100 displays a keyboard 636 including characters displayed with a first appearance 640a that corresponds to simulated handwritten text. Enabling typing with simulated handwritten text enhances the operability of the device and makes the user-device interface more efficient (e.g., by reducing the need for drawing inputs corresponding to the user providing a sequence of characters in handwritten text of the user) which, additionally, reduces power usage and improves battery life of the device by enabling the user to use the device more quickly and efficiently.

Figure 6Q:
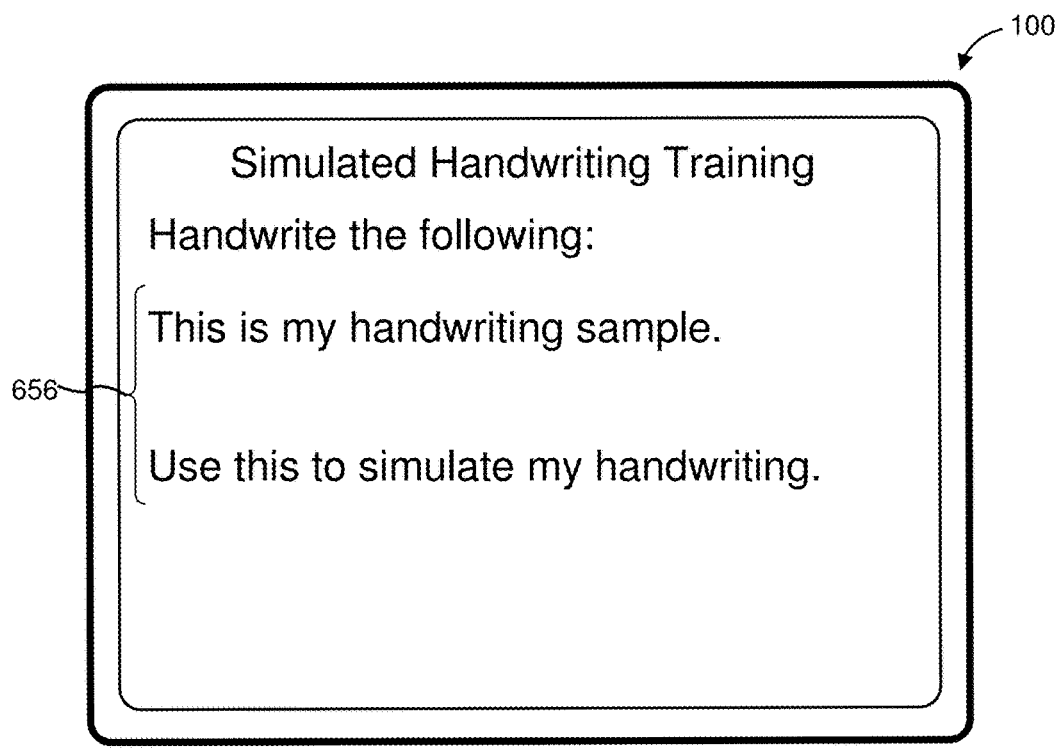
Figure 6R:
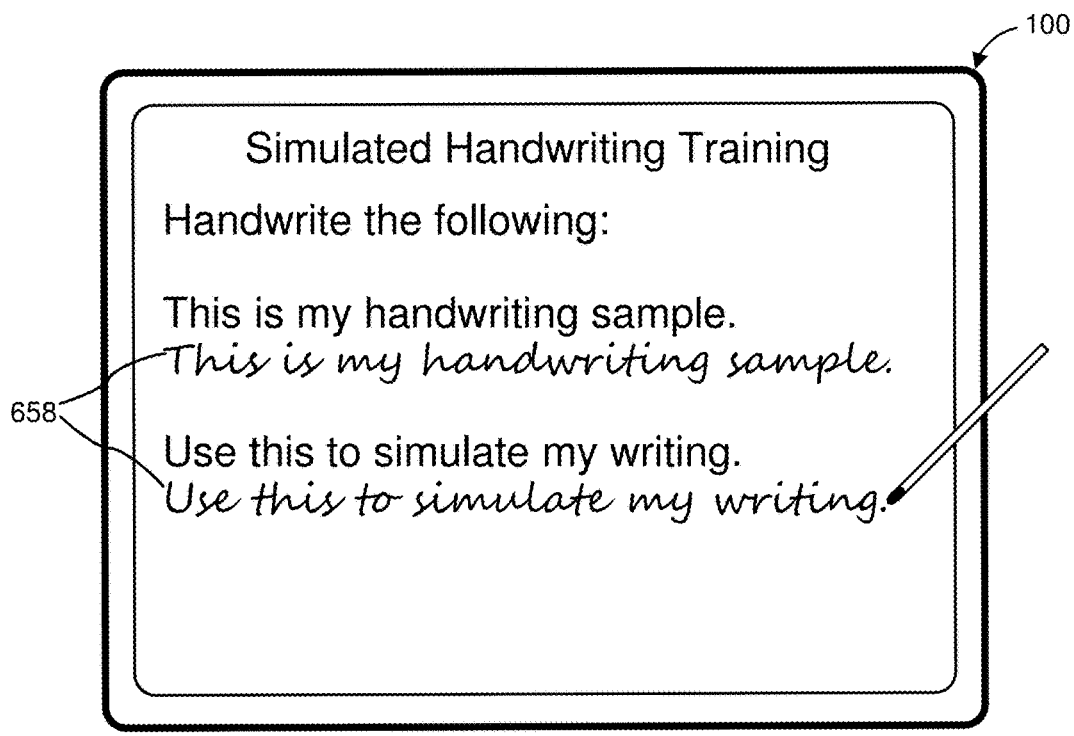

FIGS. 6Q-6R illustrate a sequence in which the device 100 explicitly requests specific samples of handwritten text of the user. In the example of FIG. 6Q, the device 100 displays predefined text 656, and requests the user to provide drawing inputs that correspond to the predefined text 656. After displaying the predefined text 656, the device 100 receives drawing inputs that correspond to handwritten text 658 of the user. The device 100 utilizes the handwritten text 658 of the user to synthesize simulated handwritten text that corresponds to the handwritten text 658 of the user. In other words, the device 100 utilizes the handwritten text 658 of the user as training data for a machine-learning model that synthesizes simulated handwritten text that is within a degree of similarity to the handwritten text 658 of the user. In some embodiments, the device 100 requests the user to provide multiple instances of handwritten text that correspond to the predefined text 656. In other words, in some embodiments, the device 100 requests the user to handwrite the same predefined text 656 multiple times. Receiving multiple instances of handwritten text that correspond to the same predefined text allows the device 100 to synthesize simulated handwritten text with varying appearances based on variations in the handwritten text. Receiving samples of handwritten text as training data enhances the operability of the device and makes the user-device interface more efficient (e.g., by enabling the device to synthesize simulated handwritten text based on the samples of handwritten text and reducing the need for drawing inputs corresponding to the user subsequently providing a sequence of characters in handwritten text of the user) which, additionally, reduces power usage and improves battery life of the device by enabling the user to use the device more quickly and efficiently.

Figure 6S:
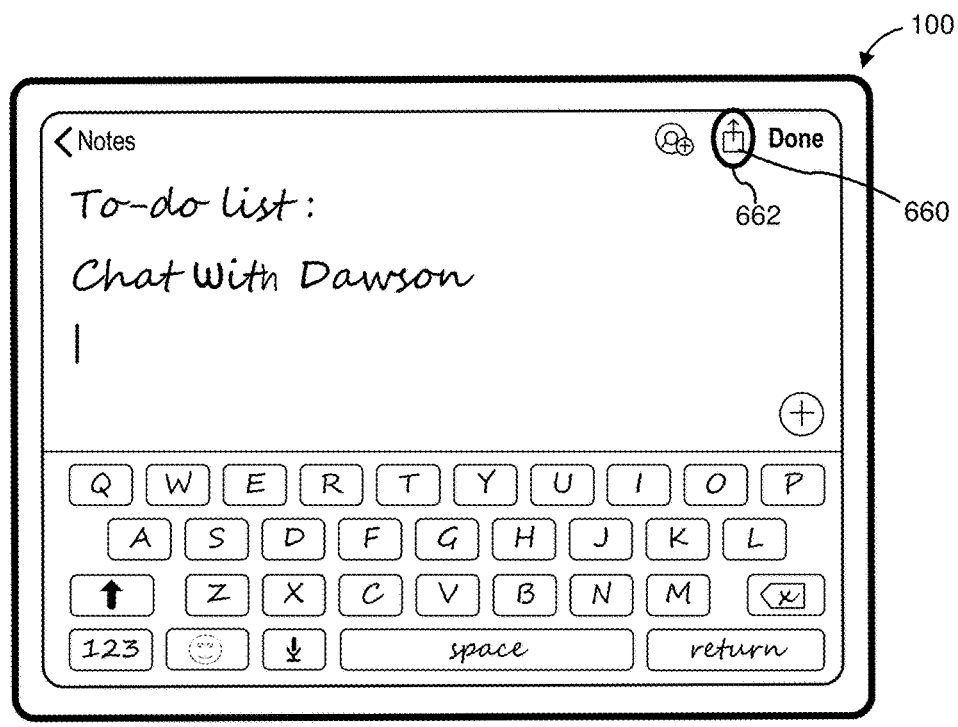
Figure 6T:
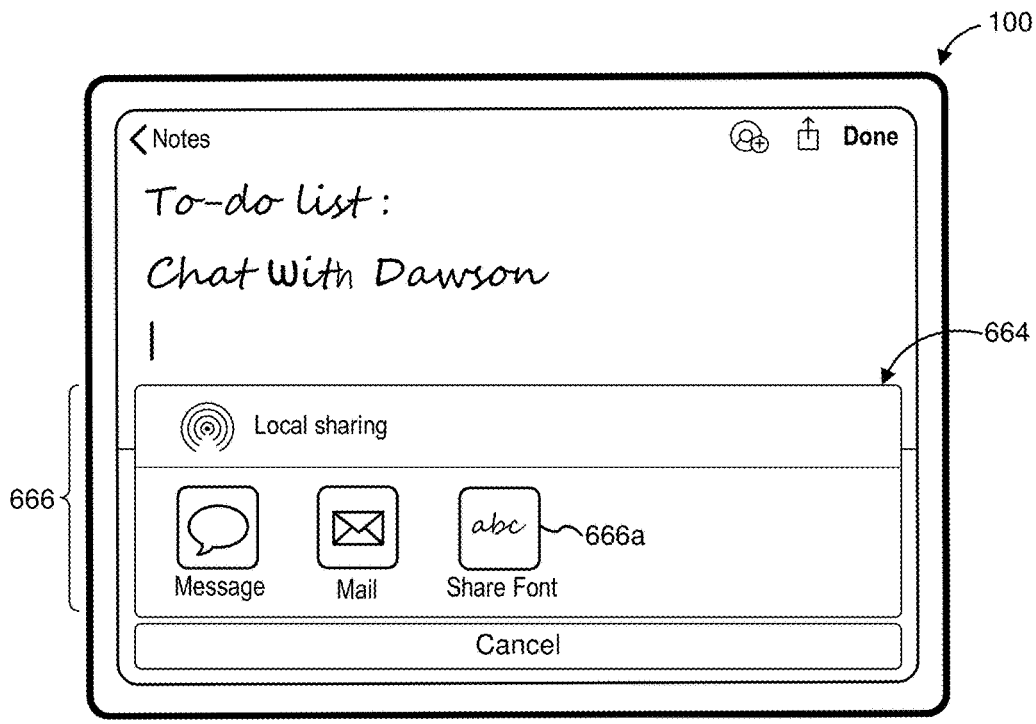
Figure 6U:
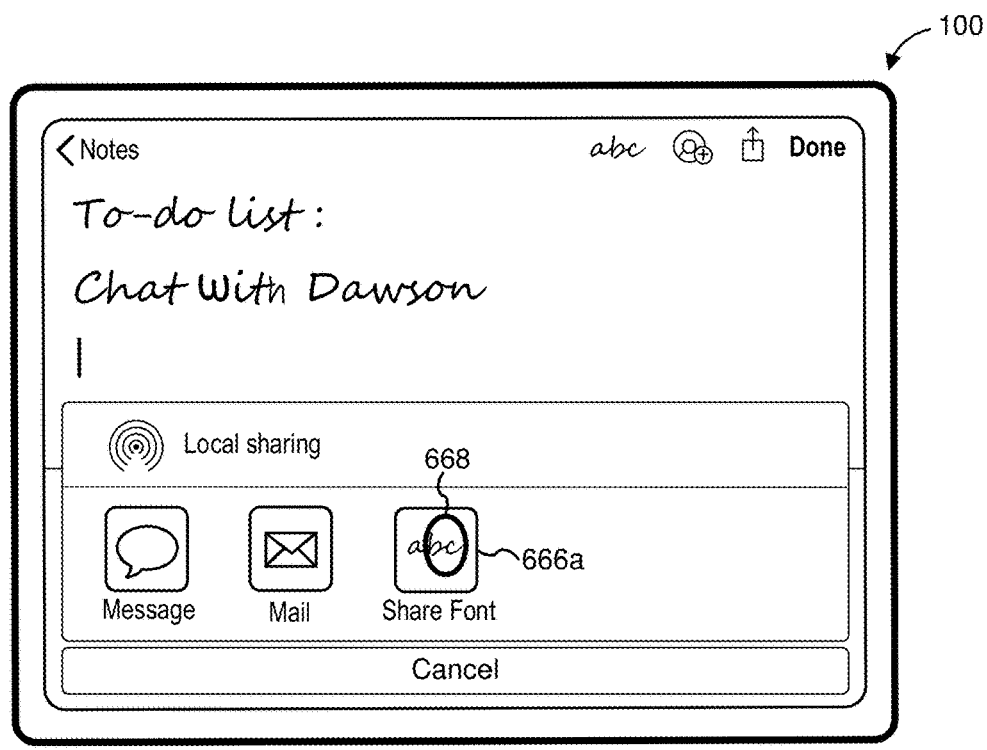
Figure 6V:
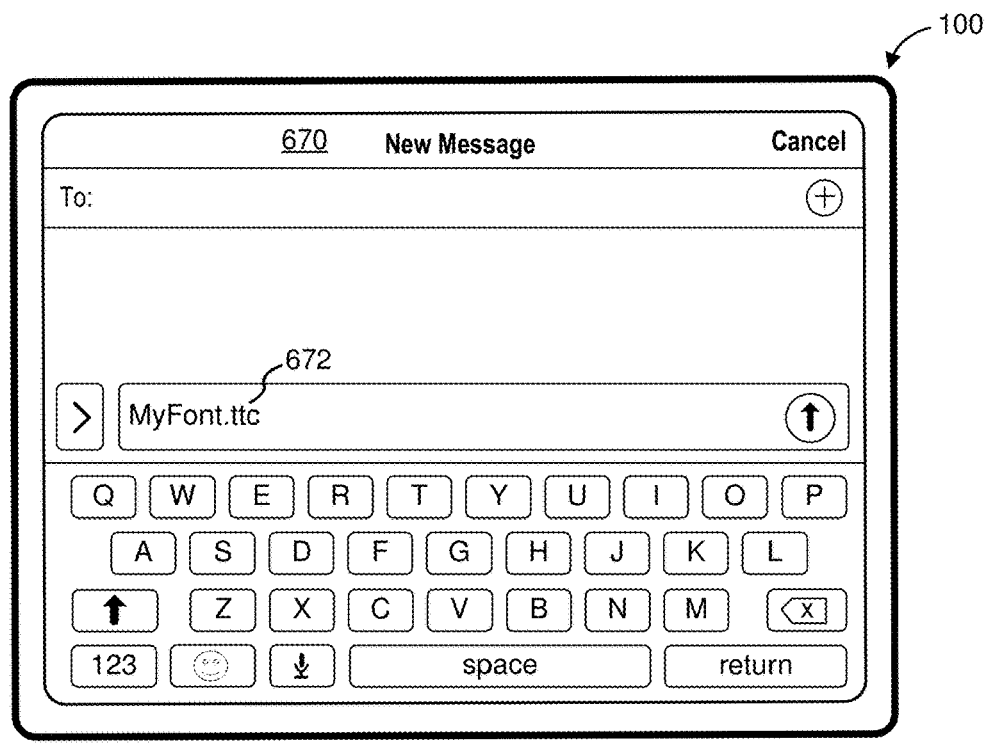

FIGS. 6S-6V illustrate a sequence in which the device 100 provides an option to share a font that corresponds to the simulated handwritten text. Sharing the font corresponding to the simulated handwritten text allows other users to display characters with the simulated handwritten text. In some embodiments, the device 100 creates a new font based on the handwritten text of the user. When the new font is selected, the device 100 displays characters in simulated handwritten text that corresponds to the handwritten text of the user. In the example of FIG. 6S, the device 100 displays a sharing affordance 660 that, when activated, displays various sharing options. The device 100 receives a user input 662 at a location corresponding to the sharing affordance 660. The user input 662 corresponds to a request to display sharing options. As illustrated in FIG. 6T, in response to receiving the user input 662, the device 100 displays a share sheet 664 that includes affordances 666 corresponding with respective sharing options. The affordances 666 include a share font affordance 666a that, when activated, causes the device 100 to initiate transmission of a font that generates simulated handwritten text corresponding to handwritten text of the user. In the example of FIG. 6U, the device 100 receives a user input 668 at a location corresponding to the share font affordance 666a. The user input 668 corresponds to a request to share the font that generates simulated handwritten text that corresponds to handwritten text of the user. As illustrated in FIG. 6V, in response to receiving the user input 668, the device 100 creates a new message 670 and includes the font as an attachment 672. Sharing the font allows other devices associated with other users to display characters in simulated handwritten text that corresponds to handwritten text of the user of the device 100. Sharing the font enhances the operability of the device and makes the user-device interface more efficient (e.g., by reducing the need for drawing inputs corresponding to handwritten text and transmitting the handwritten text to other devices associated with other users) which, additionally, reduces power usage and improves battery life of the device by enabling the user to use the device more quickly and efficiently.

Figure 6W:
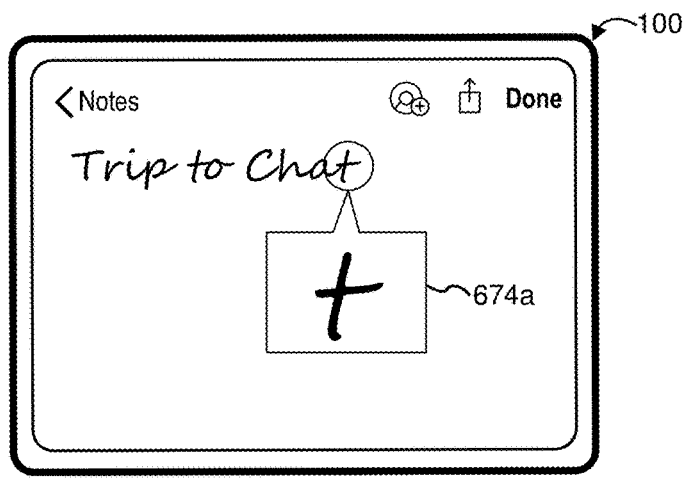
Figure 6X:
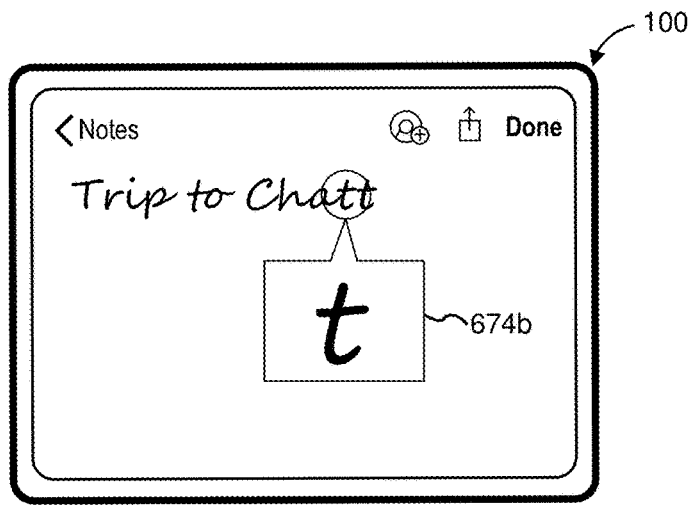
Figure 6Y:
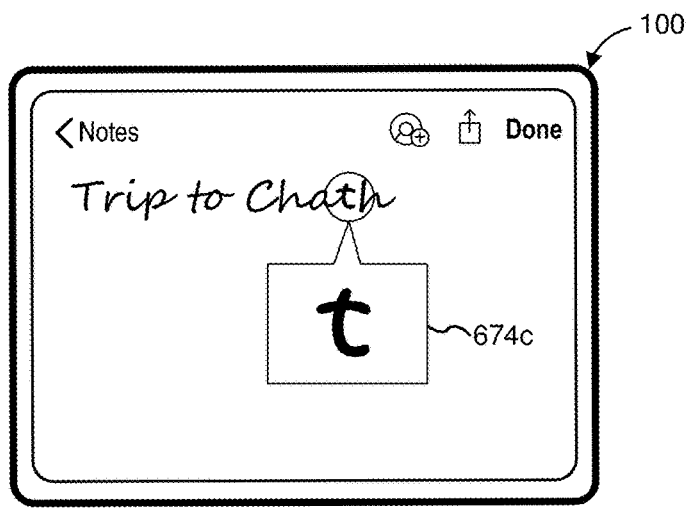

FIGS. 6W-6Y illustrate a sequence in which the device 100 changes the appearance of a first character, which is displayed in simulated handwritten text, after receiving a request to display a second character in simulated handwritten text. The change in the appearance of the first character is a function of the second character. In the example of FIG. 6W, the device 100 displays the character 't' with a first appearance 674a. In FIG. 6X, the device 100 changes the appearance of the character 't' to a second appearance 674b after receiving a request to display another 't'. By contrast, in FIG. 6Y, the device 100 changes the appearance of the character 't' to a third appearance 674c after receiving a request to display the character 'h'. As illustrated in the example of FIGS. 6W-6Y, the device 100 changes the appearance of the character 't' based on which character appears after the character 't'. In some embodiments, after receiving a request to display a character, the device 100 varies the appearance of one or more previous characters to correspond to similar variations in the handwritten text of the user. Varying the appearance of previous characters based on subsequent characters increases a degree of similarity between the simulated handwritten text and the handwritten text of the user. Varying the appearance of previous character based on a function of subsequent characters enhances the operability of the device and makes the user-device interface more efficient (e.g., by reducing the need for drawing inputs corresponding to the user providing a sequence of characters in handwritten text of the user) which, additionally, reduces power usage and improves battery life of the device by enabling the user to use the device more quickly and efficiently.

FIGS. 7A-7D illustrate a flow diagram of a method 700 of interacting with handwritten text in accordance with some embodiments. The method 700 is performed at an electronic device (e.g., the device 100 in FIG. 1A, or the device 300 in FIG. 3) with one or more processors, non-transitory memory, a display, and one or more input devices. In some embodiments, the display is a touch-screen display and the one or more input devices are on or integrated with the display. In some embodiments, the display is separate from the one or more input devices. Some operations in method 700 are, optionally, combined and/or the order of some operations is, optionally, changed.

Figure 7A:
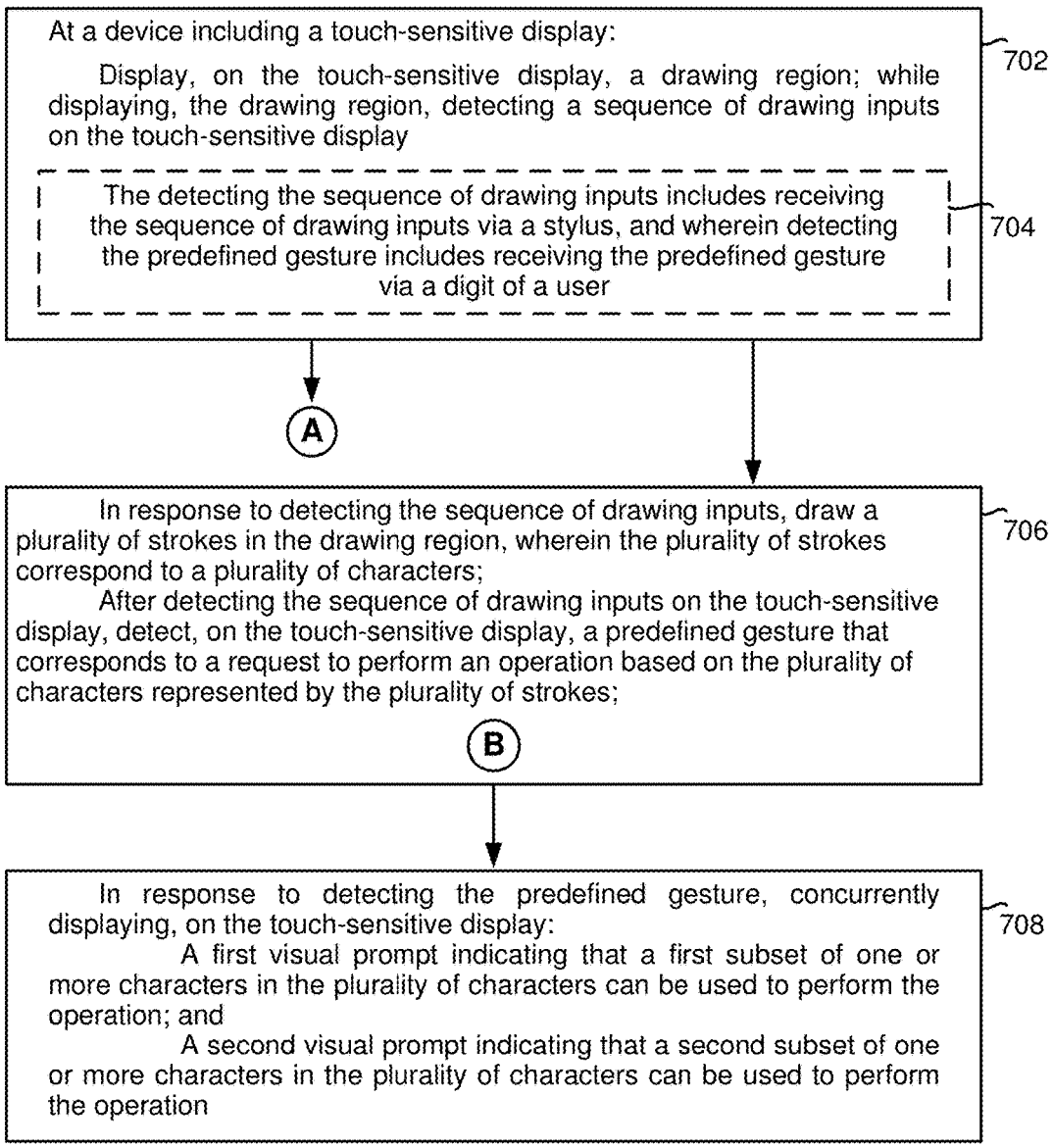
FIGS. 7A-7D are flow diagrams illustrating a method of interacting with handwritten text in accordance with some embodiments.

Referring to FIG. 7A, at a device including a touch-sensitive display, the device displays (702), on the touch-sensitive display, a drawing region (e.g., the drawing region 504 shown in FIG. 5A). While displaying, the drawing region, the device detects (702) a sequence of drawing inputs on the touch-sensitive display (e.g., the drawing input 506 shown in FIG. 5A). In some embodiments, the drawing region is generated by a note-taking application. In some embodiments, the note-taking application performs mathematical operations. In some examples, the note-taking application is a freeform spreadsheet application.

In response to detecting the sequence of drawing inputs, the device draws (706) (e.g., displays and/or renders) a plurality of strokes in the drawing region. The plurality of strokes correspond to a plurality of characters. In some implementations, at least some of the characters include numerical values. As an example, in FIG. 5B, the device 100 draws strokes 508 that correspond to characters 510.

After detecting the sequence of drawing inputs on the touch-sensitive display, the device detects (706), on the touch-sensitive display, a predefined gesture that corresponds to a request to perform an operation based on the plurality of characters represented by the plurality of strokes. In some embodiments, the predefined gesture includes a hard press or a long press, as described herein. As an example, in FIG. 5C, the device 100 detects the predefined gesture 512 that corresponds to a request to perform an operation based on the characters 510.

In response to detecting the predefined gesture, the device concurrently displays (708), on the touch-sensitive display, a first visual prompt indicating that a first subset of one or more characters in the plurality of characters can be used to perform the operation and a second visual prompt indicating that a second subset of one or more characters in the plurality of characters can be used to perform the operation. As an example, in FIG. 5D, the device 100 displays the first visual prompt 520*a* indicating that the device 100 can perform an operation based on the first subset of characters 510*a*, and the second visual prompt 520*b* indicating that the device 100 can perform an operation based on the second subset of characters 510*b*. Displaying the visual prompts indicates that the device recognizes characters written in handwritten text of the user, and can perform operations based on the characters written in the handwritten text. Recognizing and performing operations based on characters written in handwritten text of the user enhances the operability of the device and makes the user-device interface more efficient (e.g., by reducing the need for a sequence of user inputs corresponding to typing the characters into the device via a keyboard) which, additionally, reduces power usage and improves battery life of the device by enabling the user to use the device more quickly and efficiently.

In some embodiments, the detecting the sequence of drawing inputs includes (704) receiving the sequence of drawing inputs via a stylus (e.g., via the stylus 502 shown in FIG. 5A), and detecting a predefined gesture includes receiving the predefined gesture via a digit of a user (e.g., receiving the predefined gesture 512 shown in FIG. 5C).

Figure 7B:
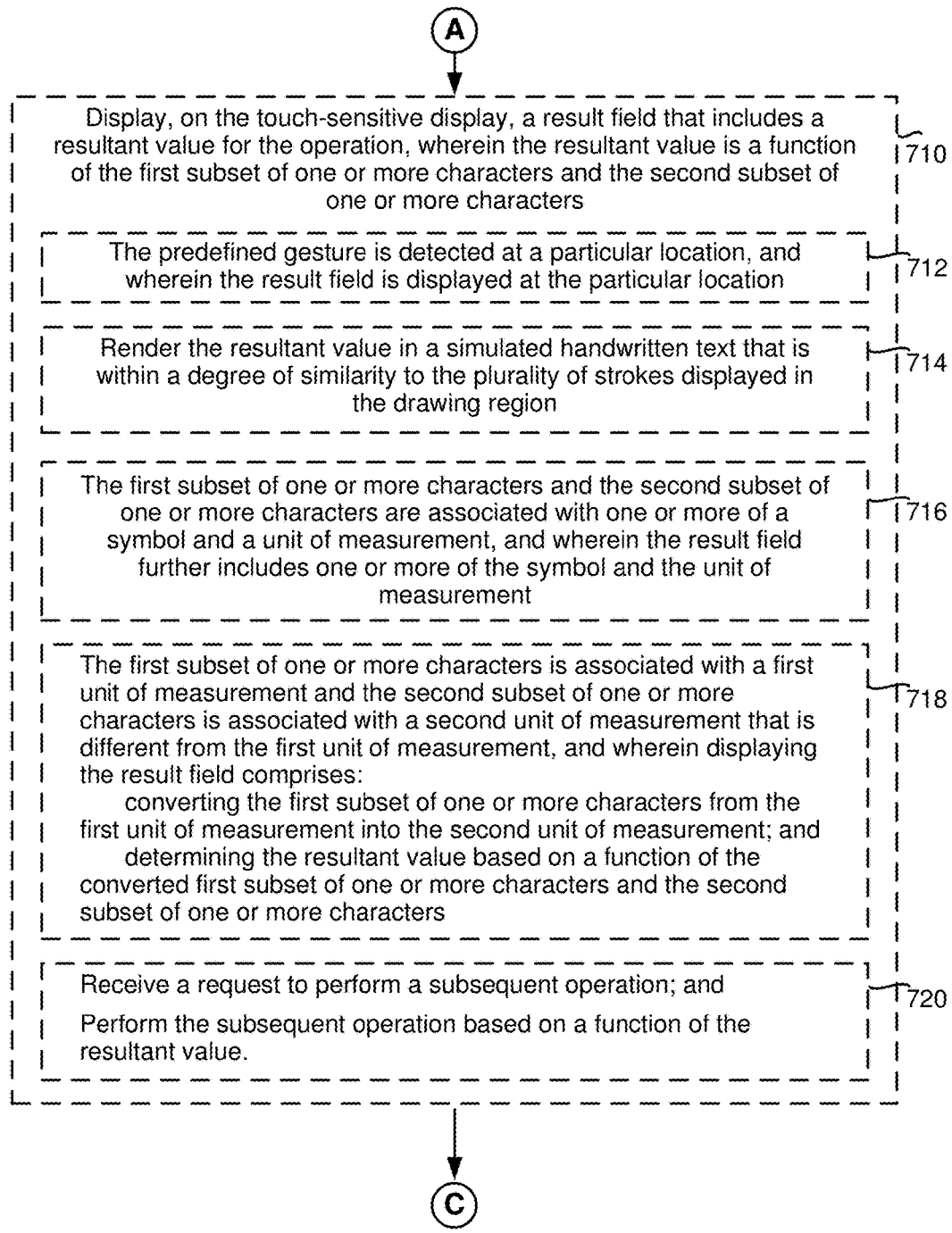

Referring to FIG. 7B, in some embodiments, the device displays (710), on the touch-sensitive display, a result field that includes a resultant value for the operation. The resultant value is a function of the first subset of one or more characters and the second subset of one or more characters. In some embodiments, the device detects (712) the predefined gesture at a particular location and displays (712) the result field at the particular location. As an example, in FIG. 5D, the device 100 displays the result field 530 at a location corresponding to the predefined gesture 512. As illustrated in FIG. 5L, the result field 530 includes a resultant value 534 for the operation. Displaying the result field with the resultant value enhances the operability of the device and makes the user-device interface more efficient (e.g., by reducing the need for a sequence of user inputs corresponding to typing the resultant value into the device via a keyboard) which, additionally, reduces power usage and improves battery life of the device by enabling the user to use the device more quickly and efficiently.

In some embodiments, the device renders (714) the resultant value in a simulated handwritten text that is within a degree of similarity to the plurality of strokes displayed in the drawing region. In some embodiments, an appearance of the simulated handwritten text corresponds to an appearance of handwritten text of the respective user. In some embodiments, the simulated handwritten text is generated by one or more of the steps of method 800 described in greater detail below. Displaying the resultant value in the simulated handwritten text enhances the operability of the device and makes the user-device interface more efficient (e.g., by reducing the need for a sequence of user inputs corresponding to typing the resultant value into the device via a keyboard) which, additionally, reduces power usage and improves battery life of the device by enabling the user to use the device more quickly and efficiently.

In some embodiments, the first subset of one or more characters and the second subset of one or more characters are associated with (716) one or more of a symbol (e.g., a '$' sign) and a unit of measurement (e.g., 'kg', 'm', etc.). The result field further includes one or more of the symbol and the unit of measurement. As an example, in FIG. 5L, the result field 530 includes the '$' sign, for example, because the subsets of characters 510*a*, 510*b* and 510*c* include the '$' sign. Including the symbol and/or the unit of measurement associated with the subsets of characters into the result field indicates that the resultant value in the result field is a function of the subsets of characters. Including the symbol and/or unit of measurement in the result field enhances the operability of the device and makes the user-device interface more efficient (e.g., by reducing the need for a sequence of user inputs corresponding to typing the resultant value into the device via a keyboard) which, additionally, reduces power usage and improves battery life of the device by enabling the user to use the device more quickly and efficiently.

In some embodiments, the first subset of one or more characters is associated with (718) a first unit of measurement (e.g., 'lb') and the second subset of one or more characters is associated with (718) a second unit of measurement (e.g., 'kg') that is different from the first unit of measurement. In such embodiments, displaying the result field includes (718) converting the first subset of one or more characters from the first unit of measurement into the second unit of measurement (e.g., convert the first subset of characters from 'lb' to 'kg'). The device determines (718) the resultant value based on a function of the converted first subset of one or more characters and the second subset of one or more characters (e.g., add two values that are both in 'kg'). Performing unit conversions enhances the operability of the device and makes the user-device interface more efficient (e.g., by reducing the need for a sequence of user inputs corresponding to typing the characters in accordance with the converted unit of measurement) which, additionally, reduces power usage and improves battery life of the device by enabling the user to use the device more quickly and efficiently.

In some embodiments, the device receives (720) a request to perform a subsequent operation and performs (720) the subsequent operation based on a function of the resultant value. As an example, in FIGS. 5O-5R, the device 100 utilizes the resultant value 534 in a subsequent operation. For example, as shown in FIG. 5V, the second result field 530*a* corresponding to a second operation is based on the resultant value 534 from a previous operation. Performing the subsequent operation based on a function of the resultant value enhances the operability of the device and makes the user-device interface more efficient (e.g., by reducing the need for a sequence of user inputs corresponding to typing the resultant value into the device via a keyboard) which, additionally, reduces power usage and improves battery life of the device by enabling the user to use the device more quickly and efficiently.

Figure 7C:
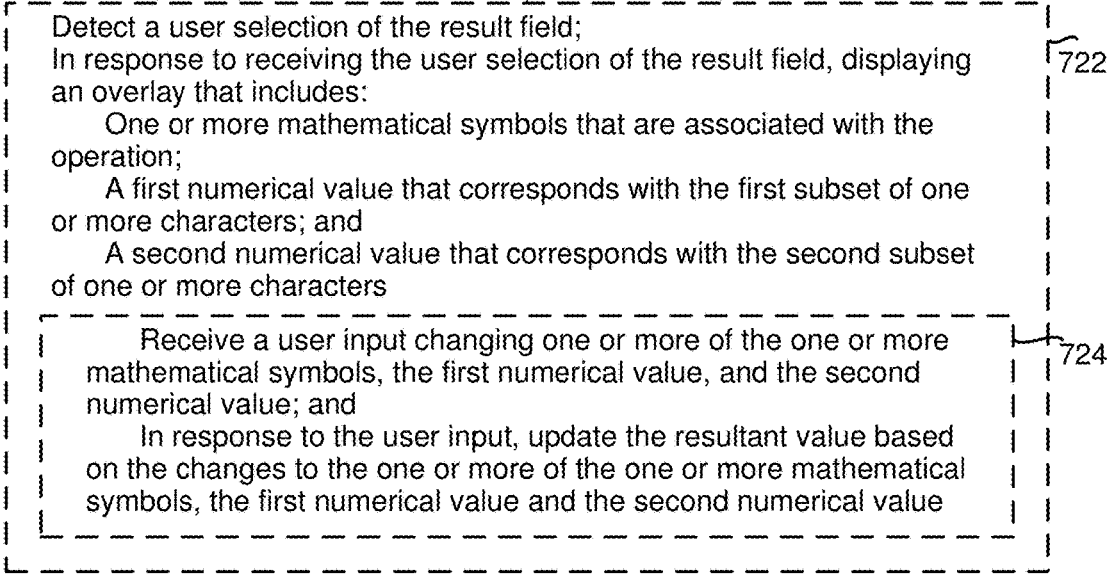
Figure 7C:
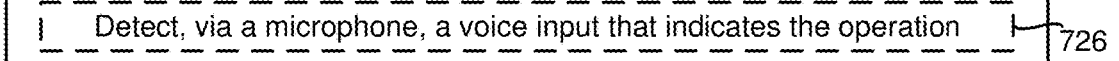

Referring to FIG. 7C, in some embodiments, the device detects (722) a user selection of the result field. In response to receiving the user selection of the result field (e.g., tapping and holding the result field), the device displays (722) an overlay that includes one or more mathematical symbols that are associated with the operation, a first numerical value that corresponds with the first subset of one or more characters, and a second numerical value that corresponds with the second subset of one or more characters. In some embodiments, the device receives (724) a user input changing one or more of the one or more mathematical symbols, the first numerical value, and the second numerical value. In some implementations, the user can change the symbols/values by writing over them. In some implementations, the user can erase an existing symbol/value. In some implementations, the user can write an additional symbol/value. In response to the user input, the device updates (724) the resultant value based on the changes to the one or more of the one or more mathematical symbols, the first numerical value and the second numerical value. As an example, in FIGS. 5S-5V, the device 100 displays an overlay 560 that provides an option to make changes to the operation. Displaying an overlay (e.g., the overlay 560) in response to a selection of a result field provides an intuitive and user-friendly way to change the operation and/or the values associated with the result field. Providing an option to change the operation and/or the values associated with the result field enhances the operability of the device and makes the user-device interface more efficient (e.g., by reducing the need for a sequence of user inputs corresponding to typing different mathematical symbols and/or values into the device via a keyboard) which, additionally, reduces power usage and improves battery life of the device by enabling the user to use the device more quickly and efficiently.

In some embodiments, the device detects (726), via a microphone, a voice input that indicates the operation. For example, in some embodiments, the device receives a spoken command (e.g., "sum all the numbers") to perform an operation.

Figure 7D:
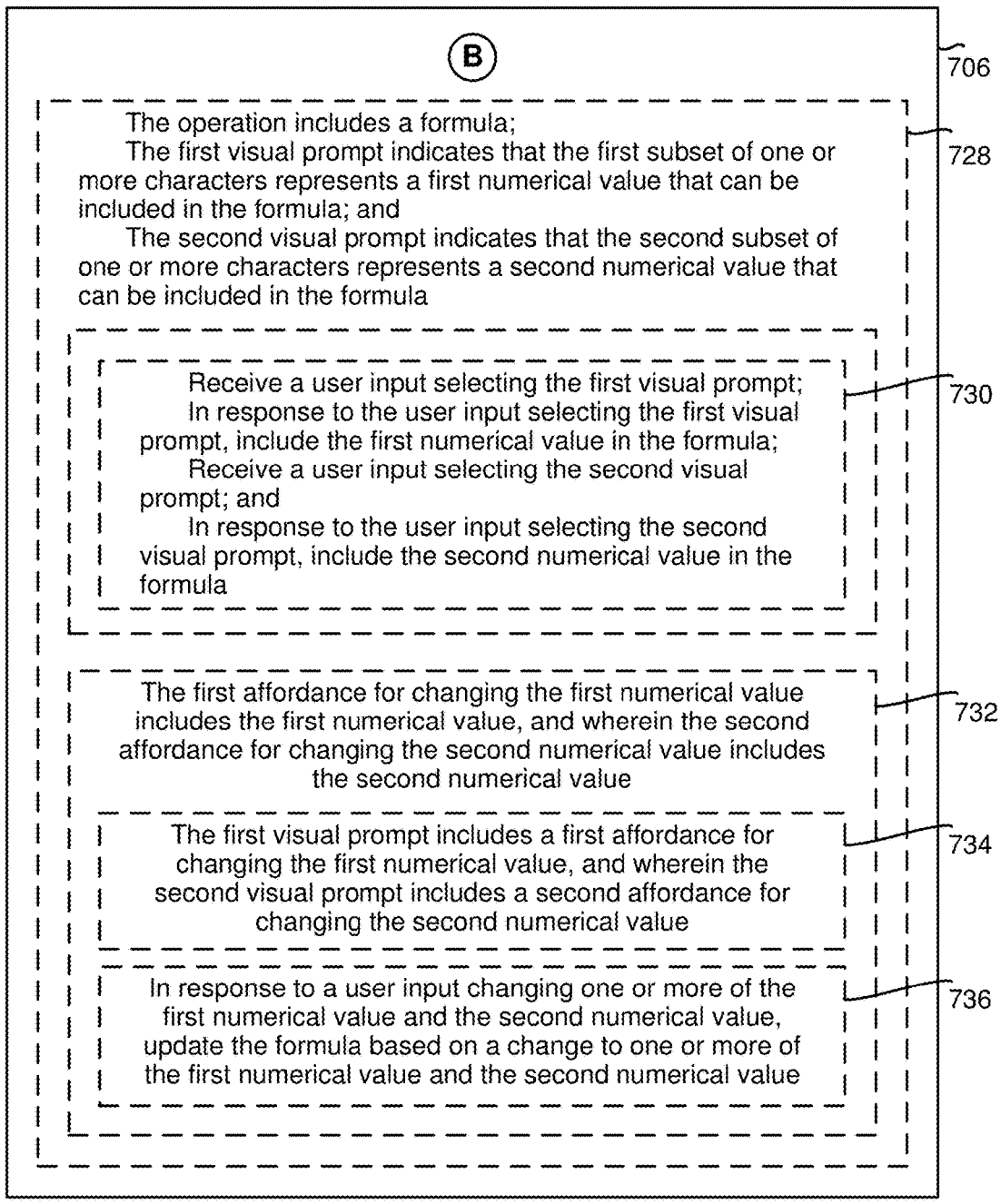

Referring to FIG. 7D, in some embodiments, the operation includes (728) a formula. In some implementations, the formula is a default formula that can be changed by the user. For example, in some implementations, the default formula is addition. The first visual prompt indicates (728) that the first subset of one or more characters represents a first numerical value that can be included in the formula and the second visual prompt indicates (728) that the second subset of one or more characters represents a second numerical value that can be included in the formula. As an example, in FIGS. 5S-5V, the device 100 displays an overlay 560 that provides an option to change the default formula. Providing an option to change the default formula enhances the operability of the device and makes the user-device interface more efficient (e.g., by reducing the need for a sequence of user inputs corresponding to typing different mathematical symbols corresponding with a different formula) which, additionally, reduces power usage and improves battery life of the device by enabling the user to use the device more quickly and efficiently.

In some embodiments, the device receives (730) a user input selecting the first visual prompt. In some implementations, the user taps on the first visual prompt to select the first visual prompt. In response to the user input selecting the first visual prompt, the device includes (730) the first numerical value in the formula. The device receives (730) a user input selecting the second visual prompt. In response to the user input selecting the second visual prompt, the device includes (730) the second numerical value in the formula. As an example, in FIGS. 5E-5F, the device 100 includes the first recognized numerical value 522*a* into the result field 530 in response to receiving the user input 540 selecting the first visual prompt 520*a*. Including a recognized value into the result field in response to a selection of the corresponding visual prompt enhances the operability of the device and makes the user-device interface more efficient (e.g., by reducing the need for a sequence of user inputs corresponding to typing the numerical value into the device via a keyboard) which, additionally, reduces power usage and improves battery life of the device by enabling the user to use the device more quickly and efficiently.

In some embodiments, the first affordance for changing the first numerical value includes (732) the first numerical value. The second affordance for changing the second numerical value includes (732) the second numerical value. In some embodiments, the first visual prompt includes (734) a first affordance for changing the first numerical value. The second visual prompt includes (734) a second affordance for changing the second numerical value. As an example, in FIGS. 5Y-5Z, the device 100 receives a user input 580 corresponding to a request to change the recognized numerical value 522*e*. In response to receiving the user input 580, the device 100 displays a keypad 582 that allows the user to change the recognized numerical value 522*e*. Providing an option to change a numerical value enhances the operability of the device and makes the user-device interface more efficient (e.g., by reducing the need for a sequence of drawing inputs corresponding to re-writing the subset of characters) which, additionally, reduces power usage and improves battery life of the device by enabling the user to use the device more quickly and efficiently.

In some embodiments, in response to a user input changing one or more of the first numerical value and the second numerical value, the device updates (736) the formula based on a change to one or more of the first numerical value and the second numerical value. As an example, in FIGS. 5M-5N, the device 100 receives a drawing input 548 that changes the second subset of characters 510*b*. In response to receiving the drawing input 548, the device 100 determines and displays the updated resultant value 534' based on the change to the second subset of characters 510*b*. Updating the result field in response to drawing inputs that change subsets of characters enhances the operability of the device and makes the user-device interface more efficient (e.g., by reducing the need for a sequence of user inputs corresponding to a subsequent request to update the result field or to display a new result field based on the changes) which, additionally, reduces power usage and improves battery life of the device by enabling the user to use the device more quickly and efficiently.

It should be understood that the particular order in which the operations in FIGS. 7A-7D have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., method 800) are also applicable in an analogous manner to method 700 described above with respect to FIGS. 7A-7D. For example, the user interfaces, user interface elements, drawing inputs, predefined gestures, visual prompts, etc., described above with reference to method 700 optionally have one or more of the characteristics of the user interfaces, user interface elements, drawing inputs, predefined gestures, visual prompts, etc. described herein with reference to other methods described herein (e.g., method 800). For brevity, these details are not repeated here.

The operations in the information processing methods described above are, optionally implemented by running one or more functional modules in information processing apparatus such as general purpose processors (e.g., as described above with respect to FIGS. 1A and 3) or application specific chips. Further, the operations described above with reference to FIGS. 7A-7D are, optionally, implemented by components depicted in FIGS. 1A-1B, or FIG. 3. For example, the detect operation 706 is, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

FIGS. 8A-8E illustrate a flow diagram of a method 800 of displaying characters in simulated handwritten text that corresponds to handwritten text of a user. The method 800 is performed at an electronic device (e.g., the device 100 in FIG. 1A, or the device 300 in FIG. 3) with a one or more processors, non-transitory memory, a display, and one or more input devices. In some embodiments, the display is a touch-screen display and the one or more input devices are on or integrated with the display. In some embodiments, the display is separate from the one or more input devices. Some operations in method 800 are, optionally, combined and/or the order of some operations is, optionally, changed.

Figure 8A:
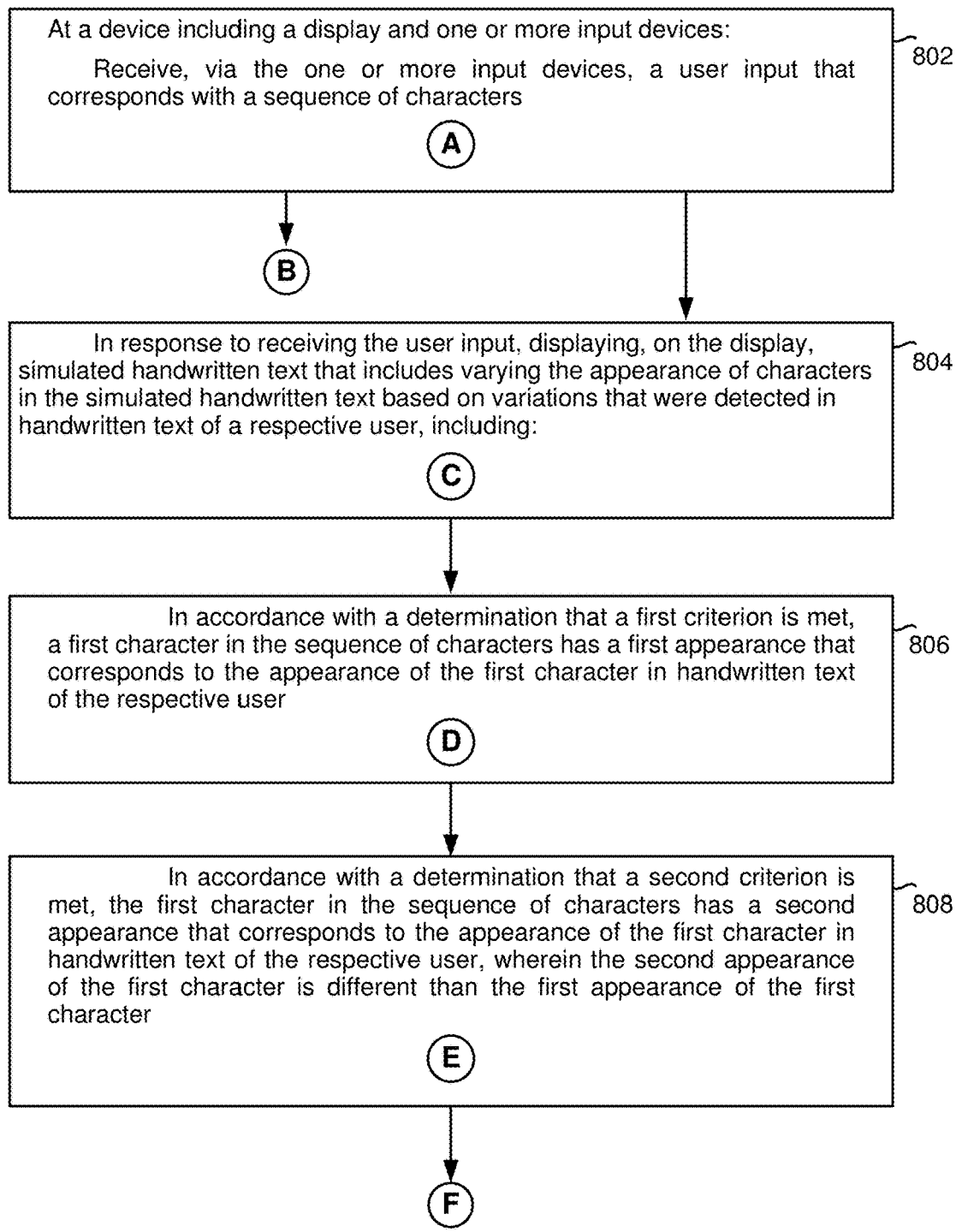

Referring to FIG. 8A, at a device including a display and one or more input devices, the device receives (802), via the one or more input devices, a user input that corresponds with a sequence of characters. As an example, in FIG. 6A, the device 100 receives the user input 604 that corresponds to a request to type the character 'T'. In response to receiving the user input, the device displays (804), on the display, simulated handwritten text that includes varying the appearance of characters in the simulated handwritten text based on variations that were detected in handwritten text of a respective user. As an example, in FIG. 6B, the device 100 displays the simulated handwritten text 606. In some embodiments, the simulated handwritten text is within a degree of similarity to handwritten text of the user. Since the simulated handwritten text is within a degree of similarity to handwritten text of the user, displaying the sequence of characters in the simulated handwritten text reduces the need for a sequence of drawing inputs corresponding to the sequence of characters. Displaying the sequence of characters in simulated handwritten text enhances the operability of the device and makes the user-device interface more efficient (e.g., by reducing the need for drawing inputs corresponding to the user providing the sequence of characters as handwritten text) which, additionally, reduces power usage and improves battery life of the device by enabling the user to use the device more quickly and efficiently.

Displaying the simulated handwritten text includes (806), in accordance with a determination that a first criterion is met, a first character in the sequence of characters has a first appearance that corresponds to the appearance of the first character in handwritten text of the respective user. In some embodiments, in response to receiving the user input that corresponds with the sequence of characters and in accordance with a determination that a second criterion is met, the first character in the sequence of characters (808) has a second appearance that corresponds to the appearance of the first character in handwritten text of the respective user, wherein the second appearance of the first character is different than the first appearance of the first character. As an example, in FIG. 6C, the device 100 displays the character 'w' with a first appearance 610*a* in response to the character 'w' appearing at the beginning of a word, and a second appearance 610*b* in response to the character 'w' appearing in the middle of a word. Varying the appearances of the first character results in simulated handwritten text that is within a degree of similarity to the handwritten text of the user. Synthesizing handwritten text that is within a degree of similarity to the handwritten text of the user enhances the operability of the device and makes the user-device interface more efficient (e.g., by reducing the need for drawing inputs corresponding to the user providing characters as handwritten text) which, additionally, reduces power usage and improves battery life of the device by enabling the user to use the device more quickly and efficiently.

Figure 8B:
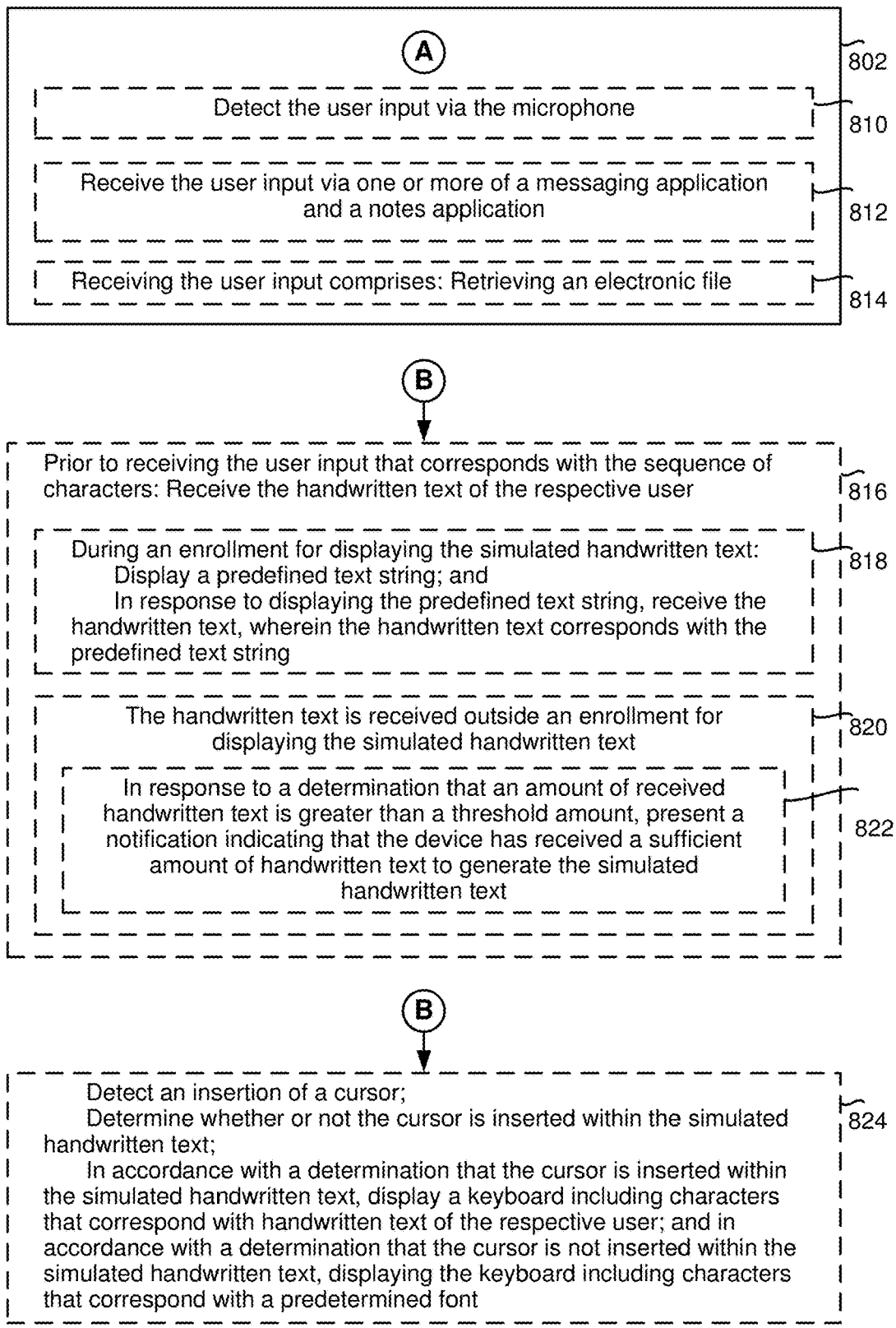

Referring to FIG. 8B, in some embodiments, the device detects (810) the user input via the microphone (e.g., the device 100 detects that the user of the device 100 is dictating the sequence of characters). In some embodiments, the device receives (812) the user input via one or more of a messaging application and a notes application. In some embodiments, the user is typing a message in the messaging application, and the message appears in the simulated handwritten text as the user is typing the message. In some embodiments, the user is taking notes in the notes application, and the notes appear in the simulated handwritten text as the user is typing the notes. In some embodiments, receiving the user input includes (814) receives a request to retrieve an electronic file (e.g., a text file with typed text). In some examples, the electronic file is saved on the device. In some examples, the electronic file is stored remotely.

In some embodiments, the device, prior to receiving the user input that corresponds with the sequence of characters, receives (816) the handwritten text of the respective user. In some embodiments, the device, during an enrollment for displaying the simulated handwritten text, displays (818) a predefined text string (e.g., the predefined text 656 shown in FIGS. 6Q-6R). In response to displaying the predefined text string, the device receives (818) the handwritten text, where the handwritten text corresponds with the predefined text string. As an example, in FIGS. 6Q-6R, the device 100 receives samples of handwritten text 658 that correspond to predefined text 656 (e.g., as part of a training program). In some embodiments, the device utilizes the handwritten text as training data for a machine-learning model that synthesizes simulated handwritten text. Receiving samples of handwritten text as training data enhances the operability of the device and makes the user-device interface more efficient (e.g., by enabling the device to synthesize simulated handwritten text based on the samples of handwritten text and reducing the need for drawing inputs corresponding to the user subsequently providing a sequence of characters in handwritten text of the user) which, additionally, reduces power usage and improves battery life of the device by enabling the user to use the device more quickly and efficiently.

In some embodiments, the handwritten text is received (820) outside an enrollment for displaying the simulated handwritten text (e.g., the device does not explicitly request the handwritten text, rather the device passively gathers the handwritten text). In some embodiments, the device, in response to a determination that an amount of received handwritten text is greater than a threshold amount, presents (822) a notification indicating that the device has received a sufficient amount of handwritten text to generate the simulated handwritten text. In some embodiments, the notification includes an affordance that, when activated, enrolls the user for displaying simulated handwritten text. As an example, in FIGS. 6O-6P, the device 100 displays the notification 652 and receives a user input 654 corresponding to a request to enable typing with simulated handwritten text. Displaying the notification provides the user an option to enable typing with simulated handwritten text. Enabling typing with simulated handwritten text enhances the operability of the device and makes the user-device interface more efficient (e.g., by reducing the need for drawing inputs corresponding to the user providing a sequence of characters in handwritten text of the user) which, additionally, reduces power usage and improves battery life of the device by enabling the user to use the device more quickly and efficiently.

In some embodiments, the device detects (824) an input corresponding to a request to insert a cursor. In some embodiments, the device determines whether or not the cursor is inserted within the simulated handwritten text. In response to detecting the input that corresponds to the request to insert the cursor and in accordance with a determination that the cursor is inserted within the simulated handwritten text, the device displays (824) a keyboard including characters that correspond with handwritten text of the respective user. In some implementations, the characters on the keyboard appear as handwritten characters. In response to detecting the input that corresponds to the request to insert the cursor and in accordance with a determination that the cursor is not inserted within the simulated handwritten text, the device displays (824) the keyboard including characters that correspond with a predetermined font (e.g., the characters on the keyboard are displayed in a standard font). As an example, in FIGS. 6K-6N, the device 100 detects insertion of the cursor 644 within the simulated handwritten text 646. In response to detecting the insertion of the cursor 644 within the simulated handwritten text 646, the device 100 switches an appearance of the characters in the keyboard 636 from the second appearance 640*b* to the first appearance 640*a* corresponding to simulated handwritten text. Displaying characters of the keyboard in simulated handwritten text triggers typing with the simulated handwritten text. Triggering typing with simulated handwritten text enhances the operability of the device and makes the user-device interface more efficient (e.g., by reducing the need for drawing inputs corresponding to the user providing a sequence of characters in handwritten text of the user) which, additionally, reduces power usage and improves battery life of the device by enabling the user to use the device more quickly and efficiently.

Figure 8C:
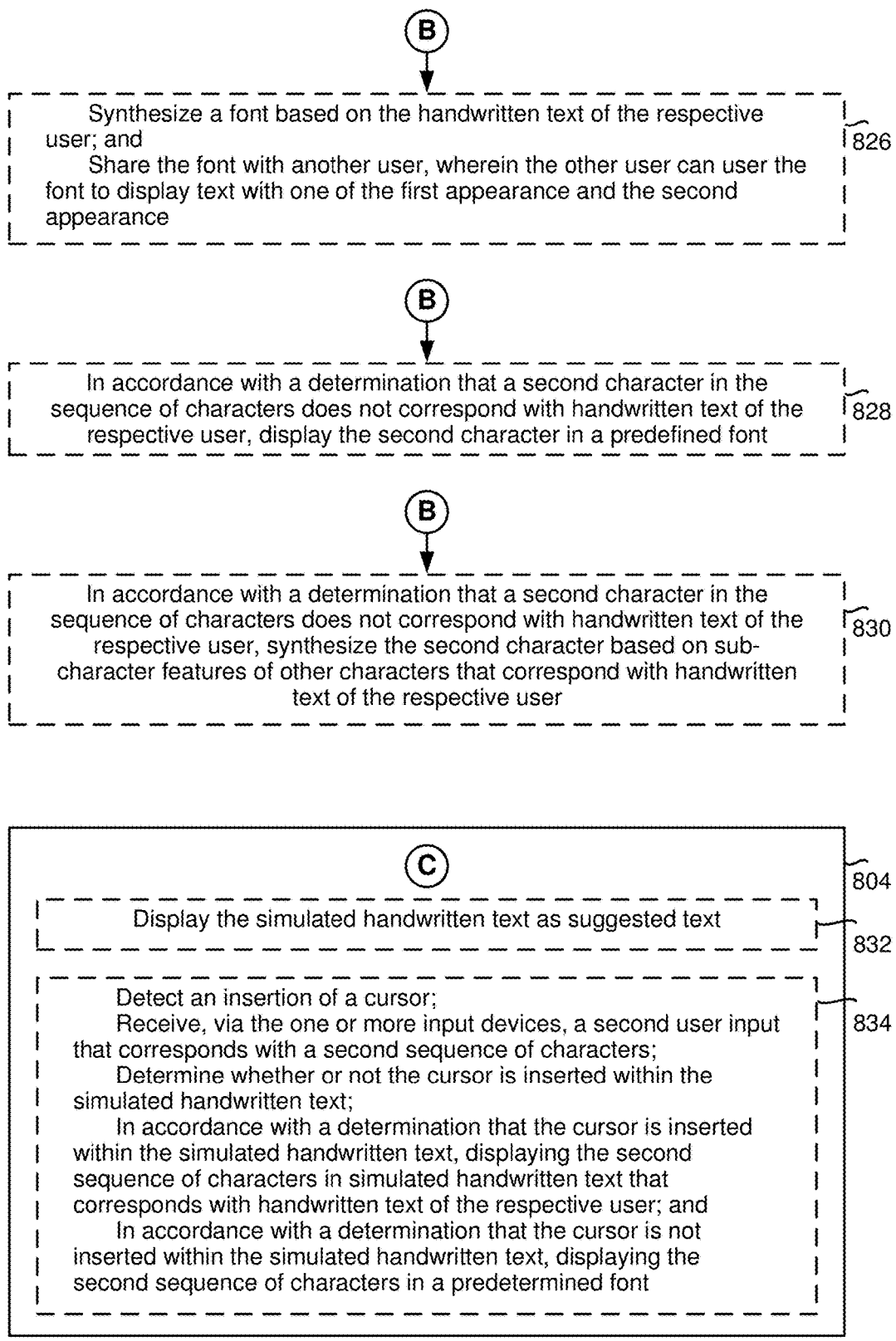

Referring to FIG. 8C, in some embodiments, the device synthesizes (826) a font based on the handwritten text of the respective user and shares (826) the font with another user (e.g., with another device associated with the other user). The other user can use the font to display text with one of the first appearance and the second appearance. In some implementations, the font can be shared via a message. In some implementations, the other user can configure their device to display messages received from the first user in the font that corresponds with the first user's handwriting. As an example, in FIGS. 6S-6V, the device 100 provides an option to share a font that corresponds to the simulated handwritten text. For example, in response to receiving the user input 668, the device 100 creates a new message 670 and includes the font as an attachment 672. Sharing the font allows other devices associated with other users to display characters in simulated handwritten text that corresponds to handwritten text of the user of the device 100. Sharing the font enhances the operability of the device and makes the user-device interface more efficient (e.g., by reducing the need for drawing inputs corresponding to handwritten text and transmitting the handwritten text to other devices associated with other users) which, additionally, reduces power usage and improves battery life of the device by enabling the user to use the device more quickly and efficiently.

In some embodiments, the device, in accordance with a determination that a second character in the sequence of characters does not correspond with handwritten text of the respective user, displays (828) the second character in a predefined font. As an example, in FIG. 6I, the device 100 displays some of the keys (e.g., keys 638*a* and 638*b*) with a first appearance 640*a* that corresponds to simulated handwritten text, and the remaining keys (e.g., keys 638*c*, 638*d*, 638*e* and 638*f*) with a second appearance 640*b* that corresponds to a standard font (e.g., 'Arial', 'Times New Roman', etc.). Displaying the second character in the predefined font indicates that the device does not have sufficient handwritten samples of the second character to synthesize simulated handwritten text for the second character.

In some embodiments, the device, in accordance with a determination that a second character in the sequence of characters does not correspond with handwritten text of the respective user, synthesizes (830) the second character based on sub-character features of other characters that correspond with handwritten text of the respective user. In some implementations, the second character is a symbol (e.g., a Chinese character) with no corresponding handwritten text of the user. In some embodiments, the device synthesizes the second character by selecting sub-character features (e.g., line segments, line angles, line thicknesses, etc.) of other character that are within a degree of similarity of the second character. Synthesizing the second character based on sub-character features of other characters enables the device to display the second character in simulated handwritten text. Displaying the second character in simulated handwritten text enhances the operability of the device and makes the user-device interface more efficient (e.g., by reducing the need for drawing inputs corresponding to the second character) which, additionally, reduces power usage and improves battery life of the device by enabling the user to use the device more quickly and efficiently.

In some embodiments, the device displays (832) the simulated handwritten text as suggested text (e.g., in a notes application, in a messaging application, etc.). As an example, in FIGS. 6G-6H, the device 100 displays suggested strings 634 above a keyboard 636. Displaying a suggested string in simulated handwritten text enhances the operability of the device and makes the user-device interface more efficient (e.g., by reducing the need for drawing inputs corresponding to the suggested string and/or by reducing the need for a sequence of user inputs corresponding to typing the suggested string into the device via a keyboard) which, additionally, reduces power usage and improves battery life of the device by enabling the user to use the device more quickly and efficiently.

In some embodiments, the device detects (834) an input corresponding to a request to insert a cursor. The device receives (834), via the one or more input devices, a second user input that corresponds with a second sequence of characters. In some embodiments, after detecting the input corresponding to the request to insert the cursor, the device determines (834) whether or not the cursor is inserted within the simulated handwritten text. In response to receiving the second user input and in accordance with a determination that the cursor is inserted within the simulated handwritten text, the device displays (834) the second sequence of characters in simulated handwritten text that corresponds with handwritten text of the respective user. In response to receiving the second user input and in accordance with a determination that the cursor is not inserted within the simulated handwritten text, the device displays (834) the second sequence of characters in a predetermined font. As an example, in FIGS. 6K-6N, the device 100 detects the insertion of the cursor 644 within the simulated handwritten text 646. In response to detecting the insertion of the cursor 644 within the simulated handwritten text 646, the device 100 switches an appearance of the characters in the keyboard 636 from the second appearance 640b to the first appearance 640a corresponding to simulated handwritten text. In other words, in response to detecting an insertion of a cursor within simulated handwritten text, the device 100 triggers typing with simulated handwritten text that corresponds to handwritten text of the user. Triggering typing with simulated handwritten text enhances the operability of the device and makes the user-device interface more efficient (e.g., by reducing the need for drawing inputs corresponding to the user providing a sequence of characters in handwritten text of the user) which, additionally, reduces power usage and improves battery life of the device by enabling the user to use the device more quickly and efficiently.

Referring to FIG. 8D, in some embodiments, the first appearance is associated with (836) one or more of a first line angle, a first line shape and a first line thickness. The second appearance is associated (836) with one or more of a second line angle that is different from the first line angle, a second line shape that is different from the first line shape and a second line thickness that is different from the first line thickness. In some embodiments, the first character includes (838) a first stroke and a second stroke. The first appearance is associated with (838) a first proportion between the first stroke and the second stroke. The second appearance is associated with (838) a second proportion between the first stroke and the second stroke, the second proportion being different from the first proportion. As an example, in FIG. 6C, in the first appearance 610a of the character 'w', one of the outer segments of 'w' has a first line angle 612a (e.g., 90 degrees). By contrast, in the second appearance 610b of the character 'w', the outer segment of 'w' has a second line angle 612b (e.g., an acute angle). Varying the appearances of a character results in simulated handwritten text that is within a degree of similarity to the handwritten text of the user. Synthesizing handwritten text that is within a degree of similarity to the handwritten text of the user enhances the operability of the device and makes the user-device interface more efficient (e.g., by reducing the need for drawing inputs corresponding to the user providing characters as handwritten text) which, additionally, reduces power usage and improves battery life of the device by enabling the user to use the device more quickly and efficiently.

In some embodiments, the variation between the first appearance and the second appearance is (840) a function of a variation in the handwritten text of the respective user. In some implementations, the variation in the appearances is directly proportion to the variation in the handwritten text of the user. For example, the greater the variation in the handwritten text of the user, the greater the variation in the appearances. In some embodiments, the device determines (842) whether one of the first criterion and the second criterion are met based on a randomizing function. In some implementations, the randomizing function is based on a random seed that is used to initialize a pseudorandom number generator. In some implementations, the first criterion is met if the output of the pseudorandom number generator is greater than a threshold number and the second criterion is met if the output of the pseudorandom number generator is not greater than the threshold number. As an example, in FIGS. 6E-6F, the device 100 displays the set of characters 618 with the first appearance 620a in response to the output of the pseudorandom number generator being greater than the threshold number, and the device 100 displays the set of characters 618 with the second appearance 620b in response to the output of the pseudorandom number generator being less than the threshold number. Varying the appearances increases the degree of similarity between the simulated handwritten text and the handwritten text of the user. Varying the appearances enhances the operability of the device and makes the user-device interface more efficient (e.g., by reducing the need for drawing inputs corresponding to the user providing characters as handwritten text) which, additionally, reduces power usage and improves battery life of the device by enabling the user to use the device more quickly and efficiently.

In some embodiments, the device determines (844) that the first criterion is met when the first character is between a second character and a third character (e.g., the first criterion applies to letters that are situated between other letters). The device determines (844) that the second criterion is met when the first character is adjacent the second character and not adjacent the third character (e.g., the second criterion applies to letters that are on the fringes, for example, to first and last letters of words). As an example, in FIG. 6C, in the first instance of the character 'w', the character 'w' is situated at the beginning of a word. In the example of FIG. 6C, in the second instance of the character 'w', the character 'w' is situated in the middle of a word. Varying the appearances of a character results in simulated handwritten text that is within a degree of similarity to the handwritten text of the user. Synthesizing handwritten text that is within a degree of similarity to the handwritten text of the user enhances the operability of the device and makes the user-device interface more efficient (e.g., by reducing the need for drawing inputs corresponding to the user providing characters as handwritten text) which, additionally, reduces power usage and improves battery life of the device by enabling the user to use the device more quickly and efficiently.

Referring to FIG. 8E, in some embodiments, the device, after displaying the first character in accordance with one of the first appearance and the second appearance, receives (846) a second character in the sequence of characters. In response to receiving the second character in the sequence of characters and in accordance with a determination that a third criterion is met, the device changes (846) the display of the first character from one of the first appearance and the second appearance to a third appearance that corresponds to the appearance of the first character in handwritten text of the respective user. In some implementations, the third criterion specifies that the second character is from a predefined set of characters. For example, as illustrated in FIGS. 6W-6Y, the appearance of the character 't' changes to a third appearance 674c after receiving the character 'h'. In some implementations, the third criterion specifies that the second character is a punctuation. In response to receiving the second character in the sequence of characters and in accordance with a determination that a fourth criterion is met, the device changes (846) the display of the first character from one of the first appearance and the second appearance to a fourth appearance that corresponds to the appearance of the first character in handwritten text of the respective user. The fourth appearance of the first character is different than the third appearance of the first character. In some implementations, the fourth criterion specifies that the second character is not from the predefined set of characters. For example, as illustrated in FIGS. 6W-6Y, the appearance of character 't' changes to a second appearance 674b after the device 100 another instance of the character 't'. In some implementations, the fourth criterion specifies that the second character is not a punctuation. Varying the appearance of previous characters based on a function of subsequent characters enhances the operability of the device and makes the user-device interface more efficient (e.g., by reducing the need for drawing inputs corresponding to the user providing a sequence of characters in handwritten text of the user) which, additionally, reduces power usage and improves battery life of the device by enabling the user to use the device more quickly and efficiently.

It should be understood that the particular order in which the operations in FIGS. 8A-8E have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., method 700) are also applicable in an analogous manner to method 800 described above with respect to FIGS. 8A-8E. For example, the user interfaces, user interface elements, simulated handwritten text, first criterion, second criterion, etc., described above with reference to method 800 optionally have one or more of the characteristics of the user interfaces, user interface elements, simulated handwritten text, first criterion, second criterion, etc. described herein with reference to other methods described herein (e.g., method 700). For brevity, these details are not repeated here.

The operations in the information processing methods described above are, optionally implemented by running one or more functional modules in information processing apparatus such as general purpose processors (e.g., as described above with respect to FIGS. 1A and 3) or application specific chips. Further, the operations described above with reference to FIGS. 8A-8E are, optionally, implemented by components depicted in FIGS. 1A-1B, or FIG. 3. For example, the receive operation 802 is, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. A method comprising:
    at a device including a touch-sensitive display:
        displaying, on the touch-sensitive display, a drawing region;
        while displaying, the drawing region, detecting a sequence of drawing inputs on the touch-sensitive display;
        in response to detecting the sequence of drawing inputs, drawing a plurality of strokes in the drawing region, wherein the plurality of strokes correspond to a plurality of characters;
        after detecting the sequence of drawing inputs on the touch-sensitive display, detecting, on the touch-sensitive display, a predefined gesture that corresponds to a request to perform an operation based on the plurality of characters represented by the plurality of strokes; and
        in response to detecting the predefined gesture, concurrently displaying, on the touch-sensitive display:
            a first visual prompt indicating that a first subset of one or more characters in the plurality of characters can be used to perform the operation; and
            a second visual prompt indicating that a second subset of one or more characters in the plurality of characters can be used to perform the operation.

2. The method of claim 1, further comprising:
    displaying, on the touch-sensitive display, a result field that includes a resultant value for the operation, wherein the resultant value is a function of the first subset of one or more characters and the second subset of one or more characters.

3. The method of claim 2, wherein the predefined gesture is detected at a particular location, and wherein the result field is displayed at the particular location.

4. The method of claim 2, further comprising:
   detecting a user selection of the result field;
   in response to receiving the user selection of the result field, displaying an overlay that includes:
      one or more mathematical symbols that are associated with the operation;
      a first numerical value that corresponds with the first subset of one or more characters; and
      a second numerical value that corresponds with the second subset of one or more characters.

5. The method of claim 4, further comprising:
   receiving a user input changing one or more of the one or more mathematical symbols, the first numerical value, and the second numerical value; and
   in response to the user input, updating the resultant value based on the changes to the one or more of the one or more mathematical symbols, the first numerical value and the second numerical value.

6. The method of claim 2, wherein displaying the result field comprises:
   rendering the resultant value in a simulated handwritten text that is within a degree of similarity to the plurality of strokes displayed in the drawing region.

7. The method of claim 2, wherein the first subset of one or more characters and the second subset of one or more characters are associated with one or more of a symbol and a unit of measurement, and wherein the result field further includes one or more of the symbol and the unit of measurement.

8. The method of claim 2, wherein the first subset of one or more characters is associated with a first unit of measurement and the second subset of one or more characters is associated with a second unit of measurement that is different from the first unit of measurement, and wherein displaying the result field comprises:
   converting the first subset of one or more characters from the first unit of measurement into the second unit of measurement; and
   determining the resultant value based on a function of the converted first subset of one or more characters and the second subset of one or more characters.

9. The method of claim 2, further comprising:
   receiving a request to perform a subsequent operation; and
   performing the subsequent operation based on a function of the resultant value.

10. The method of claim 1, wherein the detecting the sequence of drawing inputs includes receiving the sequence of drawing inputs via a stylus, and wherein detecting the predefined gesture includes receiving the predefined gesture via a digit of a user.

11. The method of claim 1, wherein:
    the operation includes a formula;
    the first visual prompt indicates that the first subset of one or more characters represents a first numerical value that can be included in the formula; and
    the second visual prompt indicates that the second subset of one or more characters represents a second numerical value that can be included in the formula.

12. The method of claim 11, further comprising:
    receiving a user input selecting the first visual prompt;
    in response to the user input selecting the first visual prompt, including the first numerical value in the formula;
    receiving a user input selecting the second visual prompt; and
    in response to the user input selecting the second visual prompt, including the second numerical value in the formula.

13. The method of claim 11, wherein the first visual prompt includes a first affordance for changing the first numerical value, and wherein the second visual prompt includes a second affordance for changing the second numerical value.

14. The method of claim 13, wherein the first affordance for changing the first numerical value includes the first numerical value, and wherein the second affordance for changing the second numerical value includes the second numerical value.

15. The method of claim 13, further comprising:
    in response to a user input changing one or more of the first numerical value and the second numerical value, updating the formula based on a change to one or more of the first numerical value and the second numerical value.

16. The method of claim 1, further comprising:
    detecting, via a microphone, a voice input that indicates the operation.

17. An electronic device comprising:
    a display;
    an input device;
    one or processors;
    non-transitory memory storing wherein the one or more programs, the one or more programs including instructions that, when executed by the one or more processors, cause the electronic device to:
       display, on the touch-sensitive display, a drawing region;
       while displaying, the drawing region, detect a sequence of drawing inputs on the touch-sensitive display;
       in response to detecting the sequence of drawing inputs, drawing a plurality of strokes in the drawing region, wherein the plurality of strokes correspond to a plurality of characters;
       after detecting the sequence of drawing inputs on the touch-sensitive display, detect, on the touch-sensitive display, a predefined gesture that corresponds to a request to perform an operation based on the plurality of characters represented by the plurality of strokes; and
       in response to detecting the predefined gesture, concurrently display, on the touch-sensitive display:
          a first visual prompt indicating that a first subset of one or more characters in the plurality of characters can be used to perform the operation; and
          a second visual prompt indicating that a second subset of one or more characters in the plurality of characters can be used to perform the operation.

18. The electronic device of claim 17, wherein the instructions further cause the electronic device to:
    display, on the touch-sensitive display, a result field that includes a resultant value for the operation, wherein the resultant value is a function of the first subset of one or more characters and the second subset of one or more characters.

19. The electronic device of claim 18, wherein the instructions further cause the electronic device to:
    detect a user selection of the result field;

in response to receiving the user selection of the result field, display an overlay that includes:
one or more mathematical symbols that are associated with the operation;
a first numerical value that corresponds with the first subset of one or more characters; and
a second numerical value that corresponds with the second subset of one or more characters.

20. The electronic device of claim 19, wherein the instructions further cause the electronic device to:
receive a user input changing one or more of the one or more mathematical symbols, the first numerical value, and the second numerical value; and
in response to the user input, update the resultant value based on the changes to the one or more of the one or more mathematical symbols, the first numerical value and the second numerical value.

21. The electronic device of claim 18, wherein the predefined gesture is detected at a particular location, and wherein the result field is displayed at the particular location.

22. The electronic device of claim 18, wherein displaying the result field comprises:
rendering the resultant value in a simulated handwritten text that is within a degree of similarity to the plurality of strokes displayed in the drawing region.

23. The electronic device of claim 18, wherein the first subset of one or more characters and the second subset of one or more characters are associated with one or more of a symbol and a unit of measurement, and wherein the result field further includes one or more of the symbol and the unit of measurement.

24. The electronic device of claim 18, wherein the first subset of one or more characters is associated with a first unit of measurement and the second subset of one or more characters is associated with a second unit of measurement that is different from the first unit of measurement, and wherein displaying the result field comprises:
converting the first subset of one or more characters from the first unit of measurement into the second unit of measurement; and
determining the resultant value based on a function of the converted first subset of one or more characters and the second subset of one or more characters.

25. The electronic device of claim 18, wherein the instructions further cause the electronic device to:
receive a request to perform a subsequent operation; and
perform the subsequent operation based on a function of the resultant value.

26. The electronic device of claim 17, wherein the detecting the sequence of drawing inputs includes receiving the sequence of drawing inputs via a stylus, and wherein detecting the predefined gesture includes receiving the predefined gesture via a digit of a user.

27. The electronic device of claim 17, wherein:
the operation includes a formula;
the first visual prompt indicates that the first subset of one or more characters represents a first numerical value that can be included in the formula; and
the second visual prompt indicates that the second subset of one or more characters represents a second numerical value that can be included in the formula.

28. The electronic device of claim 27, wherein the instructions further cause the electronic device to:
receive a user input selecting the first visual prompt;
in response to the user input selecting the first visual prompt, include the first numerical value in the formula;
receive a user input selecting the second visual prompt; and
in response to the user input selecting the second visual prompt, include the second numerical value in the formula.

29. The electronic device of claim 27, wherein the first visual prompt includes a first affordance for changing the first numerical value, and wherein the second visual prompt includes a second affordance for changing the second numerical value.

30. The electronic device of claim 29, wherein the first affordance for changing the first numerical value includes the first numerical value, and wherein the second affordance for changing the second numerical value includes the second numerical value.

31. The electronic device of claim 29, wherein the instructions further cause the electronic device to:
in response to a user input changing one or more of the first numerical value and the second numerical value, update the formula based on a change to one or more of the first numerical value and the second numerical value.

32. The electronic device of claim 17, wherein the instructions further cause the electronic device to:
detect, via a microphone, a voice input that indicates the operation.

33. A non-transitory computer readable storage medium storing one or more programs, the one or more programs comprising instructions, which, when executed by an electronic device with a display, and an input device, cause the electronic device to:
display, on the touch-sensitive display, a drawing region;
while displaying, the drawing region, detect a sequence of drawing inputs on the touch-sensitive display;
in response to detecting the sequence of drawing inputs, drawing a plurality of strokes in the drawing region, wherein the plurality of strokes correspond to a plurality of characters;
after detecting the sequence of drawing inputs on the touch-sensitive display, detect, on the touch-sensitive display, a predefined gesture that corresponds to a request to perform an operation based on the plurality of characters represented by the plurality of strokes; and
in response to detecting the predefined gesture, concurrently display, on the touch-sensitive display:
a first visual prompt indicating that a first subset of one or more characters in the plurality of characters can be used to perform the operation; and
a second visual prompt indicating that a second subset of one or more characters in the plurality of characters can be used to perform the operation.

34. The non-transitory computer readable storage medium of claim 33, wherein the instructions further cause the electronic device to:
display, on the touch-sensitive display, a result field that includes a resultant value for the operation, wherein the resultant value is a function of the first subset of one or more characters and the second subset of one or more characters.

35. The non-transitory computer readable storage medium of claim 34, wherein the predefined gesture is detected at a particular location, and wherein the result field is displayed at the particular location.

36. The non-transitory computer readable storage medium of claim 34, wherein the instructions further cause the electronic device to:

detect a user selection of the result field;
in response to receiving the user selection of the result field, display an overlay that includes:
one or more mathematical symbols that are associated with the operation;
a first numerical value that corresponds with the first subset of one or more characters; and
a second numerical value that corresponds with the second subset of one or more characters.

37. The non-transitory computer readable storage medium of claim 36, wherein the instructions further cause the electronic device to:
receive a user input changing one or more of the one or more mathematical symbols, the first numerical value, and the second numerical value; and
in response to the user input, update the resultant value based on the changes to the one or more of the one or more mathematical symbols, the first numerical value and the second numerical value.

38. The non-transitory computer readable storage medium of claim 34, wherein displaying the result field comprises:
rendering the resultant value in a simulated handwritten text that is within a degree of similarity to the plurality of strokes displayed in the drawing region.

39. The non-transitory computer readable storage medium of claim 34, wherein the first subset of one or more characters and the second subset of one or more characters are associated with one or more of a symbol and a unit of measurement, and wherein the result field further includes one or more of the symbol and the unit of measurement.

40. The non-transitory computer readable storage medium of claim 34, wherein the first subset of one or more characters is associated with a first unit of measurement and the second subset of one or more characters is associated with a second unit of measurement that is different from the first unit of measurement, and wherein displaying the result field comprises:
converting the first subset of one or more characters from the first unit of measurement into the second unit of measurement; and
determining the resultant value based on a function of the converted first subset of one or more characters and the second subset of one or more characters.

41. The non-transitory computer readable storage medium of claim 34, wherein the instructions further cause the electronic device to:
receive a request to perform a subsequent operation; and
perform the subsequent operation based on a function of the resultant value.

42. The non-transitory computer readable storage medium of claim 33, wherein the detecting the sequence of drawing inputs includes receiving the sequence of drawing inputs via a stylus, and wherein detecting the predefined gesture includes receiving the predefined gesture via a digit of a user.

43. The non-transitory computer readable storage medium of claim 33, wherein:
the operation includes a formula;
the first visual prompt indicates that the first subset of one or more characters represents a first numerical value that can be included in the formula; and
the second visual prompt indicates that the second subset of one or more characters represents a second numerical value that can be included in the formula.

44. The non-transitory computer readable storage medium of claim 43, wherein the instructions further cause the electronic device to:
receive a user input selecting the first visual prompt;
in response to the user input selecting the first visual prompt, include the first numerical value in the formula;
receiving a user input selecting the second visual prompt; and
in response to the user input selecting the second visual prompt, include the second numerical value in the formula.

45. The non-transitory computer readable storage medium of claim 43, wherein the first visual prompt includes a first affordance for changing the first numerical value, and wherein the second visual prompt includes a second affordance for changing the second numerical value.

46. The non-transitory computer readable storage medium of claim 45, wherein the first affordance for changing the first numerical value includes the first numerical value, and wherein the second affordance for changing the second numerical value includes the second numerical value.

47. The non-transitory computer readable storage medium of claim 45, wherein the instructions further cause the electronic device to:
in response to a user input changing one or more of the first numerical value and the second numerical value, update the formula based on a change to one or more of the first numerical value and the second numerical value.

48. The non-transitory computer readable storage medium of claim 33, wherein the instructions further cause the electronic device to:
detect, via a microphone, a voice input that indicates the operation.

* * * * *